US012532229B2

(12) United States Patent
Tao et al.

(10) Patent No.: US 12,532,229 B2
(45) Date of Patent: Jan. 20, 2026

(54) COMMUNICATION METHOD, APPARATUS, AND SYSTEM

(71) Applicant: Huawei Technologies Co., Ltd., Shenzhen (CN)

(72) Inventors: Zhenyu Tao, Shanghai (CN); Weijian Lin, Xi'an (CN); Chuankui Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 417 days.

(21) Appl. No.: 18/164,939

(22) Filed: Feb. 6, 2023

(65) Prior Publication Data

US 2023/0180067 A1 Jun. 8, 2023

Related U.S. Application Data

(63) Continuation of application No. PCT/CN2021/102458, filed on Jun. 25, 2021.

(30) Foreign Application Priority Data

Aug. 5, 2020 (CN) .......................... 202010780286.5
Sep. 3, 2020 (CN) .......................... 202010918194.9

(51) Int. Cl.
*H04W 36/00* (2009.01)
*H04W 36/32* (2009.01)

(52) U.S. Cl.
CPC ....... *H04W 36/0033* (2013.01); *H04W 36/32* (2013.01)

(58) Field of Classification Search
CPC ............. H04W 36/0033; H04W 36/32; H04W 36/00222
See application file for complete search history.

(56) References Cited

U.S. PATENT DOCUMENTS

| 10,602,380 | B2 | 3/2020 | Ryu et al. | |
|---|---|---|---|---|
| 2020/0275332 | A1* | 8/2020 | Chong | ............... H04W 28/0865 |
| 2022/0141719 | A1* | 5/2022 | Shan | ..................... H04W 36/14 370/331 |
| 2022/0159502 | A1* | 5/2022 | Gan | .................. H04W 36/0033 |

(Continued)

FOREIGN PATENT DOCUMENTS

| CN | 108990124 A | 12/2018 |
|---|---|---|
| CN | 110140385 A | 8/2019 |

(Continued)

*Primary Examiner* — Jung H Park
(74) *Attorney, Agent, or Firm* — Conley Rose, P.C.

(57) ABSTRACT

A communication method is applied to a scenario in which a terminal moves from a first preset area of a first network to a second preset area of a second network. The method includes that a first core network device in the first network determines that Evolved Packet System (EPS) fallback of the terminal is triggered, and sends first information to a second core network device in the second network. The first information includes a first identifier or first indication information. The first identifier identifies a first dedicated bearer corresponding to the terminal. The first dedicated bearer includes a voice dedicated bearer or a video dedicated bearer. The first indication information indicates that the terminal falls back to the second network using an EPS fallback procedure.

20 Claims, 40 Drawing Sheets

(56) References Cited

U.S. PATENT DOCUMENTS

2022/0345949 A1* 10/2022 Youn .................... H04L 65/1095
2023/0224767 A1*  7/2023 Watfa ................ H04W 28/0268
                                                         370/331

FOREIGN PATENT DOCUMENTS

| CN | 110710247 A | 1/2020 |
| WO | 2020034950 A1 | 2/2020 |
| WO | 2020142960 A1 | 7/2020 |

* cited by examiner

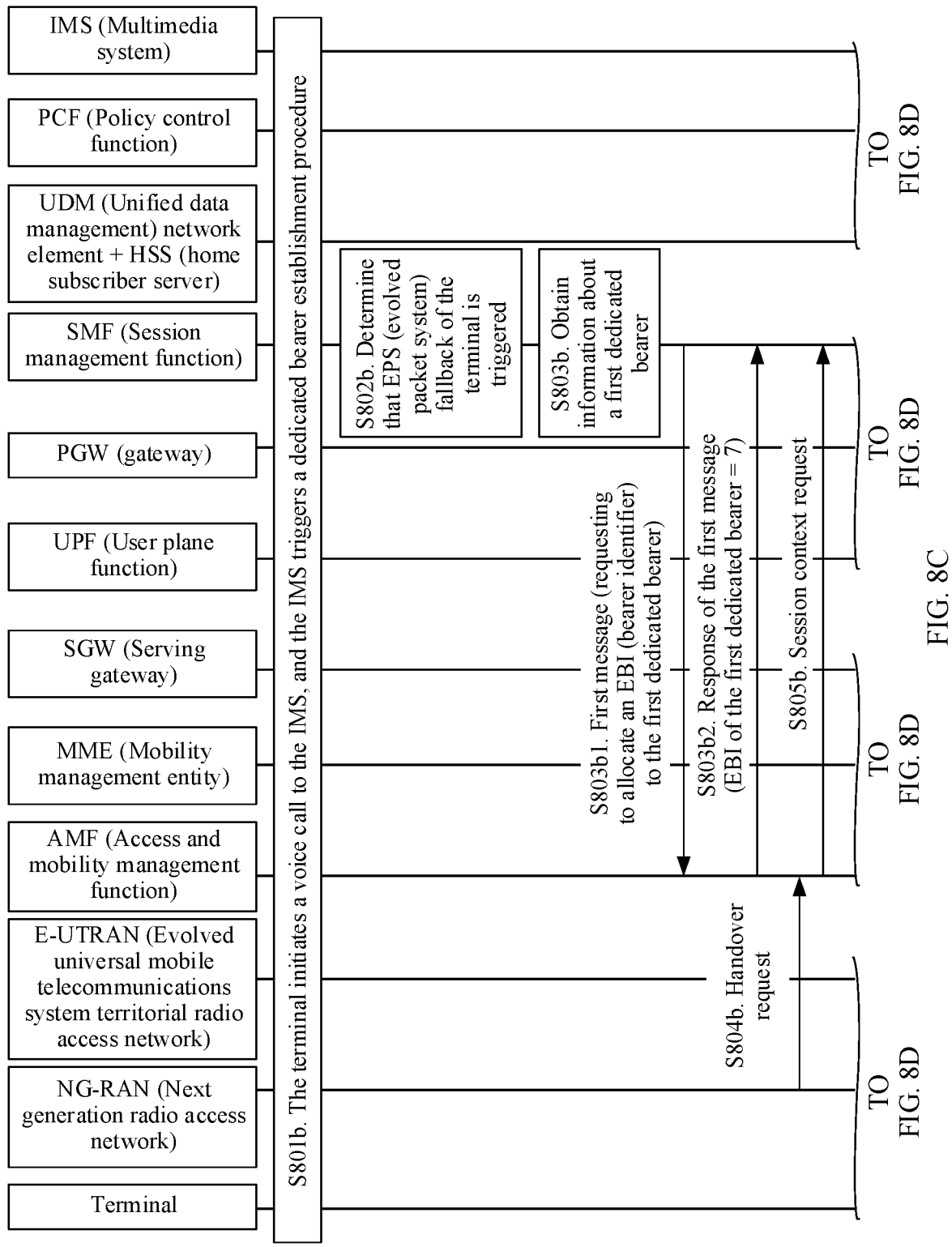

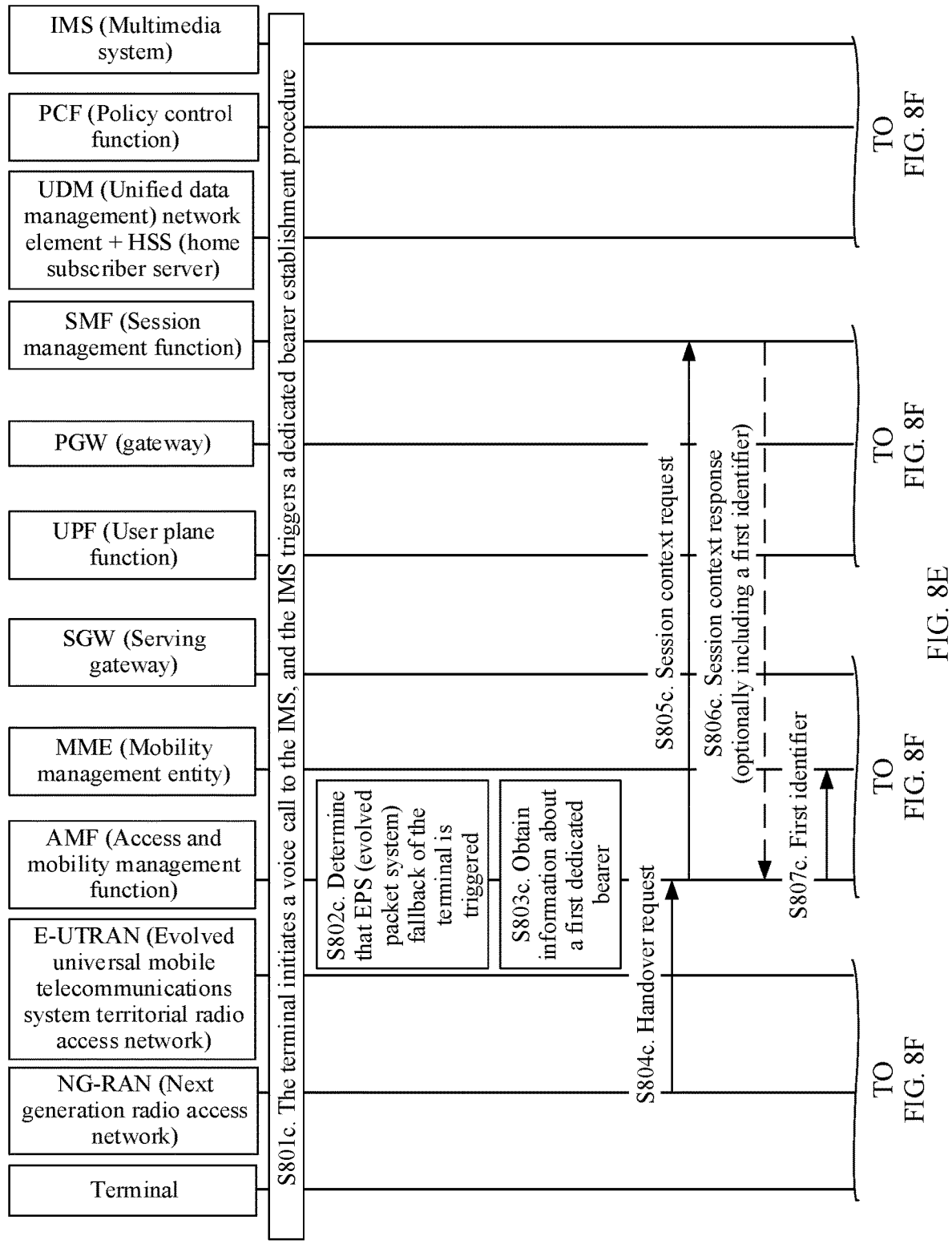

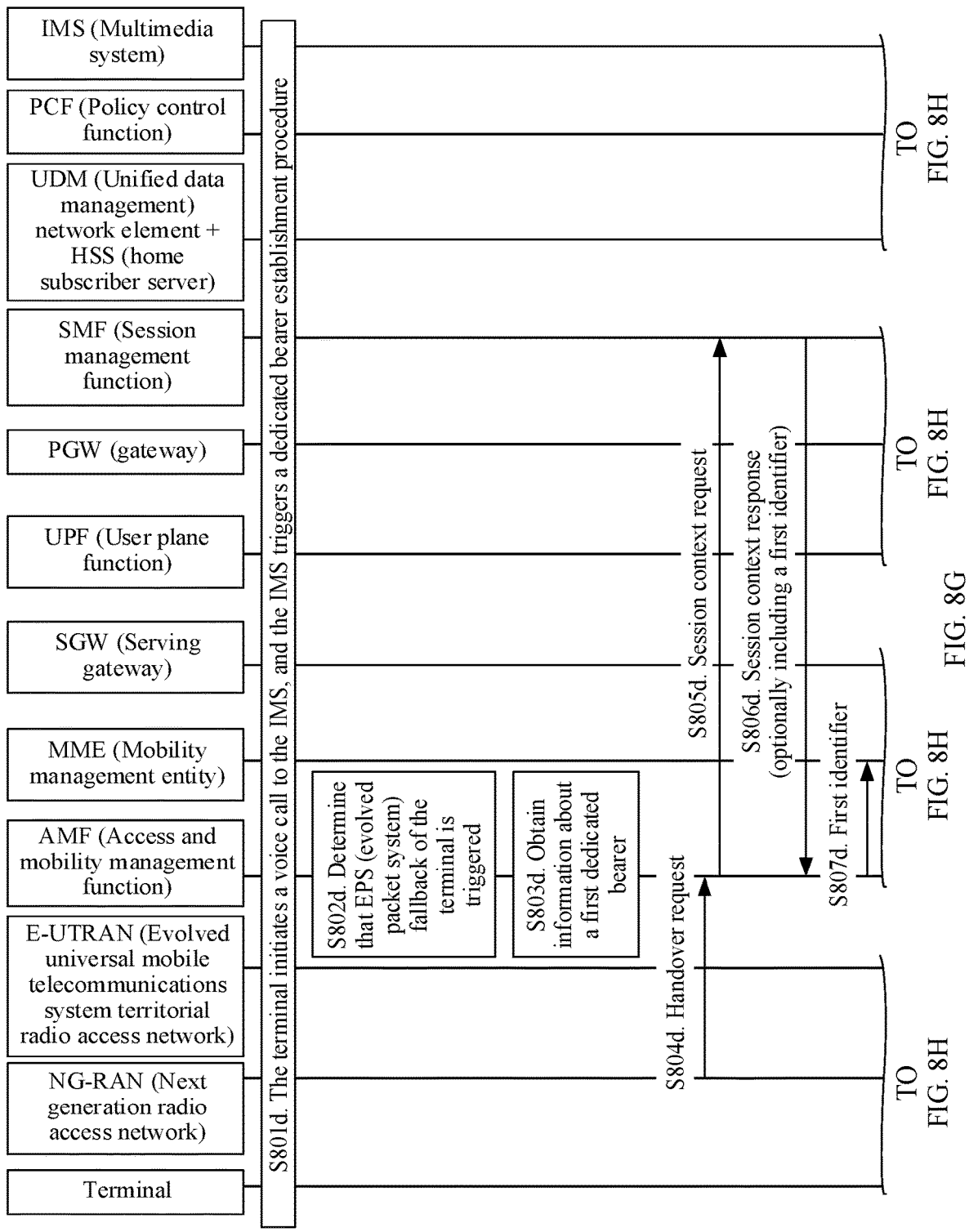

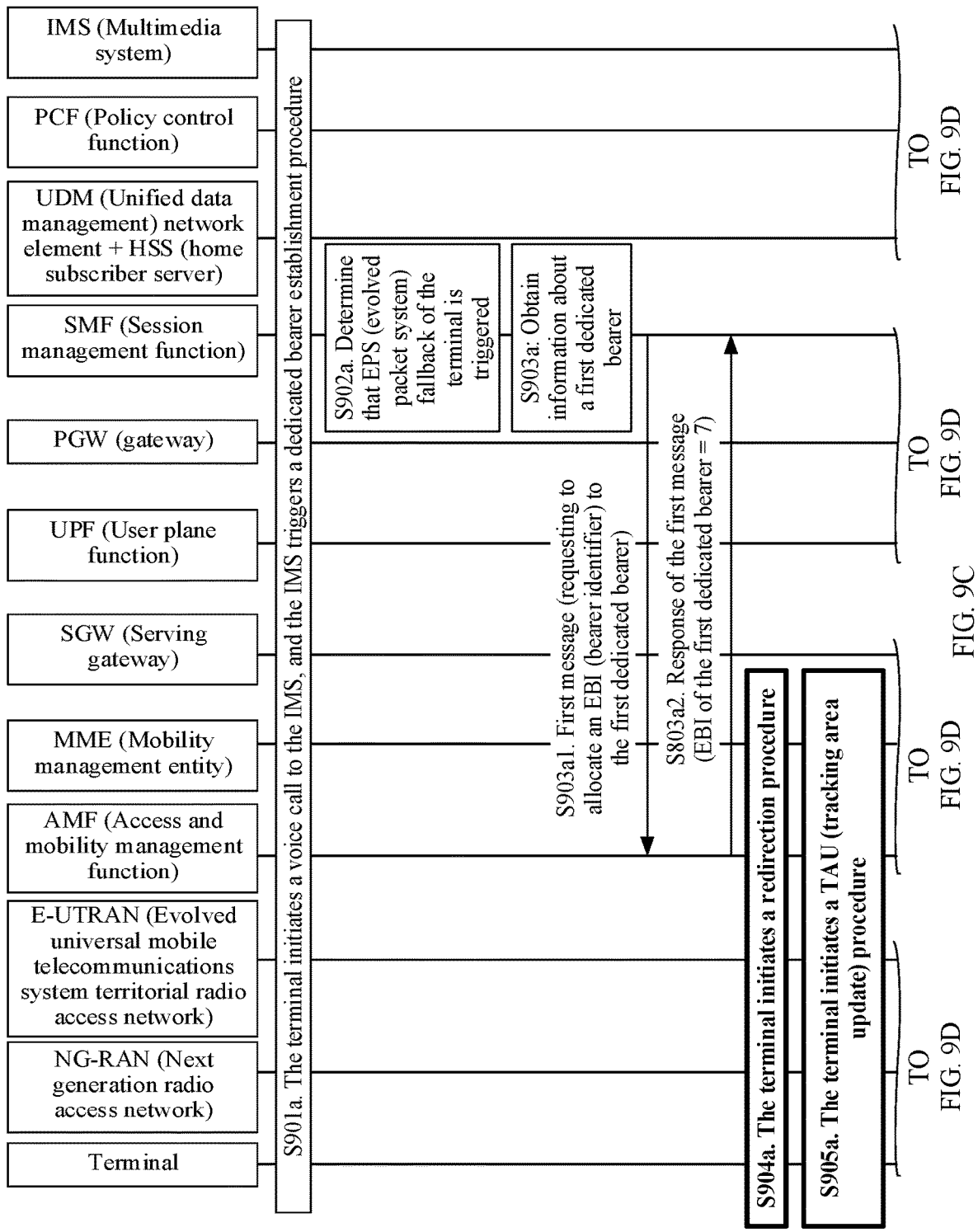

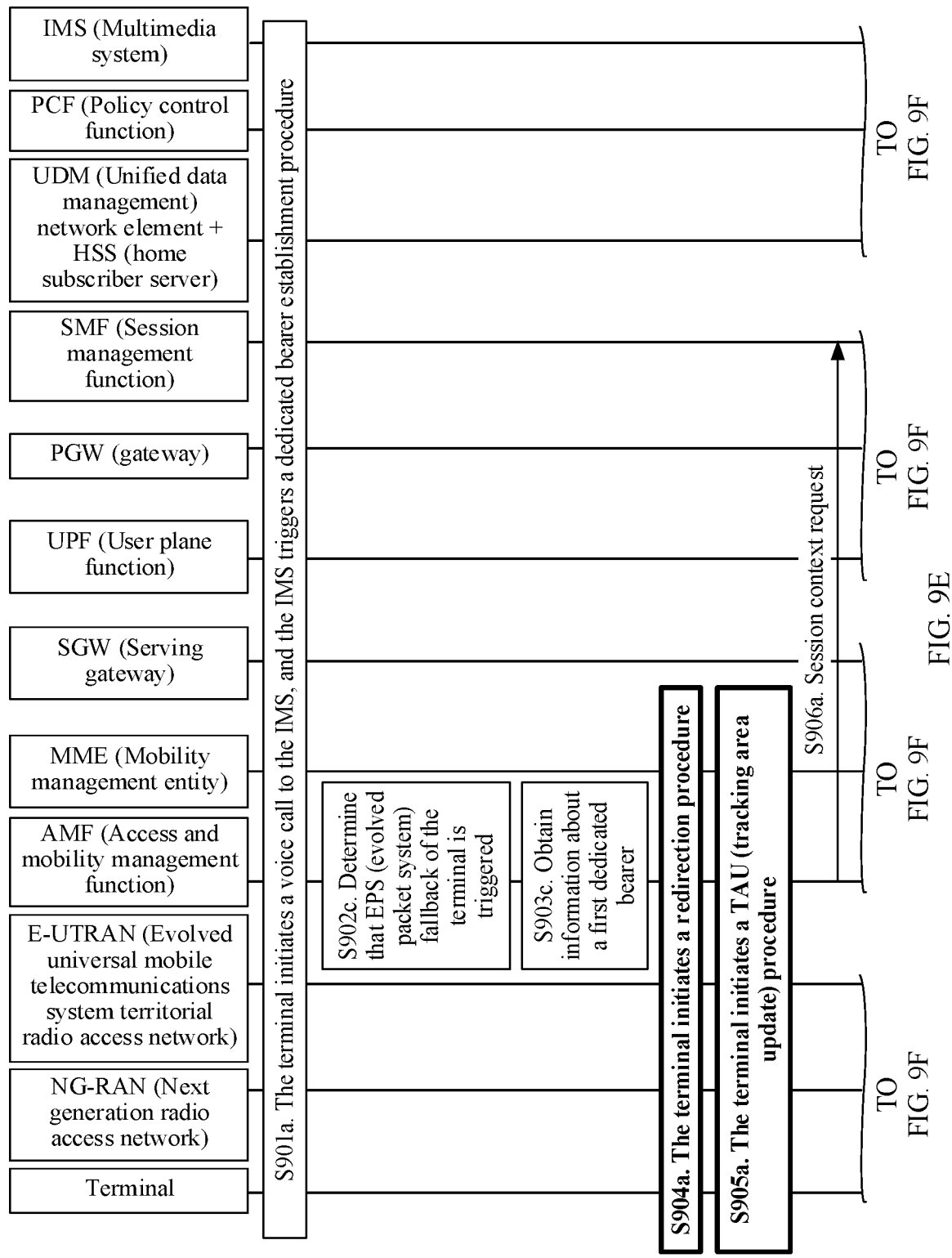

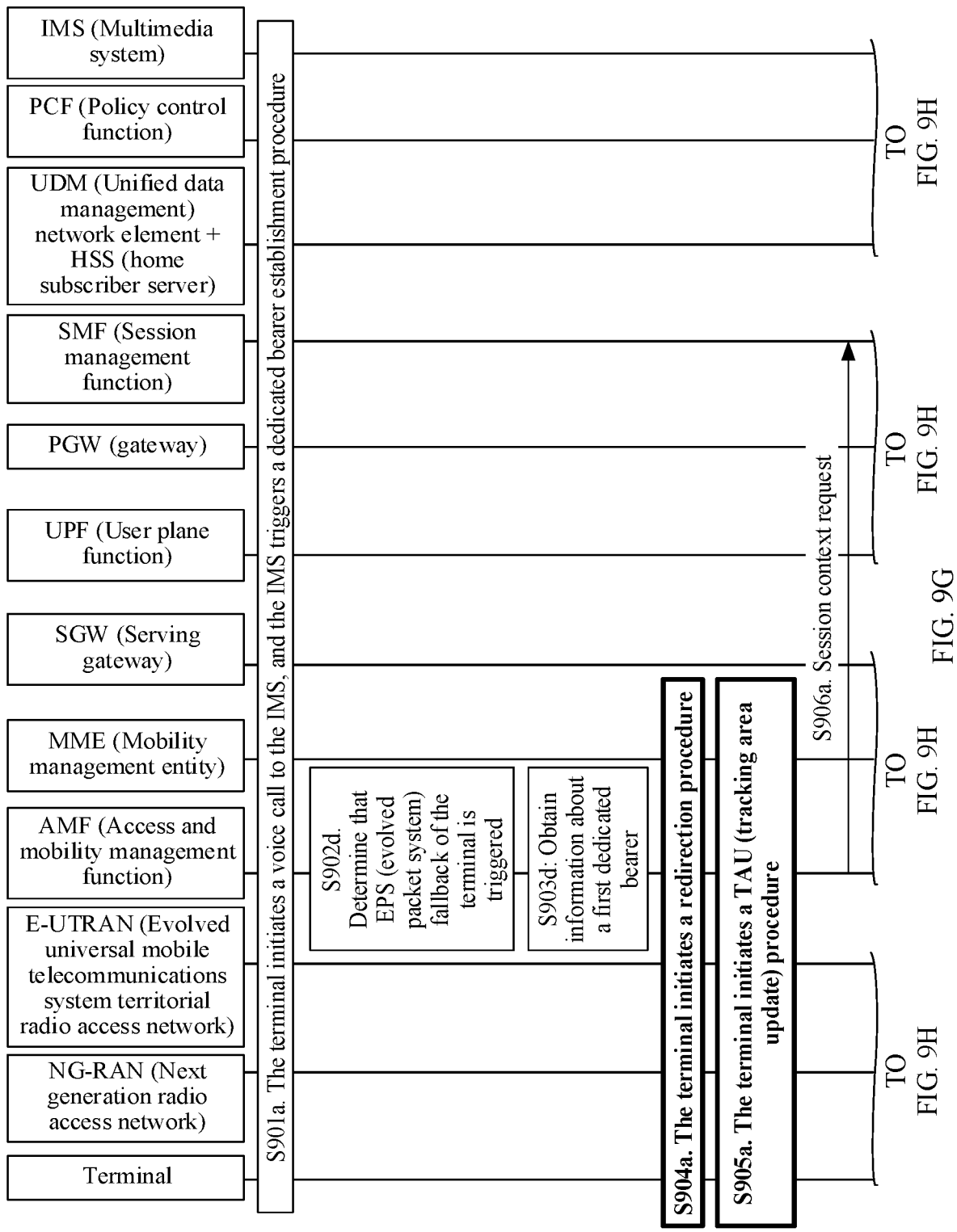

COMMUNICATION METHOD, APPARATUS, AND SYSTEM

CROSS-REFERENCE TO RELATED APPLICATIONS

This is a continuation of International Patent Application No. PCT/CN2021/102458 filed on Jun. 25, 2021, which claims priority to Chinese Patent Application No. 202010780286.5 filed on Aug. 5, 2020 and Chinese Patent Application No. 202010918194.9 filed on Sep. 3, 2020. All of the aforementioned patent applications are hereby incorporated by reference in their entireties.

TECHNICAL FIELD

This disclosure relates to the field of communication technologies, and in particular, to a communication method, apparatus, and system.

BACKGROUND

As deployment of a fifth generation (5G) network progresses, a user may perform a voice service by using 5G. When a user equipment (UE) initiates a voice call or is called in the 5G network, in a possible implementation, the 5G network initiates an Evolved Packet System (EPS) fallback (FB) procedure, so that the UE falls back from the 5G network to a fourth generation (4G) network, for example, a Long-Term Evolution (LTE) system, and a voice service is provided for the user by using a voice over LTE (VoLTE) technology. In other words, in the EPS fallback procedure, the UE is handed over from a 5G network coverage area to an LTE network coverage area. According to stipulations of some operators, if the UE crosses an area, a core network mobility management network element needs to delete a protocol data unit (PDU) session or a packet data network (PDN) connection of the UE, and then indicates the UE to re-establish a PDU session (or PDN connection), so that a specified user plane Internet Protocol (IP) address is used in a specified area.

However, if the PDU session (or PDN connection) is deleted, a voice call procedure of the UE using EPS FB is interrupted.

SUMMARY

This disclosure provides a communication method, apparatus, and system, to reduce a probability that a service of a terminal is interrupted in an EPS fallback scenario.

To achieve the foregoing objective, the following technical solutions are used in embodiments of this disclosure.

According to a first aspect, a communication method is provided, where the method may be performed by a first core network device or an apparatus (for example, a chip system of the first core network device) that supports a function of the first core network device. The method is applied to a scenario in which a terminal moves from a first preset area of a first network to a second preset area of a second network. A radio access technology (RAT) of the first network is different from a RAT of the second network. The method includes the following. The first core network device in the first network determines that EPS fallback of the terminal is triggered, and sends first information to a second core network device in the second network.

The first information includes a first identifier or first indication information. The first identifier is used to identify a first dedicated bearer corresponding to the terminal. The first dedicated bearer includes a voice dedicated bearer and/or a video dedicated bearer. The first indication information is used to indicate that the terminal falls back to the second network by using an EPS fallback procedure.

In the communication method provided in this embodiment of this disclosure, the first core network device in the first network can perceive that EPS fallback is triggered, and send the first information to the second core network device in the second network. In this way, the second core network device can learn that EPS fallback is triggered. In this way, even if a scenario in which the terminal crosses an area exists, the second core network device does not delete an audio/video PDN connection, namely, an IP Multimedia Subsystem (IMS) PDN connection, of the terminal, to reduce a probability that an audio/video service is interrupted when the terminal crosses an area.

In a possible design, the first core network device is an access and mobility management function (AMF) or a session management function (SMF), and the second core network device is a mobility management entity (MME).

In a possible design, the method further includes the following.

The first core network device obtains information about the first dedicated bearer, where the information about the first dedicated bearer includes an EPS bearer identifier (EBI) of the first dedicated bearer and the first identifier.

In a possible design, the first core network device is an SMF, and that the first core network device obtains information about the first dedicated bearer includes the following.

The first core network device sends a first message to an AMF, where the first message is used to request the AMF to allocate the EBI to the first dedicated bearer, and the first core network device receives the EBI from the AMF.

In a possible design, the first core network device is an SMF, and the method further includes the following.

The first core network device sends a second message to the second core network device, where the second message is used to request to delete the first dedicated bearer, and the first core network device receives a response of the second message from the second core network device, where the response of the second message is used to indicate that the first dedicated bearer is deleted.

In this way, the second core network device can release a resource related to the first dedicated bearer.

In a possible design, the first core network device is an SMF, and that the first core network device sends first information to a second core network device in the second network includes the following.

The first core network device sends a session context to an AMF, where the session context includes the first identifier or the first indication information.

In a possible design, the first core network device is an AMF, and that the first core network device sends first information to a second core network device in the second network includes the following.

The first core network device sends a user context of the terminal to the second core network device, where the user context includes the first identifier or the first indication information, or the first core network device sends a session context of the terminal to the second core network device, where the session context includes the first identifier or the first indication information.

The user context includes a session context, a mobility management context, a security context, and the like.

According to a second aspect, a communication method is provided, where the method may be performed by a second core network device or an apparatus (for example, a chip system of the second core network device) that supports a function of the second core network device. The method is applied to a scenario in which a terminal moves from a first preset area of a first network to a second preset area of a second network. A RAT of the first network is different from a RAT of the second network. The method includes the following. The second core network device in the second network receives first information from a first core network device in the first network, and reserves, based on the first information, a PDN connection corresponding to the terminal.

The first information includes a first identifier or first indication information. The first identifier is used to identify a first dedicated bearer corresponding to the terminal. The first dedicated bearer includes a voice dedicated bearer and/or a video dedicated bearer. The first indication information is used to indicate that the terminal falls back to an EPS by using an EPS fallback procedure.

In a possible design, the first core network device includes an SMF network element or an AMF network element, and the second core network device is an MME.

In a possible design, the method further includes the following.

The second core network device sends information about the first dedicated bearer to the terminal, where the information about the first dedicated bearer includes an EBI of the first dedicated bearer and the first identifier.

In the method, a network side transmits voice and/or video service data of the terminal by using the first dedicated bearer.

In a possible design, the first core network device is an AMF, and that the second core network device receives a first identifier from a first core network device in the first network includes the following.

The second core network device receives a user context of the terminal from the first core network device, where the user context includes the information about the first dedicated bearer, and the information about the first dedicated bearer includes the first identifier, or the second core network device receives a session context of the terminal from the first core network device, where the session context includes the information about the first dedicated bearer, and the information about the first dedicated bearer includes the first identifier.

In a possible design, the first core network device is an AMF, and that the second core network device receives first indication information from a first core network device in the first network includes the following.

The second core network device receives a user context of the terminal from the first core network device, where the user context includes the first indication information, or the second core network device receives a session context of the terminal from the first core network device, where the session context includes the first indication information.

In a possible design, the first core network device is an SMF, and the method further includes the following.

The second core network device receives a second message from the first core network device, where the second message is used to request to delete the first dedicated bearer, and the second core network device sends a response of the second message to the first core network device, where the response of the second message is used to indicate that the first dedicated bearer is deleted.

In a possible design, the method further includes the following.

The second core network device sends a third message to an access network device in the second network, where the third message is used to request to delete the first dedicated bearer, and the second core network device receives a response of the third message from the access network device, where the response of the third message is used to indicate that the first dedicated bearer is deleted.

In this way, the access network device can release a resource related to the first dedicated bearer.

According to a third aspect, a communication apparatus is provided, where the apparatus may be a first core network device or an apparatus (for example, a chip system of the first core network device) that supports a function of the first core network device. The apparatus is located in a first network. The apparatus includes a processor configured to determine that EPS fallback of a terminal is triggered, where the terminal moves from a first preset area of the first network to a second preset area of a second network, and a RAT of the first network is different from a RAT of the second network, and a communication interface configured to send first information to a second core network device in the second network, where the first information includes a first identifier or first indication information.

The first identifier is used to identify a first dedicated bearer corresponding to the terminal. The first dedicated bearer includes a voice dedicated bearer and/or a video dedicated bearer. The first indication information is used to indicate that the terminal falls back to the second network by using an EPS fallback procedure. The RAT of the first network is different from the RAT of the second network.

In a possible design, the apparatus is an AMF or an SMF, and the second core network device is an MME.

In a possible design, the processor is further configured to obtain information about the first dedicated bearer, where the information about the first dedicated bearer includes an EBI of the first dedicated bearer and the first identifier.

In a possible design, the apparatus is an SMF, and that the processor is configured to obtain information about the first dedicated bearer includes controlling the communication interface to send a first message to an AMF, where the first message is used to request the AMF to allocate the EBI to the first dedicated bearer, and controlling the communication interface to receive the EBI from the AMF.

In a possible design, the apparatus is an SMF, and the communication interface is further configured to send a second message to the second core network device, where the second message is used to request to delete the first dedicated bearer, and receive a response of the second message from the second core network device, where the response of the second message is used to indicate that the first dedicated bearer is deleted.

In a possible design, the apparatus is an SMF, and that a communication interface is configured to send first information to a second core network device in the second network includes sending a session context to an AMF, where the session context includes the first identifier or the first indication information.

In a possible design, the apparatus is an AMF, and that a communication interface is configured to send first information to a second core network device in the second network includes sending a user context of the terminal to the second core network device, where the user context includes the first identifier or the first indication information, or sending a session context of the terminal to the second core network device, where the session context includes the first identifier or the first indication information.

According to a fourth aspect, a communication apparatus is provided, where the apparatus may be a second core network device or an apparatus (for example, a chip system of the second core network device) that supports a function of the second core network device. The apparatus is located in a second network. The apparatus includes a communication interface configured to receive first information from a first core network device in a first network, where the first information includes a first identifier or first indication information, the first identifier is used to identify a first dedicated bearer corresponding to a terminal, the first dedicated bearer includes a voice dedicated bearer and/or a video dedicated bearer, the first indication information is used to indicate that the terminal falls back to an EPS by using an EPS fallback procedure, the terminal moves from a first preset area of the first network to a second preset area of the second network, and a RAT of the first network is different from a RAT of the second network, and a processor configured to reserve, based on the first information, a PDN connection corresponding to the terminal.

In a possible design, the apparatus is an MME, and the first core network device includes an SMF network element or an AMF network element.

In a possible design, the communication interface is further configured to send information about the first dedicated bearer to the terminal, where the information about the first dedicated bearer includes an EBI of the first dedicated bearer and the first identifier.

In a possible design, the first core network device is an AMF, and that a communication interface is configured to receive a first identifier from a first core network device in a first network includes receiving a user context of the terminal from the first core network device, where the user context includes the information about the first dedicated bearer, and the information about the first dedicated bearer includes the first identifier, or receiving a session context of the terminal from the first core network device, where the session context includes the information about the first dedicated bearer, and the information about the first dedicated bearer includes the first identifier.

In a possible design, the first core network device is an AMF, and that a communication interface is configured to receive first indication information from a first core network device in a first network includes receiving a user context of the terminal from the first core network device, where the user context includes the first indication information, or receiving a session context of the terminal from the first core network device, where the session context includes the first indication information.

In a possible design, the first core network device is an SMF, and the communication interface is further configured to receive a second message from the first core network device, where the second message is used to request to delete the first dedicated bearer, and send a response of the second message to the first core network device, where the response of the second message is used to indicate that the first dedicated bearer is deleted.

In a possible design, the communication interface is further configured to send a third message to an access network device in the second network, where the third message is used to request to delete the first dedicated bearer, and receive a response of the third message from the access network device, where the response of the third message is used to indicate that the first dedicated bearer is deleted.

According to a fifth aspect, this disclosure provides a communication apparatus configured to implement a function of the first core network device in any one of the foregoing aspects, or configured to implement a function of the second core network device in any one of the foregoing aspects.

According to a sixth aspect, this disclosure provides a communication apparatus, where the apparatus has a function of implementing the communication method in any one of the implementations of any one of the foregoing aspects. The function may be implemented by hardware, or may be implemented by hardware executing corresponding software. The hardware or the software includes one or more modules corresponding to the function.

According to a seventh aspect, a communication apparatus is provided, including a processor and a memory, where the memory is configured to store computer-executable instructions, and when the communication apparatus runs, the processor executes the computer-executable instructions stored in the memory, so that the communication apparatus performs the communication method in any one of the implementations of any one of the foregoing aspects.

According to an eighth aspect, a communication apparatus is provided, including a processor, where the processor is configured to be coupled to a memory, and after reading instructions in the memory, perform the communication method in any one of the implementations of any one of the foregoing aspects based on the instructions.

According to a ninth aspect, an embodiment of this disclosure provides a communication apparatus, including a processor and an interface circuit, where the interface circuit is configured to receive code instructions, and transmit the code instructions to the processor, and the processor is configured to run the code instructions to perform the communication method in any one of the implementations of any one of the foregoing aspects.

According to a tenth aspect, an embodiment of this disclosure provides a communication apparatus, where the apparatus may be a chip system, and the chip system includes a processor, and optionally, may further include a memory configured to implement a function of the method described in any one of the foregoing aspects. The chip system may include a chip, or include a chip and another discrete device.

According to an eleventh aspect, a communication apparatus is provided, where the apparatus may be a circuit system, the circuit system includes a processing circuit, and the processing circuit is configured to perform the communication method in any one of the implementations of any one of the foregoing aspects.

According to a twelfth aspect, an embodiment of this disclosure further provides a computer-readable storage medium, including instructions, where when the instructions are run on a computer, the computer is enabled to perform the method in any one of the foregoing aspects.

According to a thirteenth aspect, an embodiment of this disclosure further provides a computer program product, including instructions, where when the computer program product is run on a computer, the computer is enabled to perform the method in any one of the foregoing aspects.

According to a fourteenth aspect, an embodiment of this disclosure provides a system, where the system includes the first core network device and the second core network device in any one of the foregoing aspects.

According to a fifteenth aspect, an embodiment of this disclosure provides a communication method, where the method may be performed by a third core network device or an apparatus (for example, a chip system of the third core network device) that supports a function of the third core network device. The method is applied to a scenario in which a terminal moves from a first tracking area (TA) of a third network to a second TA of a fourth network. A RAT of the third network is different from a RAT of the fourth network. The method includes the following.

The third core network device obtains information about the first TA and information about the second TA, and reserves or deletes, based on the information about the second TA and the information about the first TA, a PDN connection corresponding to the terminal.

In the communication method provided in this embodiment of this disclosure, the third core network device in the third network can obtain the information about the first TA and the information about the second TA. In other words, the third core network device can learn of location information of the terminal in the third network and location information of the terminal in the fourth network. In this way, the third core network device can determine, based on the information about the first TA and the information about the second TA, to reserve or delete the PDN connection corresponding to the terminal, to reduce a probability that a call service of the terminal is interrupted because the core network device mistakenly deletes the PDN connection corresponding to the terminal.

In a possible design, the third core network device is an SMF, or an AMF, or an MME.

In a possible design, that the third core network device reserves, based on the information about the second TA and the information about the first TA, a PDN connection corresponding to the terminal includes the following.

If both the first TA and the second TA belong to a third preset area, the third core network device reserves the PDN connection corresponding to the terminal, or if the second TA belongs to the third preset area, the first TA does not belong to the third preset area, and EPS fallback of the terminal is triggered, the third core network device reserves the PDN connection corresponding to the terminal, or if the second TA does not belong to the third preset area, the first TA belongs to the third preset area, and EPS fallback of the terminal is triggered, the third core network device reserves the PDN connection corresponding to the terminal.

In a possible design, that the third core network device deletes, based on the information about the second TA and the information about the first TA, a PDN connection corresponding to the terminal includes the following.

If the second TA belongs to a third preset area, the first TA does not belong to the third preset area, and the terminal performs a non-voice service, the third core network device deletes the PDN connection corresponding to the terminal, or if the second TA does not belong to the third preset area, the first TA belongs to the third preset area, and the terminal performs a non-voice service, the third core network device deletes the PDN connection corresponding to the terminal.

In a possible design, information about the third preset area is preconfigured for the third core network device, and the third preset area includes at least one TA of the third network and/or at least one TA of the fourth network. In this way, it can be ensured that the third core network device can identify a TA identity (TAI) of the first network and a TAI of the second network.

In a possible design, that the third core network device obtains information about the first TA includes the following.

The third core network device receives the information about the first TA from a fourth core network device, where the fourth core network device belongs to the third network.

According to a sixteenth aspect, this disclosure provides a communication apparatus, where the communication apparatus belongs to a fourth network, and the communication apparatus includes a communication interface configured to obtain information about a first TA and information about a second TA, and a processor configured to reserve or delete, based on the information about the second TA and the information about the first TA, a PDN connection corresponding to a terminal.

In a possible design, the apparatus is an SMF, or an AMF, or an MME.

In a possible design, that a processor is configured to reserve, based on the information about the second TA and the information about the first TA, a PDN connection corresponding to a terminal includes, if both the first TA and the second TA belong to a third preset area, reserving the PDN connection corresponding to the terminal, or if the second TA belongs to the third preset area, the first TA does not belong to the third preset area, and EPS fallback of the terminal is triggered, reserving the PDN connection corresponding to the terminal, or if the second TA does not belong to the third preset area, the first TA belongs to the third preset area, and EPS fallback of the terminal is triggered, reserving the PDN connection corresponding to the terminal.

In a possible design, that a processor is configured to delete, based on the information about the second TA and the information about the first TA, a PDN connection corresponding to a terminal includes, if the second TA belongs to a third preset area, the first TA does not belong to the third preset area, and the terminal performs a non-voice service, deleting the PDN connection corresponding to the terminal, or if the second TA does not belong to the third preset area, the first TA belongs to the third preset area, and the terminal performs a non-voice service, deleting the PDN connection corresponding to the terminal.

In a possible design, information about the third preset area is preconfigured for the apparatus, and the third preset area includes at least one TA of a third network and/or at least one TA of the fourth network.

In a possible design, that a communication interface is configured to obtain information about a first TA includes receiving the information about the first TA from a fourth core network device, where the fourth core network device belongs to the third network.

According to a seventeenth aspect, this disclosure provides a communication apparatus configured to implement a function of the communication apparatus in the sixteenth aspect.

According to an eighteenth aspect, this disclosure provides a communication apparatus, where the apparatus has a function of implementing the communication method in any one of the implementations of the fifteenth aspect. The function may be implemented by hardware, or may be implemented by hardware executing corresponding software. The hardware or the software includes one or more modules corresponding to the function.

According to a nineteenth aspect, a communication apparatus is provided, including a processor and a memory, where the memory is configured to store computer-executable instructions, and when the communication apparatus runs, the processor executes the computer-executable instructions stored in the memory, so that the communication apparatus performs the communication method in any one of the implementations of the fifteenth aspect.

According to a twentieth aspect, a communication apparatus is provided, including a processor, where the processor is configured to be coupled to a memory, and after reading instructions in the memory, perform the communication method in any one of the implementations of the fifteenth aspect based on the instructions.

According to a twenty-first aspect, an embodiment of this disclosure provides a communication apparatus, including a processor and an interface circuit, where the interface circuit is configured to receive code instructions, and transmit the code instructions to the processor, and the processor is configured to run the code instructions to perform the communication method in any one of the implementations of the fifteenth aspect.

According to a twenty-second aspect, an embodiment of this disclosure provides a communication apparatus, where the apparatus may be a chip system, the chip system includes a processor, and optionally, may further include a memory configured to implement a function of the method described in the fifteenth aspect. The chip system may include a chip, or include a chip and another discrete device.

According to a twenty-third aspect, a communication apparatus is provided, where the apparatus may be a circuit system, the circuit system includes a processing circuit, and the processing circuit is configured to perform the communication method in any one of the implementations of the fifteenth aspect.

According to a twenty-fourth aspect, an embodiment of this disclosure further provides a computer-readable storage medium, including instructions, where when the instructions are run on a computer, the computer is enabled to perform the method in the fifteenth aspect.

According to a twenty-fifth aspect, an embodiment of this disclosure further provides a computer program product, including instructions, where when the computer program product is run on a computer, the computer is enabled to perform the method in the fifteenth aspect.

BRIEF DESCRIPTION OF DRAWINGS

FIG. 8C and FIG. 8D are a schematic flowchart of a communication method according to an embodiment of this disclosure;

FIG. 8E and FIG. 8F are a schematic flowchart of a communication method according to an embodiment of this disclosure;

FIG. 8G and FIG. 8H are a schematic flowchart of a communication method according to an embodiment of this disclosure;

FIG. 9C and FIG. 9D are a schematic flowchart of a communication method according to an embodiment of this disclosure;

FIG. 9E and FIG. 9F are a schematic flowchart of a communication method according to an embodiment of this disclosure;

FIG. 9G and FIG. 9H are a schematic flowchart of a communication method according to an embodiment of this disclosure;

DESCRIPTION OF EMBODIMENTS

Figure 1:
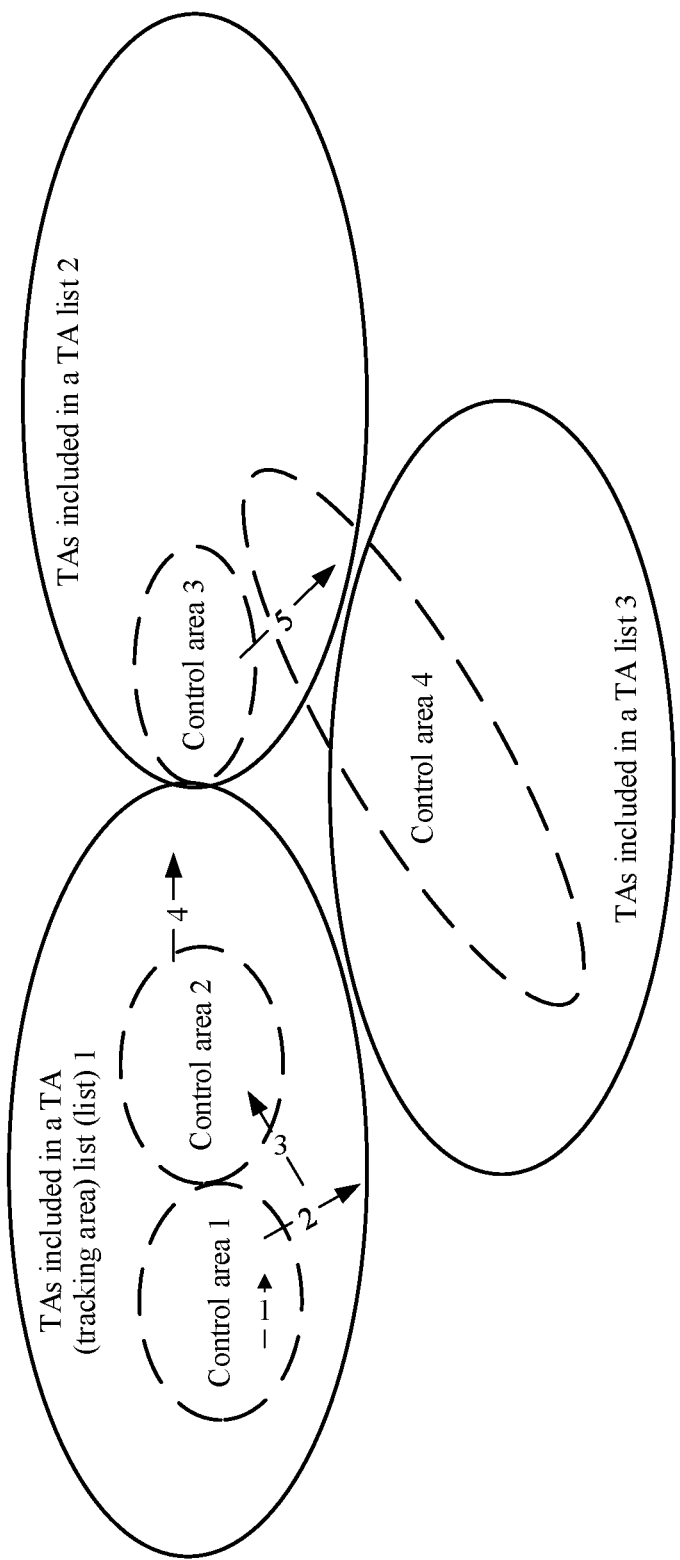
FIG. 1 is a schematic diagram of a scenario of area-based address management according to an embodiment of this disclosure.

In the specification and accompanying drawings of this disclosure, the terms "first", "second", and the like are intended to distinguish between different objects or distinguish between different processing on a same object, but do not indicate a particular order of the objects.

"At least one" means one or more.

"A plurality of" means two or more than two.

"And/or" describes an association relationship between associated objects, and represents that three relationships may exist. For example, A and/or B may represent the following cases: only A exists, both A and B exist, and only B exists, where A and B may be singular or plural.

The character "/" generally represents an "or" relationship between associated objects, for example, AB may represent A or B.

In addition, the terms "including", "having", and any other variant thereof in descriptions of this disclosure are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device.

It should be noted that, in embodiments of this disclosure, the term such as "example" or "for example" is used to represent giving an example, an illustration, or descriptions. Any embodiment or design scheme described as an "example" or "for example" in embodiments of this disclosure should not be explained as being more preferred or having more advantages than another embodiment or design scheme. Exactly, use of the word "example", "for example", or the like is intended to present a related concept in a specific manner.

"Of", "corresponding (relevant)", and "corresponding" in the specification and accompanying drawings of this disclosure may be interchangeably used sometimes. It should be noted that expressed meanings are consistent when differences are not emphasized.

That a network element A sends a message to a network element B may be that the network element A directly sends a message to the network element B, or may be that the network element A sends a message to the network element B by using another intermediate network element.

First, technical terms in the embodiments of this disclosure are described.

1. User Plane IP Address Allocation in 5G:

After a terminal is registered with a 5G core (5GC) network, the terminal needs to obtain a user plane IP address by using a PDU session establishment procedure, to establish a communication route with a data network (DN).

2. User Plane IP Address Allocation in 4G:

In LTE, after UE is registered with an Evolved Packet Core (EPC) network, the UE needs to obtain a user plane IP address by using a PDN connection establishment procedure, to establish a communication route with a data network (DN).

It should be noted that a PDN connection in the EPC and a PDU session in the 5GC may be understood as a same concept, and play a same role.

3. Area-Based User Plane IP Address Allocation and Update:

During LTE deployment, an EPC is required to allocate a user plane IP address to UE based on an area. Different user IP addresses may be allocated based on different areas. As shown in FIG. 1, an operator divides a network into many areas, and different user plane IP address resource pools are allocated based on different areas. When the UE moves between different areas, the EPC can re-allocate a user plane IP address to the UE. A user plane IP address re-allocation procedure includes the following. The EPC deletes a current PDN connection of the UE, and then indicates the UE to re-establish a PDN connection. The EPC allocates a new user plane IP address to the UE by using a PDN connection re-establishment procedure.

A network side may configure an IP control area (or a control area). When a terminal moves into the IP control area, the terminal needs to be re-registered with a core network device, or a PDU session of the terminal is deleted by a core network device, and the core network device indicates the terminal to re-establish a PDU session. Optionally, the core network device may re-allocate an IP address to the terminal by using a PDU session re-establishment procedure, to limit network access permission of the terminal.

The IP control area may include a partial area in a TA, or may include one or more TAs. For example, a control area 4 shown in FIG. 1 includes two TAs. A control area 1 is in a TA included in a TA list 1 (list1). When the UE moves based on step 1, 2, 3, or 4 shown in FIG. 1, the UE may cross an area. In this case, when the UE crosses an area, a 5G network device re-allocates an IP address to the UE. For another example, in FIG. 1, when the terminal enters a control area 2, a core network element configured to serve the control area 2 deletes an IP address re-allocated to the terminal. For another example, the terminal moves from a control area 3 to the control area 4, and a core network element configured to serve the control area 4 re-allocates an IP address to the terminal.

Similarly, during 5G network deployment, a function of allocating a user plane IP address based on an area and updating the user plane IP address when the UE crosses an area (that is, moves out of a control area or moves into a control area) is also required.

It should be noted that "a user moves from a specified area A to another specified area B" may be movement in terms of a physical location, or may be movement in terms of a non-physical location. For example, both a 4G network and a 5G network may be deployed at a location of the terminal. The location of the terminal may not be moved, and the terminal is served through fallback from 5G to the 4G network. The fallback may be triggered by using a voice service.

In a conventional cellular network, to determine that the terminal is reachable at any time, a TA-based mechanism is introduced. When the terminal performs registration or tracking area update (TAU), the core network device sends a TA list to the terminal. Generally, one TA list includes one or more TAs, and each TA includes a plurality of cells. Subsequently, if the terminal moves in a cell included in the TA list, the terminal does not need to perform TAU. In addition, after the terminal has a service, the core network device pages the terminal in an area in the TA list. On the contrary, if the terminal moves out of a cell included in the TA list, the terminal needs to perform TAU, so that the core network device learns of a TA in which the terminal is currently located.

4. Voice Solution in a 5G Network:

For voice over New Radio (VOLAR), an audio/video call service is provided by using a 5G network. In this implementation, a series of parameters need to be optimized.

For EPS fallback, in a possible implementation, the 5G network provides a voice service for a user in an EPS fallback manner. During EPS fallback, interworking between the 5G network and the 4G network is required to complete the voice service. Further, after UE is powered on, the UE may camp on the 5G network, and the UE may be registered with an IMS network, registered with the 5G network, and initiate a voice call to a 5G access network device. When determining that the voice service needs to be provided in an EPS fallback manner, the 5G access network device rejects a voice bearer establishment request, and initiates a 5G to 4G handover (HO) or redirection procedure, so that the UE falls back to an EPS. In addition, a voice dedicated bearer is established in an EPC, and voice and/or video service data is transmitted by using the voice dedicated bearer.

In the early stage of 5G network construction, to reuse an existing LTE network to a maximum degree, protect existing investment, and accelerate 5GC network construction, an operator generally provides an audio/video call service for a 5G terminal by using an EPS fallback technology.

Figure 2:
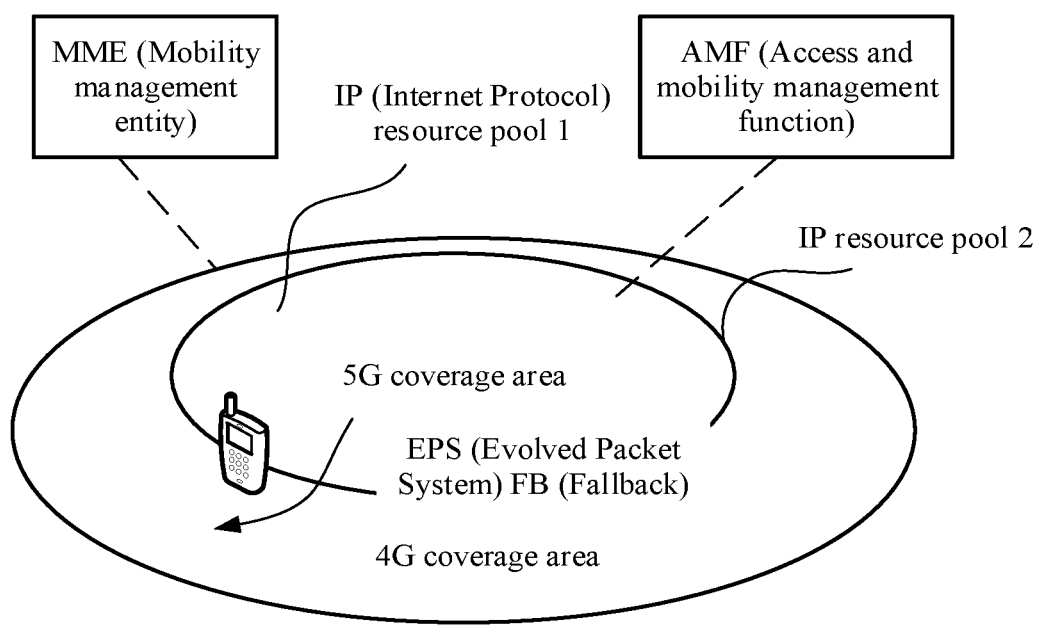
FIG. 2 is a schematic diagram of an EPS fallback scenario according to an embodiment of this disclosure.

As shown in FIG. 2, in a process in which a terminal moves from a 5G coverage area to a 4G coverage area, because the UE crosses an area, a network side deletes a PDU session of the UE in the 5G coverage area to release a current user plane IP address resource of the UE, and creates a PDN connection in the 4G coverage area for the UE to allocate a new user plane IP address to the UE in a PDN connection establishment process. In this time period, if the UE initiates a call or is called, because an audio/video (namely, voice and/or a video) service can be normally performed only after the PDN connection is established, and steps such as deleting an original PDU session and establishing a PDN connection need to take specified time, the audio/video service of the user may be interrupted. For example, a call signal can be received only after a specified delay, or a called party can be dialed only after a specified delay. For another example, a video can be downloaded or uploaded only after a specified delay.

Figure 3:
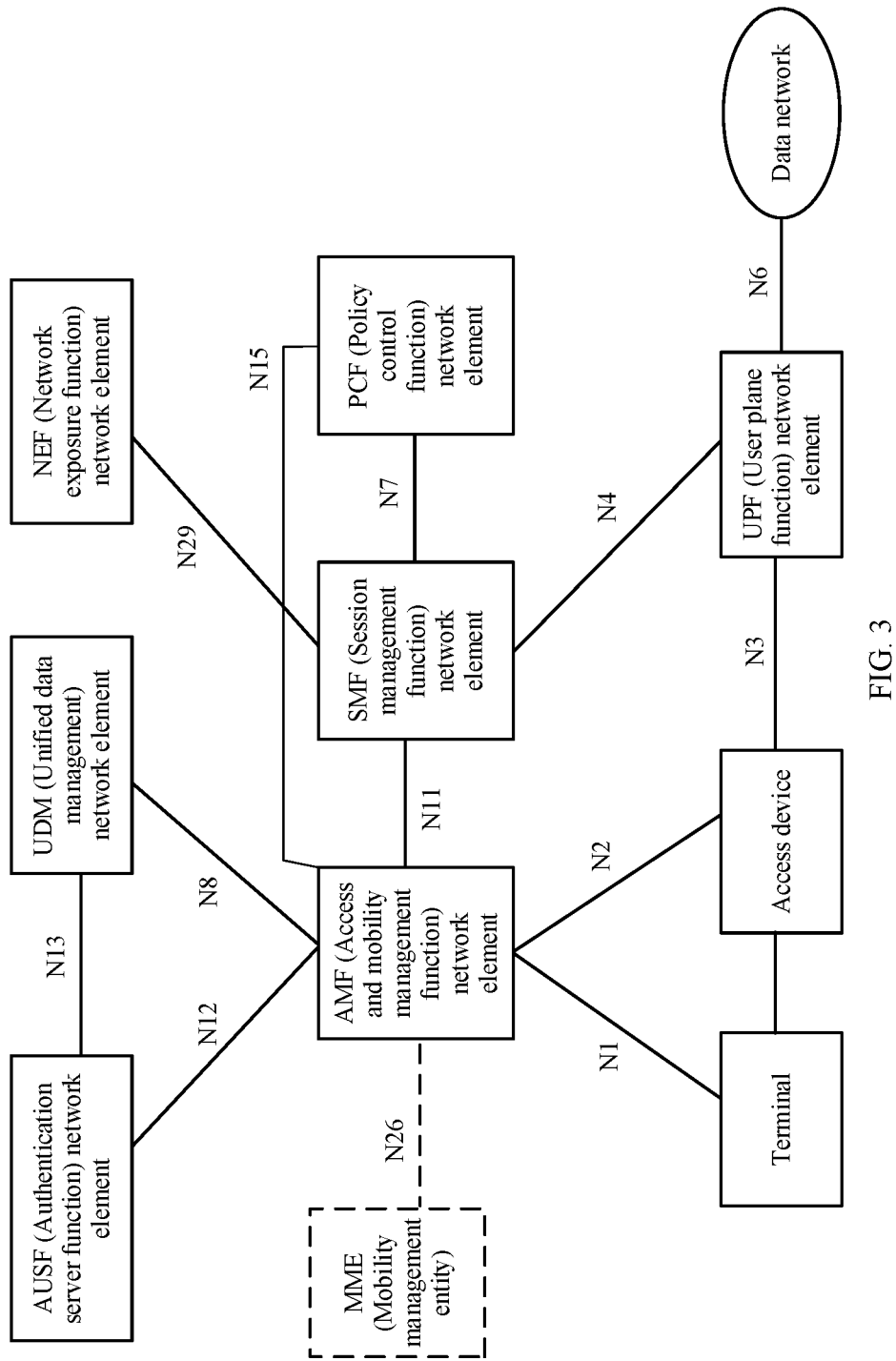
FIG. 3 is a schematic diagram of an architecture of a communication system according to an embodiment of this disclosure.

To resolve the foregoing technical problem, the embodiments of this disclosure provide a communication method. The method is applied to a scenario in which an IP address is managed based on an area and a terminal moves from a first preset area of a first network to a second preset area (the second preset area is a control area) of a second network. FIG. 3 shows an example of a network structure according to an embodiment of this disclosure. As shown in FIG. 3, the network architecture in this embodiment of this disclosure includes an existing 5G communication system (5GS). The 5GS includes an AMF network element, a SMF network element, a user plane function (UPF) network element, a unified data management (UDM) network element, a policy control function (PCF) network element, an authentication server function (AUSF) network element, a network exposure function (NEF) network element, and some network elements not shown in the figure, for example, a network function repository function (NRF) network element. This is not limited in this embodiment of this disclosure.

As shown in FIG. 3, in this embodiment of this disclosure, a terminal accesses the 5GS by using an access network device. The terminal communicates with the AMF network element by using a next generation network (N) 1 interface (N1). The access network device communicates with the AMF network element by using an N2 interface (N2). The access network device communicates with the UPF network element by using an N3 interface (N3). The AMF network element communicates with the SMF network element by using an N11 interface (N11). The AMF network element communicates with the UDM network element by using an N8 interface (N8). The AMF network element communicates with the AUSF network element by using an N12 interface (N12). The AMF network element communicates with the PCF network element by using an N15 interface (N15). The SMF network element communicates with the PCF network element by using an N7 interface (N7). The SMF network element communicates with the UPF network element by using an N4 interface (N4). The NEF network element communicates with the SMF network element by using an N29 interface (N29). The UPF network element accesses a data network (DN) by using an N6 interface (N6). The data network may be a network that provides a specified service, for example, the Internet and an enterprise dedicated network.

In addition, as shown in FIG. 3, to implement interworking (or interworking) between the 5GS and an EPS, the network architecture in this embodiment of this disclosure may further include an MME in the EPS. The MME communicates with the SMF network element by using an N26 interface (N26). Certainly, the network architecture in this embodiment of this disclosure may further include another network element in the EPS, for example, a network element or a device such as an evolved Universal Mobile Telecommunications System (UMTS) Territorial Radio Access Network (E-UTRAN) device, a PDN gateway user plane function (PGW-U) network element, a PDN gateway control plane function (PGW-C) network element, a policy and charging rules function (PCRF) network element, and a home subscriber server (HSS). This is not limited in this embodiment of this disclosure.

Figure 4:
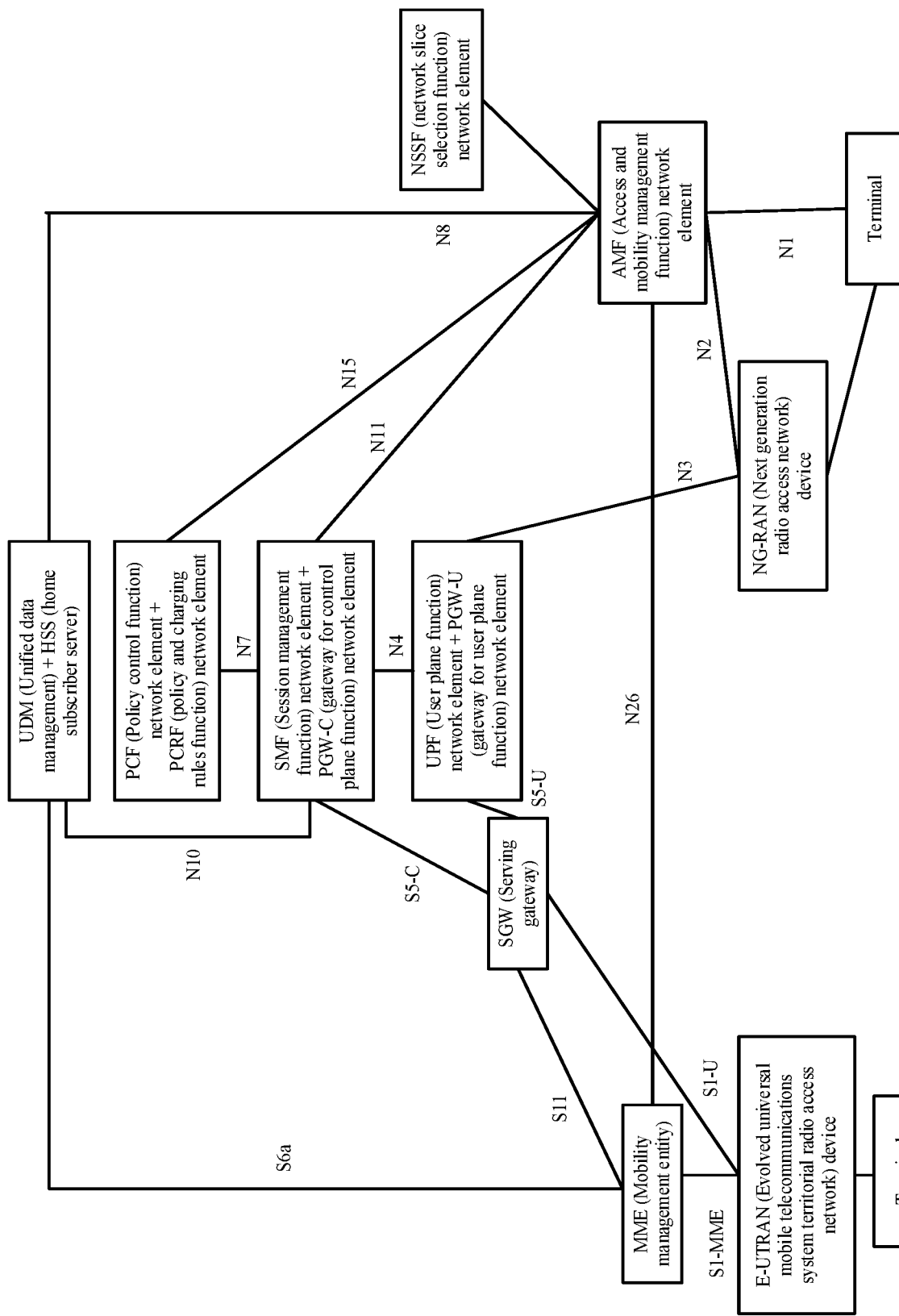
FIG. 4 is a schematic diagram of an architecture of a communication system according to an embodiment of this disclosure.

In a possible implementation, some network elements in the architecture for interworking between the 5GS and the EPS may be deployed through integration. For example, FIG. 4 is a schematic diagram of an existing architecture for interworking between a 5GS and an EPS. The 5GS and the EPS share a UPF network element+PGW-U network element, an SMF network element+PGW-C network element, a PCF network element+PCRF network element, and a UDM network element+HSS. Herein, "+" indicates integrated deployment, the UPF is a user plane function in the 5GS, the PGW-U is a gateway user plane function that is in the EPS and that corresponds to the UPF, the SMF is a SMF in the 5GS, the PGW-C is a gateway control plane function that is in the EPS and that corresponds to the SMF, the PCF is a policy control function in the 5GS, and the PCRF is a policy and charging rules function that is in the EPS and that corresponds to the PCF.

In addition, as shown in FIG. 4, the architecture for interworking between the 5GS and the EPS may further include an MME and a serving gateway (SGW) in the EPS. Optionally, the architecture for interworking between the 5GS and the EPS may further include a network slice selection function (NSSF) network element and some network elements not shown in the figure, for example, an NEF network element. This is not limited in this embodiment of this disclosure.

As shown in FIG. 4, in this embodiment of this disclosure, the terminal accesses the EPS by using the E-UTRAN device. The terminal accesses the 5GS by using a next generation radio access network (NG-RAN) device. The E-UTRAN device communicates with the MME by using an S1-MME interface. The E-UTRAN device communicates with the SGW by using an S1-U interface. The MME communicates with the SGW by using an S11 interface. The MME communicates with the UDM network element+HSS by using an S6a interface. The MME communicates with the AMF network element by using the N26 interface. The SGW communicates with the UPF network element+PGW-U network element by using an S5-U interface. The SGW communicates with the SMF network element+PGW-C network element by using an S5-C interface. The UPF network element+PGW-U network element communicates with the NG-RAN device by using the N3 interface. The UPF network element+PGW-U network element communicates with the SMF network element+PGW-C network element by using the N4 interface. The SMF network element+PGW-C network element communicates with the PCF network element+PCRF network element by using the N7 interface. The UDM network element+HSS communicates with the SMF network element+PGW-C network element by using an N10 interface. The UDM network element+HSS communicates with the AMF network element by using the N8 interface. The PCF network element+PCRF network element communicates with the AMF network element by using the N15 interface. The SMF network element+PGW-C network element communicates with the AMF network element by using the N11 interface. The AMF network element communicates with the NG-RAN device by using the N2 interface. The AMF network element communicates with the terminal by using the N1 interface.

It should be noted that FIG. 4 is only a schematic diagram of the existing architecture for interworking between the 5GS and the EPS. Certainly, the architecture for interworking between the 5GS and the EPS may be another architecture. This is not further limited in this embodiment.

It should be noted that names of each network element and an interface between the network elements in FIG. 3 or FIG. 4 are merely an example. In specific implementation, the names of each network element and the interface between the network elements may be other names. This is not further limited in this embodiment of this disclosure.

The following describes technical solutions in embodiments of this disclosure with reference to the accompanying drawings in embodiments of this disclosure.

A network architecture and a service scenario that are described in the embodiments of this disclosure are intended to more clearly describe the technical solutions of the embodiments of this disclosure, and do not constitute a limitation on the technical solutions provided in the embodiments of this disclosure. A person of ordinary skill in the art may learn that, as the network architecture evolves and a new service scenario appears, the technical solutions provided in the embodiments of this disclosure are also applicable to a similar technical problem.

Figure 5:
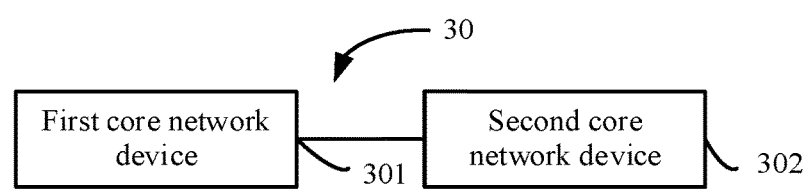
FIG. 5 is a schematic diagram of an architecture of a communication system according to an embodiment of this disclosure.

FIG. 5 shows a communication system 30 according to an embodiment of this disclosure. The communication system 30 includes a first core network device 301 and a second core network device 302.

The first core network device 301 is located in a first network. The first network may be, for example, a 5GS or another network. The first core network device 301 is configured to determine that EPS fallback of a terminal is triggered, and send first information to the second core network device in a second network. The first information includes a first identifier or first indication information. The first identifier is used to identify a first dedicated bearer. The first dedicated bearer includes a voice dedicated bearer and/or a video dedicated bearer. The first indication information is used to indicate that the terminal falls back to the second network by using an EPS fallback procedure. A RAT of the first network is different from a RAT of the second network.

The second core network device 302 is configured to receive the first information from the first core network device in the first network, and reserve, based on the first information, a PDN connection corresponding to the terminal.

Optionally, an EPS fallback system provided in this embodiment of this disclosure may be applied to the network architecture shown in FIG. 3 or FIG. 4, or may be applied to another network architecture for area-based IP address management. This is not limited in this embodiment of this disclosure.

For example, if the EPS fallback system provided in this embodiment of this disclosure is applied to the network architecture shown in FIG. 3 or FIG. 4, a network element or an entity corresponding to the first core network device may be the foregoing SMF or AMF network element, and a network element or an entity corresponding to the foregoing second core network device may be the foregoing MME network element. For a connection relationship between the SMF, the AMF, and the MME, refer to FIG. 3 or FIG. 4.

Optionally, the terminal in this embodiment of this disclosure may include various handheld devices, vehicle-mounted devices, wearable devices, or computing devices that have a wireless communication function, or another processing device connected to a wireless modem, or may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, UE, a mobile station (MS), a terminal device, relay user equipment, or the like. The relay user equipment may be, for example, a 5G residential gateway (RG). For ease of description, in this disclosure, the devices mentioned above are collectively referred to as terminals.

Optionally, an access network device in this embodiment of this disclosure is a device that accesses a core network, for example, may be an NG-RAN device, an E-UTRAN device, a base station, a broadband network gateway (BNG), an aggregation switch, or a non-3rd Generation Partnership Project (3GPP) access network device. There may be various forms of base stations, for example, a macro base station, a micro base station (or a small cell), a relay station, and an access point.

Optionally, the first core network device and the second core network device in this embodiment of this disclosure may be implemented by one device, or may be implemented by a plurality of devices together, or may be implemented as a functional module in one or more devices. This is not further limited in this embodiment of this disclosure. It may be understood that the function may be a network component in a hardware device, or may be a software function running on dedicated hardware or a virtualization function instantiated on a platform (such as a cloud platform).

Figure 6:
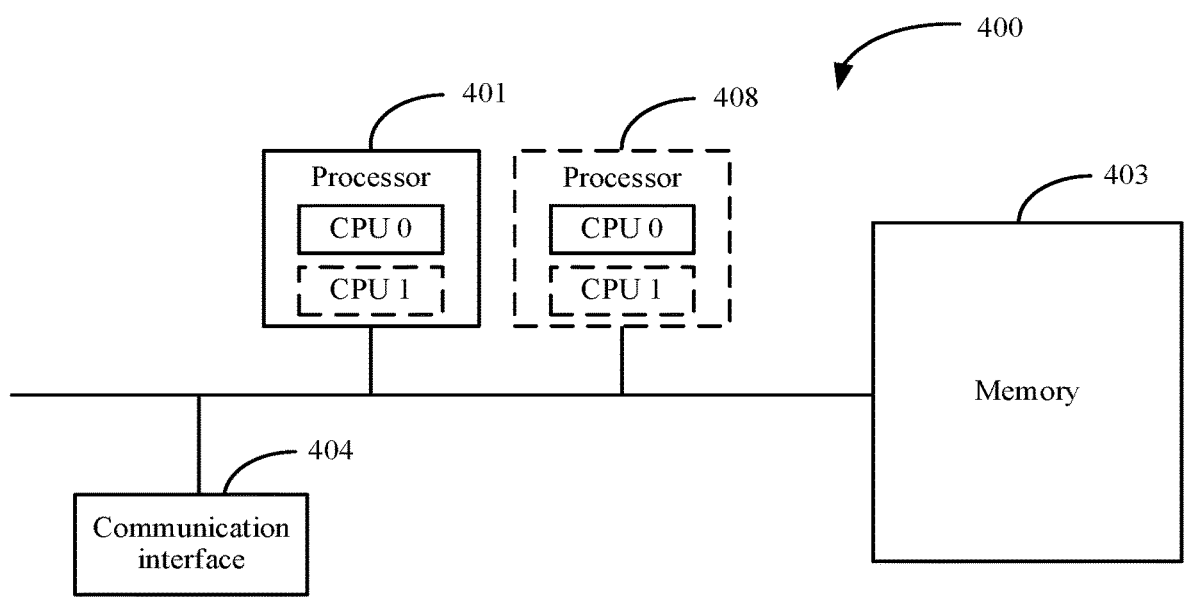
FIG. 6 is a schematic diagram of a structure of a communication device according to an embodiment of this disclosure.

For example, the first core network device and the second core network device in this embodiment of this disclosure may be implemented by using a communication device in FIG. 6. FIG. 6 is a schematic diagram of a structure of a communication device according to an embodiment of this disclosure. A communication device 400 includes at least one processor 401, a memory 403, and at least one communication interface 404.

The processor 401 may be a general-purpose central processing unit (CPU), a microprocessor, an application-specific integrated circuit (ASIC), or one or more integrated circuits configured to control program execution of the solutions in this disclosure.

A channel may be included between the components, and is used to transmit information between the foregoing components.

The communication interface 404 uses any apparatus such as a transceiver, and is configured to communicate with another device or a communication network such as the Ethernet, a radio access network (RAN), or a wireless local area network (WLAN).

The memory 403 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another optical disk storage, an optical disc storage (including a compact disc, a laser disc, an optical disc, a DIGITAL VERSATILE DISC (DVD), a BLU-RAY disc, or the like), a disk storage medium or another magnetic storage device, or any other medium that can be used to carry or store expected program code in a form of instructions or a data structure and that can be accessed by a computer. The memory 403 is not limited thereto. The memory may exist independently, and is connected to the processor through the communication line. Alternatively, the memory may be integrated with the processor.

The memory 403 is configured to store computer-executable instructions for performing the solutions in this disclosure, and the processor 401 controls execution. The processor 401 is configured to execute the computer-executable instructions stored in the memory 403, to implement a communication method provided in the following embodiment of this disclosure.

Optionally, computer-executable instructions in this embodiment of this disclosure may also be referred to as application program code. This is not limited in this embodiment of this disclosure.

During specific implementation, in an embodiment, the processor 401 may include one or more CPUs such as a CPU 0 and a CPU 1 in FIG. 6.

In specific implementation, in an embodiment, the communication device 400 may include a plurality of processors, for example, the processor 401 and a processor 408 in FIG. 6. Each of the processors may be a single-core (single-CPU) processor or a multi-core (multi-CPU) processor. Herein, the processor may be one or more devices, circuits, and/or processing cores configured to process data (for example, computer program instructions).

The communication device 400 may be a general-purpose device or a dedicated device. In specific implementation, the communication device 400 may be any device that has a structure similar to that in FIG. 6. A type of the communication device 400 is not limited in this embodiment of this disclosure.

With reference to FIG. 1 to FIG. 6, the following describes the communication method provided in the embodiments of this disclosure.

It should be noted that names of messages between network elements, names of parameters in the messages, or the like in the following embodiments of this disclosure are merely examples, and there may be other names during specific implementation. This is not limited in embodiments of this disclosure.

Figure 7:
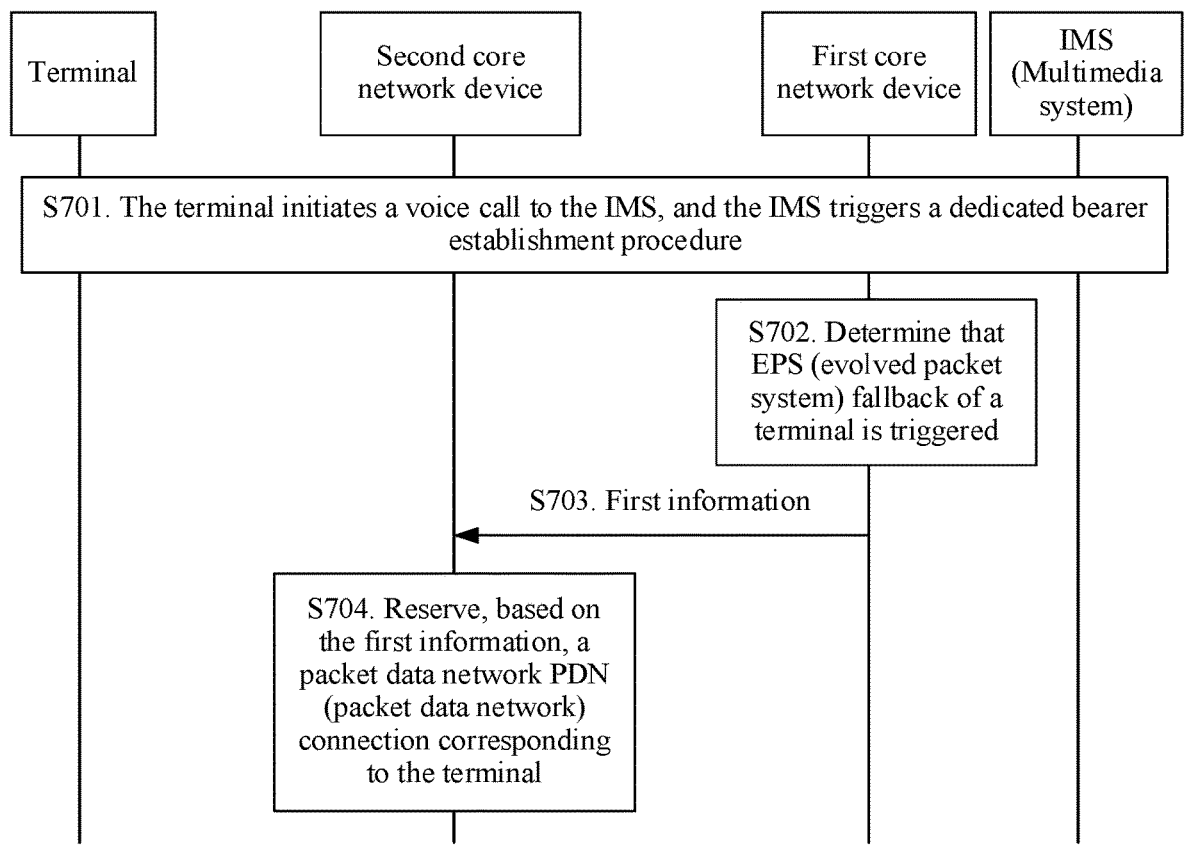
FIG. 7 is a schematic flowchart of a communication method according to an embodiment of this disclosure.

First, an example in which the EPS fallback system shown in FIG. 5 is applied to the network architecture shown in FIG. 3 or FIG. 4 and the terminal initiates a voice call is used. As shown in FIG. 7, a communication method provided in an embodiment of this disclosure includes the following steps.

S701. A terminal initiates a service request to an IMS, and the IMS triggers a dedicated bearer establishment procedure.

The communication method provided in this embodiment of this disclosure is applied to a scenario in which the terminal moves from a first preset area of a first network to a second preset area of a second network. The first preset area may be a control area, or may not be a control area. The second preset area is a control area.

The first network is, for example, but is not limited to a 5G network, and the first preset area may be a control area, that is, when the terminal enters the first preset area of the first network, the terminal needs to be re-registered with a core network device, or a PDU session of the terminal is deleted by a core network device, and the core network device indicates the terminal to re-establish a PDU session. For example, in FIG. 1, when the terminal enters a preset area 2, the terminal needs to be re-registered with the core network device, or a PDU session of the terminal is deleted by the core network device, and the core network device indicates the terminal to re-establish a PDU session, and may allocate an IP address to the terminal. Entering the preset area 2 may be entering the area by using step 3 in FIG. 1, that is, the terminal does not enter the preset area 2 from another preset area. Alternatively, entering the preset area 2 may be entering the area from another preset area, for example, entering the preset area 2 from a preset area 1.

In some other embodiments, the first preset area may not be a control area, that is, when the terminal enters the first preset area of the first network, the terminal does not need to be re-registered with a core network device, or a PDU session of the terminal is not deleted by a core network device.

The second network is, for example, but is not limited to a 4G network. In some embodiments, the second preset area is a control area, that is, when the terminal enters the second control area of the second network, the terminal needs to be re-registered with a core network device, or a PDN connection corresponding to the terminal is deleted by a core network device, and the core network device indicates the terminal to re-establish a PDN connection.

For example, as shown in FIG. 2, in the following embodiments, the communication method in this embodiment of this disclosure is mainly described by using an example in which the terminal enters a 4G coverage area (namely, the second preset area, where the second preset area is, for example, a control area) from a 5G coverage area (namely, the first preset area, where the first preset area is, for example, a non-control area or a control area). Unified description is provided herein.

The service request may be an audio/video service request, for example, may be a calling request in a voice service.

It is easy to understand that, after the terminal is powered on, the terminal may camp on the 5G network, and may establish a PDU session by using a 5GC, to transmit service data by using the PDU session. When the IMS receives the service request from the terminal, the IMS identifies that the user is making a call, and the IMS triggers the dedicated bearer establishment procedure. Further, the IMS interacts with the 5G network in which the terminal is located, to notify a network element in the 5G network to establish, for the terminal, a quality of service (QoS) flow used to carry the service data.

In the 5G network, one PDU session may be associated with one or more QoS flows. Each QoS flow corresponds to one QoS class identifier (QCI). A QCI corresponding to a QoS flow is related to a factor such as a QoS requirement of the QoS flow. For example, a QCI corresponding to a QoS flow used to carry voice service data is 1, and a QCI corresponding to a QoS flow used to carry video service data is 2.

For a specific signaling procedure between the IMS system and the network element in the 5G network and a signaling procedure between 5G network elements in S701, refer to a conventional technology. Details are not described herein again. For example, the IMS system may send a fourth message to a PCF, the PCF sends a fifth message to an SMF, and the SMF triggers the dedicated bearer establishment procedure. The SMF may be an integrated SMF, and supports interworking with an EPS without changing an anchor.

An example in which the terminal initiates a voice service is used, and S701 may include the following steps.

1. The PCF sends a session policy control update notification request (Npcf_SMPolicyControl_UpdateNotify Request) to the SMF to notify the SMF to create a QoS flow used to carry voice service data.
2. The SMF invokes a session policy control update notification response (Npcf_SMPolicyControl_UpdateNotify Response) service to feed back a response message to the PCF.
3. The SMF invokes an N1/N2 communication message transfer (Namf_Communication_N1N2MessageTransfer) service to send, to the AMF, a message that carries session management (SM) information.
4. The AMF sends an N1/N2 communication message transfer response (Namf_Communication_N1N2MessageTransfer Response) to the SMF.
5. The AMF sends an N2 session request (N2 PDU session Request) message to an NG RAN device to notify the NG RAN to allocate a resource to the QoS flow.
6. The NG RAN device rejects a voice QoS flow, and feeds back an N2 session response (N2 session Response) to the AMF.

It should be understood that, if the NG-RAN determines to provide a voice service for the terminal through EPS FB instead of VoNR, the NG-RAN refuses to establish the QoS flow.

The N2 session response message carries a cause value "IMS voice EPS fallback or radio access technology fallback triggered (IMS Voice EPS Fallback or RAT Fallback Triggered)".

7. The AMF sends an update session context request (Nsmf_PDUsession_UpdateSMContext Request) message to the SMF.

The message carries the cause value (or a first cause value) "IMS voice EPS fallback or RAT fallback triggered".

S702. A first core network device determines that EPS fallback of the terminal is triggered.

The first core network device is located in the first network. The first network may be, for example, but is not limited to a 5GS. A RAT of the first network is, for example, but is not limited to NR.

In a possible implementation, the first core network device is the SMF shown in FIG. 3 or FIG. 4. In this case, in a possible implementation, a specific implementation of S702 is as follows. The SMF determines, based on the Nsmf_PDUsession_UpdateSMContext Request message received from the AMF in S701, whether EPS fallback of the terminal is triggered. If the Nsmf_PDUsession_UpdateSMContext Request message carries the cause value "IMS voice EPS fallback or RAT fallback triggered", the SMF determines that EPS fallback is triggered, and the NG-RAN device is to initiate an EPS fallback procedure.

In a possible implementation, the first core network device is the AMF shown in FIG. 3 or FIG. 4. In this case, in a possible implementation, S702 is implemented as follows. The AMF parses the N2 session response message received from the NG-RAN device in S701, and determines, based on a parsing result, whether EPS fallback of the terminal is triggered. If the N2 session response message carries the cause value "IMS voice EPS fallback or RAT fallback triggered", the AMF determines that EPS fallback is triggered.

S703. The first core network device sends first information to a second core network device.

Correspondingly, the second core network device receives the first information from the first core network device.

The second core network device is located in the second network. The second network may be, for example, but is not limited to an EPS. The second core network device may be, for example, but is not limited to the MME shown in FIG. 3 or FIG. 4.

The RAT of the first network is different from a RAT of the second network. The RAT of the second network is, for example, but is not limited to LTE.

The first information includes a first identifier or first indication information.

The first identifier is used to identify a first dedicated bearer corresponding to the terminal. The first dedicated bearer includes a voice dedicated bearer and/or a video dedicated bearer. In a network architecture that supports interworking between the 5GS and the EPS, a PDU session in the 5GS may be migrated to the EPS, that is, a PDN connection corresponding to the PDU session may be established in the EPS. Accordingly, a QoS flow of the PDU session is mapped as an EPS bearer of the PDN connection. The voice dedicated bearer is an EPS dedicated bearer. The SMF may create a QoS flow, and map the QoS flow in the 5GS as the first dedicated bearer in the EPS.

The first indication information is used to indicate that the terminal falls back to the second network by using an EPS fallback procedure. The RAT of the first network is different from the RAT of the second network. The first identifier may be, for example, but is not limited to a QCI of the first dedicated bearer. Optionally, the first indication information is denoted as an EPS fallback indicator. The EPS fallback indicator may be a flag, may be a cause value, or may be in another form. This is not limited in this embodiment of this disclosure.

In this embodiment of this disclosure, the first core network device may indicate, to the second core network device by using the first information, that EPS fallback of the terminal is triggered. The first information may be the first identifier or the first indication information. In other words, this embodiment of this disclosure provides at least two manners to indicate that EPS fallback of the terminal is triggered. The following separately describes the two manners.

Manner 1: The first core network device (AMF or SMF) sends the first identifier to the second core network device (MME), to implicitly indicate that the terminal falls back to the second network (such as an EPS) by using the EPS fallback procedure.

In a possible implementation, in S702, the AMF determines that EPS fallback of the terminal is triggered. In addition, the AMF obtains information about the first dedicated bearer.

The information about the first dedicated bearer includes but is not limited to an EBI of the first dedicated bearer and the foregoing first identifier. An example in which the first dedicated bearer includes a voice dedicated bearer and a video dedicated bearer is used. The information about the first dedicated bearer includes an EBI of the voice dedicated bearer, an EBI of the video dedicated bearer, a QCI (which is generally 1) of the voice dedicated bearer, and a QCI (which is generally 2) of the video dedicated bearer.

It should be noted that, that the AMF obtains information about the first dedicated bearer may be that the AMF locally generates the information about the first dedicated bearer, or may be that the SMF generates the information about the first dedicated bearer, and the AMF obtains the information about the first dedicated bearer from the SMF. Then, in S703, the AMF sends the first identifier to the MME. For example, the first dedicated bearer includes a voice dedicated bearer and a video dedicated bearer. The first identifier is a QCI that is used to identify the voice dedicated bearer and that is equal to 1 and a QCI that is used to identify the video dedicated bearer and that is equal to 2. In this way, the AMF can implicitly notify, by using the first identifier, the MME that the terminal is falling back to the EPS by using the EPS fallback procedure. In this way, the MME does not delete a current PDN connection of the terminal, to avoid call interruption of the terminal.

Optionally, that the AMF sends the first identifier to the MME may be implemented as follows. The AMF sends a user context of the terminal to the MME, where the user context includes the first identifier.

Alternatively, in a possible implementation, that the AMF sends the first identifier to the MME may be implemented as follows. The AMF sends a session context of the terminal to the MME, where the session context includes the first identifier.

In another possible implementation, in S702, the SMF determines that EPS fallback of the terminal is triggered. In addition, the SMF obtains information about the first dedicated bearer. In a possible implementation, that the SMF obtains information about the first dedicated bearer is further implemented as follows. The SMF generates the information about the first dedicated bearer. Then, in S703, the SMF sends the first identifier to the MME.

Optionally, that the SMF sends the first identifier to the MME may be implemented as follows. The SMF sends a session context (e.g., session management (SM) context) to the AMF, where the session context includes the first identifier. Then, the AMF sends the first identifier to the MME.

Optionally, that the AMF sends the first identifier to the MME may be implemented as follows. The AMF sends a user context of the terminal to the MME, where the user context includes the first identifier.

Alternatively, in a possible implementation, that the AMF sends the first identifier to the MME may be implemented as follows. The AMF sends a session context of the terminal to the MME, where the session context includes the first identifier.

The user context includes a session context, a mobility management (MM) context, a security context, and the like.

Optionally, in the 5GS, the AMF is responsible for allocation and storing the MM context, and the MM context includes a terminal identifier, for example, a subscription permanent identifier (SUPI) and a generic public subscription identifier (GPSI).

In the EPS, the MME is responsible for allocating and storing the MM context, and the MM context includes a terminal identifier, for example, an international mobile subscriber identity (IMSI) (corresponding to the SUPI in 5G) and a mobile subscriber international integrated services digital network number (MSISDN) (corresponding to the GPSI in 5G, namely, a mobile number).

Therefore, the AMF includes a user identifier only into the mobility management context instead of the session management context, to transfer the user identifier to the MME.

Optionally, that the SMF obtains information about the first dedicated bearer may be that the SMF obtains the information about the first dedicated bearer based on information obtained from another network element and/or local information.

Optionally, the SMF obtains the identifier (for example, a QCI) in the information about the first dedicated bearer based on some information obtained from the PCF and/or local information.

Optionally, the SMF obtains, based on some information obtained from the AMF and/or local information, the EBI included in the information about the first dedicated bearer. Further, the SMF may send a first message to the AMF, where the first message is used to request the AMF to allocate the EBI to the first dedicated bearer, and receives the EBI from the AMF. In this way, after receiving the EBI allocated by the AMF to the first dedicated bearer, for example, an EBI that is allocated to the voice dedicated bearer and that is equal to 7 and an EBI that is allocated to the video dedicated bearer and that is equal to 9, the SMF generates the information about the first dedicated bearer. For example, the generated information about the first dedicated bearer includes the EBI that is of the voice dedicated bearer and that is equal to 7, the EBI that is of the video dedicated bearer and that is equal to 9, the QCI that is of the voice dedicated bearer and that is equal to 1, and the QCI that is of the video dedicated bearer and that is equal to 2.

Optionally, the SMF may send a second message to the MME, and receive a response of the second message from the MME. The second message is used to request to delete the first dedicated bearer. The response of the second message is used to indicate that the first dedicated bearer is deleted. In this way, the MME may release a resource related to the first dedicated bearer.

Manner 2: The first core network device (SMF or AMF) sends the first indication information to the second core network device (MME), where the first indication information is used to explicitly indicate that the terminal falls back to the second network by using the EPS fallback procedure.

In a possible implementation, in S702, the AMF determines that EPS fallback of the terminal is triggered. In this case, S703 may be implemented as follows. The AMF sends the first indication information to the MME. For example, the AMF sends, to the MME, a flag used to indicate that the terminal falls back to the second network by using the EPS fallback procedure.

Optionally, that the AMF sends the first indication information to the MME may be implemented as follows. The AMF sends a user context of the terminal to the MME, where the user context includes the first indication information.

Alternatively, optionally, that the AMF sends the first identifier to the MME may be implemented as follows. The AMF sends a session context of the terminal to the MME, where the session context includes the first indication information.

In another possible implementation, in S702, the SMF determines that EPS fallback of the terminal is triggered. In this case, S703 may be implemented as follows. The SMF sends the first indication information to the MME by using the AMF, that is, the SMF first sends the first indication information to the AMF, and then the AMF sends the first indication information to the MME.

Optionally, that the SMF sends the first indication information to the MME may be implemented as follows. The SMF sends a session context to the AMF, where the session context includes the first indication information, and then the AMF sends the first indication information to the MME.

Optionally, that the AMF sends the first indication information to the MME may be implemented as follows. The AMF sends a user context of the terminal to the MME, where the user context includes the first indication information.

Alternatively, optionally, that the AMF sends the first identifier to the MME may be implemented as follows. The AMF sends a session context of the terminal to the MME, where the session context includes the first indication information.

S704. The second core network device reserves, based on the first information, a PDN connection corresponding to the terminal.

Corresponding to the foregoing Manner 1, the MME can infer, based on the first identifier obtained from the AMF, namely, the identifier of the first dedicated bearer, that EPS fallback of the terminal is triggered. Therefore, to prevent an audio/video service of the terminal from being interrupted, the MME reserves the PDN connection corresponding to the terminal, so that a voice dedicated bearer and/or a video dedicated bearer can be established based on the reserved PDN connection, to carry voice and/or video service data of the terminal.

Corresponding to the foregoing Manner 2, the MME can learn, based on the first indication information obtained from the AMF, that EPS fallback of the terminal is triggered. In this case, the MME reserves the PDN connection corresponding to the terminal, so that a voice dedicated bearer and/or a video dedicated bearer can be established based on the reserved PDN connection, to carry voice and/or video service data of the terminal.

In the conventional technology, when the terminal crosses an area, for example, enters the second preset area, the MME deletes a current PDN connection of the terminal, and re-establishes a PDN connection for the terminal. Consequently, the terminal is temporarily disconnected. Different from the conventional technology, in the communication method provided in this embodiment of this disclosure, the first core network device in the first network can perceive that EPS fallback is triggered, and send the first information to the second core network device in the second network. In this way, the second core network device can learn that EPS fallback is triggered. In this way, even if a scenario in which the terminal moves from the first preset area of the first network to the second preset area of the second network (for example, the second preset area is a control area) exists, the second core network device does not delete an audio/video PDN connection, namely, an IMS PDN connection, of the terminal, to reduce a probability that an audio/video service is interrupted when the terminal crosses an area.

The following describes in detail the communication method in this embodiment of this disclosure based on a specific scenario.

In some embodiments, the terminal falls back from the 5GS to the EPS in a handover manner. The SMF determines whether the EPS of the terminal is triggered, and the SMF sends the first identifier to the MME by using the AMF, to implicitly indicate that the terminal falls back to the EPS by using the EPS fallback procedure. The MME establishes a second dedicated bearer, where the second dedicated bearer is used to carry service data. In this case, referring to FIG. 8A and FIG. 8B, a communication method in an embodiment of this disclosure includes the following steps.

S801a. A terminal initiates a service request to an IMS, and the IMS triggers a dedicated bearer establishment procedure.

For specific implementation of S801a, refer to the foregoing S701.

S802a. An SMF determines that EPS fallback of the terminal is triggered.

For specific implementation of S802a, refer to the foregoing S702.

S803a. The SMF obtains information about a first dedicated bearer.

Further, the SMF creates a QoS flow, where the QoS flow in a 5GS may be mapped as the first dedicated bearer in an EPS, and obtains the information about the first dedicated bearer.

The information about the first dedicated bearer includes one or a combination of the following plurality of items: an EBI, a first identifier (for example, a QCI of a voice dedicated bearer and/or a QCI of a video dedicated bearer), an EPS bearer granularity traffic flow template (EPS bearer traffic flow template), a serving gateway S1 interface IP address and tunnel endpoint identifier (TEID) for a user plane, a PDN gateway S5 interface IP address and TEID for a user plane (PGW S5 IP Address and TEID for user plane), an allocation/retention priority, a maximum bit rate for uplink, a maximum bit rate for downlink, a maximum guaranteed bit rate for uplink, and a maximum guaranteed bit rate for downlink.

In a possible implementation, in the foregoing procedure, the SMF obtains some information from another network element, and generates the information about the first dedicated bearer based on local information. For example, the SMF generates partial information about the first dedicated bearer based on some information received from a PCF and the local information, for example, a QCI. The SMF generates partial information about the first dedicated bearer based on some information received from an AMF and the local information, for example, an EBI.

Optionally, S803a may include the following steps S803a1 and S803a2.

S803a1. The SMF sends a first message to the AMF.

Correspondingly, the AMF receives the first message from the SMF.

The first message is used to request the AMF to allocate an EBI to the first dedicated bearer.

In a possible implementation, the SMF invokes an EBI assignment request (Namf_Communication_EBIAssignment Request) service to send the first message to the AMF.

S803a2. The AMF sends a response of the first message to the SMF.

Correspondingly, the SMF receives the response of the first message from the AMF.

In a possible implementation, the AMF returns an EBI assignment response (Namf_Communication_EBIAssignment Response) to send the response of the first message to the SMF. The response of the first message includes the EBI of the first dedicated bearer.

For example, the AMF allocates, to the first dedicated bearer, an EBI that is equal to 7, and sends the EBI to the SMF.

Generally, in a conventional technology, after receiving a first cause value, the SMF does not create the QoS flow, and therefore does not map the QoS flow in the 5GS as the first dedicated bearer in the EPS. In the communication method provided in this embodiment of this disclosure, the SMF can obtain the information about the first dedicated bearer, where the information about the first dedicated bearer includes the first identifier. In this way, in a subsequent procedure, an MME can obtain the first identifier from the SMF, to learn that the terminal falls back to the EPS by using an EPS fallback procedure. Therefore, to avoid affecting a service of the terminal, the MME reserves a PDN connection corresponding to the terminal.

S804a. An NG-RAN device sends a handover required message to the AMF.

Correspondingly, the AMF receives the handover required message from the NG-RAN device.

It should be understood that an identifier of a neighboring EPS access network device (such as an eNB) and a tracking area identity of the neighboring EPS access network device may be configured on the NG-RAN device.

The NG-RAN device initiates a 5GS to EPS handover procedure. The handover required message carries a handover type, a target area identity, and a target access network device identifier. The handover type is "5GS to EPS". The target area identity is a target TAI of an area to which the terminal is to be handed over. If an EPS fallback procedure exists, the target tracking area identity herein is a 4G TAI. The target TAI may be used to query and select an MIME. The target access network device identifier is an identifier of an access network device (such as a 4G base station) to which the terminal is to be handed over. If EPS fallback exists, the target access network device identifier is a target eNodeB ID.

Based on the handover procedure, the terminal falls back from the 5GS to the EPS, to perform a voice service in a 4G network.

S805a. The AMF sends a session context request to the SMF.

Correspondingly, the SMF receives the session context request from the AMF.

Optionally, the session context request includes a session identifier, for example, an EBI and a linked EBI (LBI). The EBI is used to identify a bearer, and the LBI is used to identify a PDN connection.

Generally, if EBI=LBI, it indicates that the bearer is a default bearer of the PDN connection, and one PDN connection has only one default bearer. Therefore, it may be considered that the LBI is used to identify a PDN connection.

It should be understood that, after receiving the handover required message from the NG-RAN device, the AMF determines, based on the handover type in the handover required message, that the terminal needs to be handed over to the 4G network. In this case, the AMF sends the session context request to the SMF, to request the SMF to feed back a session context of the terminal.

In a possible implementation, the AMF invokes a context request (Nsmf_PDUsession_ContextRequest) service of the SMF to send the session context request to the SMF.

S806a. The SMF sends a session context response to the AMF.

Correspondingly, the AMF receives the session context response from the SMF.

The session context response includes a session context of the terminal, the session context includes the information about the first dedicated bearer, and the information about the first dedicated bearer includes the first identifier. For example, the session context includes an identifier QCI that is of the voice dedicated bearer and that is equal to 1.

In a possible implementation, the SMF feeds back the context response (Nsmf_PDUSession_Context Response).

S807a. The AMF sends the first identifier to the MME.

Correspondingly, the MME receives the first identifier from the AMF.

The AMF selects an MME by querying a domain name server (DNS) based on the target area identity in the handover required message obtained in the foregoing step, and sends a forward relocation request message to the selected MME. The message carries a user context of the terminal, the user context includes the information about the first dedicated bearer, and the information about the first dedicated bearer includes the first identifier. For example, the user context includes the QCI that is of the voice dedicated bearer and that is equal to 1. The user context may be a session context or another type of context such as an MM context or a security context.

Optionally, the user context further includes the target access network device identifier such as an eNB ID existing after the terminal is handed over. In this way, the MME knows a 4G eNB to which the terminal is to access. The MME may send a handover request to the eNB, to request the eNB to allocate a resource to the terminal in advance.

(Optional) S808a. The MME allocates second indication information to the terminal based on the first identifier.

The second indication information is used to indicate that the terminal is falling back to the EPS by using the EPS fallback procedure.

After receiving the forward relocation request message, the MME finds that the QCI included in the session context carried in the message is equal to 1. In this case, the MME can determine that the QCI equal to 1 corresponds to the voice dedicated bearer. In this case, the MME considers that the terminal is performing a voice service, or the corresponding terminal is to perform a voice service. For example, the terminal may just initiate a call and the voice is not answered. In a possible implementation, the MME allocates the second indication information to the terminal, to indicate that the terminal is performing a voice service or is to perform a voice service. Subsequently, the MME may determine, based on the second indication information, that a current voice PDN connection of the terminal is not allowed to delete, to avoid affecting the voice service of the terminal.

The second indication information may be flexibly set based on a policy of the MME, for example, may be a preconfigured flag and a character string. Specific implementation of the second indication information is not limited in this embodiment of this disclosure.

It should be noted that step S810a is an optional step. In other words, the MME may not allocate the second indication information to the terminal. In this implementation, subsequently, the MME determines, based on the first identifier, not to delete the current voice PDN connection of the terminal.

S809a. 5GS to EPS handover procedure.

For specific implementation of S809a, refer to the conventional technology. Based on the handover procedure, the terminal falls back from the 5GS to the EPS, to perform a voice service in the 4G network.

In some other embodiments, in the handover procedure, the SMF receives a modify bearer request to learn that the terminal already falls back to the EPS, and the SMF may send a modify bearer response to the MME. The modify bearer response may carry the first identifier.

S810a. The SMF sends a create bearer request to the MME.

It is easy to understand that, when the terminal is already handed over to the 4G network, the SMF sends the create bearer request. The create bearer request is used to request the MME to create a voice dedicated bearer and/or a video dedicated bearer, so that voice and/or video call service data are/is transmitted by using the created voice dedicated bearer and/or the created video dedicated bearer.

Optionally, the create bearer request includes one or more pieces of the following information: an identifier and a QCI of the voice dedicated bearer and/or the video dedicated bearer that the SMF requests to create. For example, a QCI included in the create bearer request is 1 (corresponding to the voice dedicated bearer), and an EBI included in the create bearer request is 8, to request the MME to create a voice dedicated bearer whose QCI is equal to 1 and EBI is equal to 8.

Optionally, that the SMF sends a create bearer request to the MME may be implemented as follows. The SMF sends the create bearer request to an SGW, and then the SGW sends the create bearer request to the MME.

S811a. TAU procedure.

After the terminal is handed over from the 5GS to the EPS, to enable an EPC device to know a location of the terminal, the TAU procedure of the terminal needs to be executed. For the TAU procedure, refer to the conventional technology.

S812a. The MME reserves, based on the first identifier (or the second indication information), a PDN connection corresponding to the terminal.

In this embodiment of this disclosure, if the foregoing S808a is not performed, the MME considers, based on the first identifier, namely, the information about the voice dedicated bearer and/or the information about the video dedicated bearer, that the terminal is on a call by using the information about the voice dedicated bearer and/or the video dedicated bearer. In this case, the MME reserves the PDN connection corresponding to the terminal, so as not to interrupt the audio/video service of the terminal.

When the foregoing S808a is performed, the MME can learn, based on the second indication information, that EPS fallback of the terminal is triggered. In this case, the MME reserves the PDN connection corresponding to the terminal.

In a possible implementation, a network side can establish a second dedicated bearer based on the PDN connection corresponding to the terminal. Further, the SMF establishes a QoS flow based on a PDU session, and the QoS flow in the 5GS may be mapped as the second dedicated bearer in the EPS. The SMF sends information about the second dedicated bearer to the MME. The MME sends the information about the second dedicated bearer to the terminal, to connect the end-to-end second dedicated bearer. For example, in an application scenario in which a user makes a call, after the second dedicated bearer is connected, a mobile phone rings, and a called party can answer the call by pressing a power button.

The second dedicated bearer is a voice dedicated bearer and/or a video dedicated bearer. The second dedicated bearer is used to carry voice service data and/or video service data of the terminal. The voice dedicated bearer is used to carry the voice service data, for example, carry a voice packet in a voice call. The video dedicated bearer is used to carry the video service data, for example, carry VoLTE high-definition video data. The information about the second dedicated bearer includes but is not limited to an EBI and a QCI of the second dedicated bearer. For the information about the second dedicated bearer, refer to the information about the first dedicated bearer.

For example, if the terminal initiates a VoLTE high-definition video call, the second dedicated bearer that needs to be established by the network side includes a voice dedicated bearer whose QCI is 1 and a video dedicated bearer whose QCI is 2.

For specific implementation of establishing the voice dedicated bearer and/or the video dedicated bearer by the network side, refer to the conventional technology.

In the conventional technology, when the MME may learn of, based on the target access network device identifier obtained from the AMF, a target access network device to which the terminal is handed over, if the target access network device is located in a preset area in a serving area of the MME, the MME deletes, by default, the PDN connection corresponding to the terminal. For example, the MME may delete, in the TAU procedure, the PDN connection corresponding to the terminal, and re-establish a PDN connection for the terminal, to re-allocate a user plane IP address to the terminal. In this way, as described above, a service of the terminal may be interrupted.

Different from the conventional technology, in this embodiment of this disclosure, when the terminal enters a first TA of the MME, the MME reserves the PDN connection based on the first identifier. Therefore, continuity of a service of the terminal can be ensured, and a probability that the service of the terminal fails or is interrupted can be reduced.

S813a. The SMF sends a second message to the MME.

Correspondingly, the MME receives the second message from the SMF.

The second message is used to request to delete the first dedicated bearer.

In a possible implementation, the second message may be a delete bearer request message.

It should be noted that, in the foregoing procedure, the SMF may interact with the MME, for example, send the information about the first dedicated bearer, for example, a QCI, to the MME, to trigger the MME to create the first dedicated bearer.

In this embodiment of this disclosure, considering that the MME has established the second dedicated bearer used to carry the voice and/or video service data, the first dedicated bearer may not be used to carry the voice service data and the video service data. Therefore, when determining that the second dedicated bearer used to carry the service data has been successfully established, the SMF may send the second message to the MME, so that the MME deletes the first dedicated bearer, and releases a resource corresponding to the first dedicated bearer.

Optionally, the second message carries an EBI. The foregoing example is still used. It is assumed that the EBI of the first dedicated bearer is equal to 7. In this case, the second message sent by the SMF includes the EBI equal to 7, to request the MME to delete the first dedicated bearer whose EBI is 7.

S814a. The MME sends a third message to an access network device.

Correspondingly, the access network device receives the third message from the MME.

The access network device may be, for example, but is not limited to an E-UTRAN device.

It should be understood that, after receiving the second message, the MME learns that the first dedicated bearer needs to be deleted. In this case, the MME sends the third message to the E-UTRAN device to request the E-UTRAN device to release the resource corresponding to the first dedicated bearer.

In a possible implementation, the third message may be an E-UTRAN radio access bearer (E-RAB) release command.

S815a. The E-UTRAN device feeds back a response of the third message to the MME.

It should be understood that, after completing release of the resource of the first dedicated bearer, the E-UTRAN device returns the response of the third message to the MME.

In a possible implementation, the response of the third message may be an E-RAB release response.

S816a. The MME sends a response of the second message to the SMF.

Correspondingly, the SMF receives the response of the second message from the MME.

The response of the second message is used to indicate that the first dedicated bearer is deleted.

In a possible implementation, the response of the second message may be a delete bearer response.

(Optional) S817a. The SMF sends a first notification to the PCF.

Correspondingly, the PCF receives the first notification from the SMF.

It should be understood that, in the foregoing procedure, if the SMF does not notify the PCF that the second dedicated bearer has been successfully established, the SMF needs to send the first notification, to notify the PCF that the second dedicated bearer, namely, the voice dedicated bearer and/or the video dedicated bearer, has been successfully established.

In a possible implementation, the SMF invokes a session management policy control update request (Npcf_SMPolicyControl_Update Request) service of the PCF to send the first notification to the PCF.

In some embodiments, the terminal falls back from the 5GS to the EPS in a handover manner. The SMF sends the first identifier to the MME by using the AMF, to implicitly indicate that the terminal is falling back to the EPS by using the EPS fallback procedure. The network element establishes the first dedicated bearer to transmit service data. In this case, referring to FIG. 8C and FIG. 8D, a communication method in an embodiment of this disclosure includes the following steps.

S801b. A terminal initiates a service request to an IMS, and the IMS triggers a dedicated bearer establishment procedure.

For specific implementation of S801b, refer to the foregoing S701.

S802b. An SMF determines that EPS fallback of the terminal is triggered.

For specific implementation of S802b, refer to the foregoing S702.

S803b. The SMF obtains information about a first dedicated bearer.

Optionally, S803b may be implemented as the following steps S803b1 and S803b2.

S803b1. The SMF sends a first message to the AMF.

Correspondingly, the AMF receives the first message from the SMF.

For specific implementation of S803b1, refer to the foregoing S803a1.

S803b2. The AMF sends a response of the first message to the SMF.

Correspondingly, the SMF receives the response of the first message from the AMF.

For specific implementation of S803b2, refer to the foregoing S803a2.

S804b. An NG-RAN device sends a handover required message to the AMF.

Correspondingly, the AMF receives the handover required message from the NG-RAN device.

For specific implementation of S804b, refer to the foregoing S804a.

S805b. The AMF sends a session context request to the SMF.

Correspondingly, the SMF receives the session context request from the AMF.

For specific implementation of S805b, refer to the foregoing S805a.

S806b. The SMF sends a session context response to the AMF.

Correspondingly, the AMF receives the session context response from the SMF.

For specific implementation of S806b, refer to the foregoing S806a.

S807b. The AMF sends the first identifier to the MME.

Correspondingly, the MME receives the first identifier from the AMF.

For specific implementation of S807b, refer to the foregoing S807a.

(Optional) S808b. The MME allocates second indication information to the terminal based on the first identifier.

The second indication information is used to indicate that the terminal is falling back to the EPS by using the EPS fallback procedure.

For specific implementation of S808b, refer to the foregoing S808a.

S809b. 5GS to EPS handover procedure.

For specific implementation of S809b, refer to the conventional technology.

S810b. The SMF sends a create bearer request to the MME.

For specific implementation of S810b, refer to the foregoing S810a.

S811b. TAU procedure.

For the TAU procedure, refer to the conventional technology.

S812b. The MME reserves, based on the first identifier (or the second indication information), a PDN connection corresponding to the terminal.

For specific implementation of S812b, refer to the foregoing S812a.

S813b. The MME sends the information about the first dedicated bearer to the terminal.

In a possible implementation, the MME does not need to newly create a second dedicated bearer, but may carry service data by using the established first dedicated bearer.

It should be understood that the first dedicated bearer is created in the foregoing procedure. However, after the terminal is handed over to the EPS, the first dedicated bearer is unavailable. A reason is that the information about the first dedicated bearer only exists on a network side, and the terminal does not know the information about the first dedicated bearer. The information about the first dedicated bearer exists in the SMF, the SMF may send the information about the first dedicated bearer to the MME by using the AMF, and the MME may send the information about the first dedicated bearer to an access network device.

Therefore, the MME sends the information about the first dedicated bearer to the terminal, to connect the terminal to the first dedicated bearer on the network side. In this way, the terminal may transmit the service data by using the first dedicated bearer.

In a possible implementation, the MME sends an activate dedicated EPS bearer context request message to the terminal, where the message carries the information about the first dedicated bearer.

Optionally, the terminal feeds back an activate dedicated EPS bearer context accept message to the MME.

(Optional) S814b. The SMF sends a second notification to the PCF.

Correspondingly, the PCF receives the second notification from the SMF.

Optionally, after determining that the first dedicated bearer is connected, the SMF sends the second notification, to notify the PCF that the first dedicated bearer has been successfully established.

In a possible implementation, the SMF invokes an Npcf_SMPolicyControl_Update Request service of the PCF to send the second notification to the PCF.

Figure 8A:
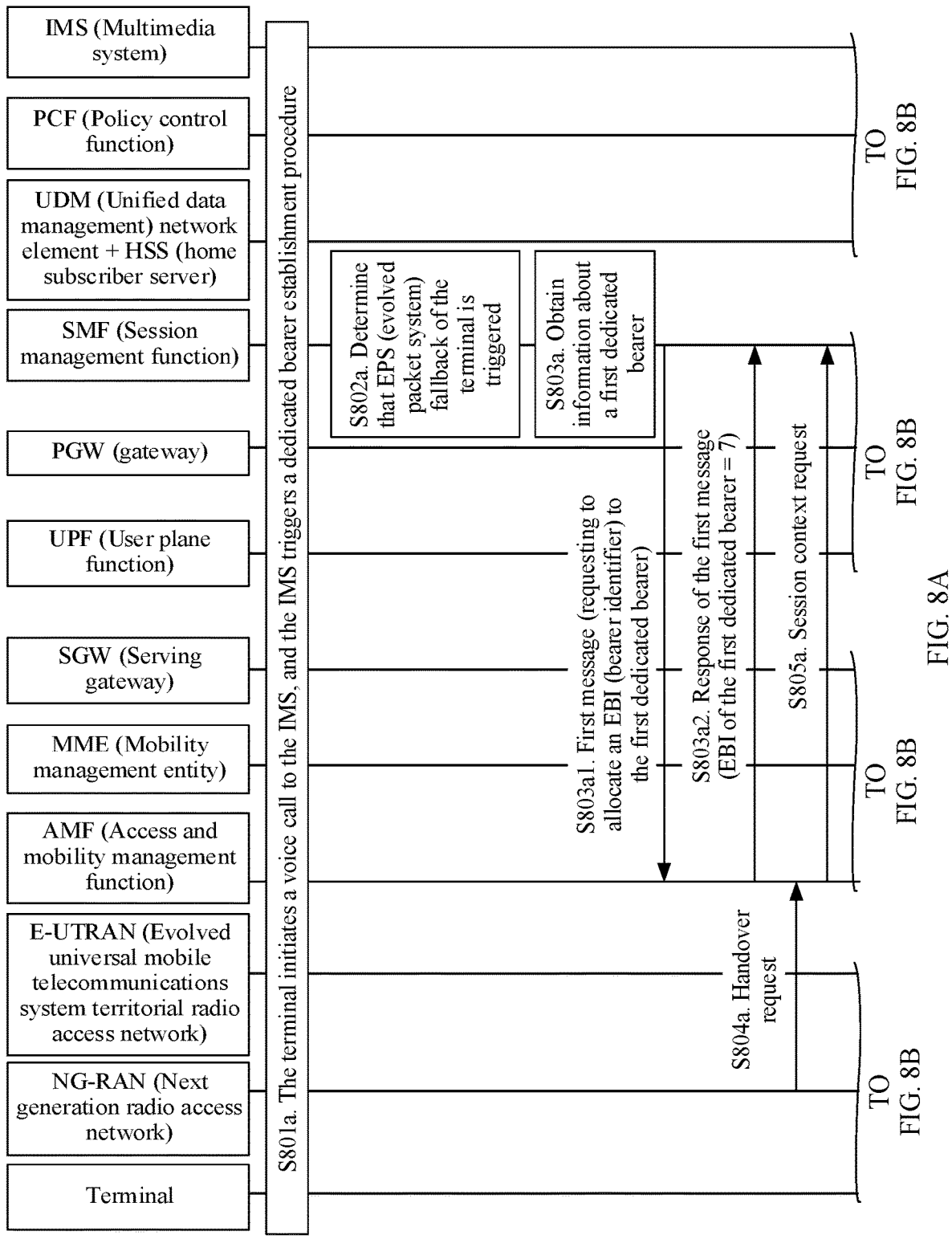
FIG. 8A and FIG. 8B are a schematic flowchart of a communication method according to an embodiment of this disclosure.
Figure 8B:
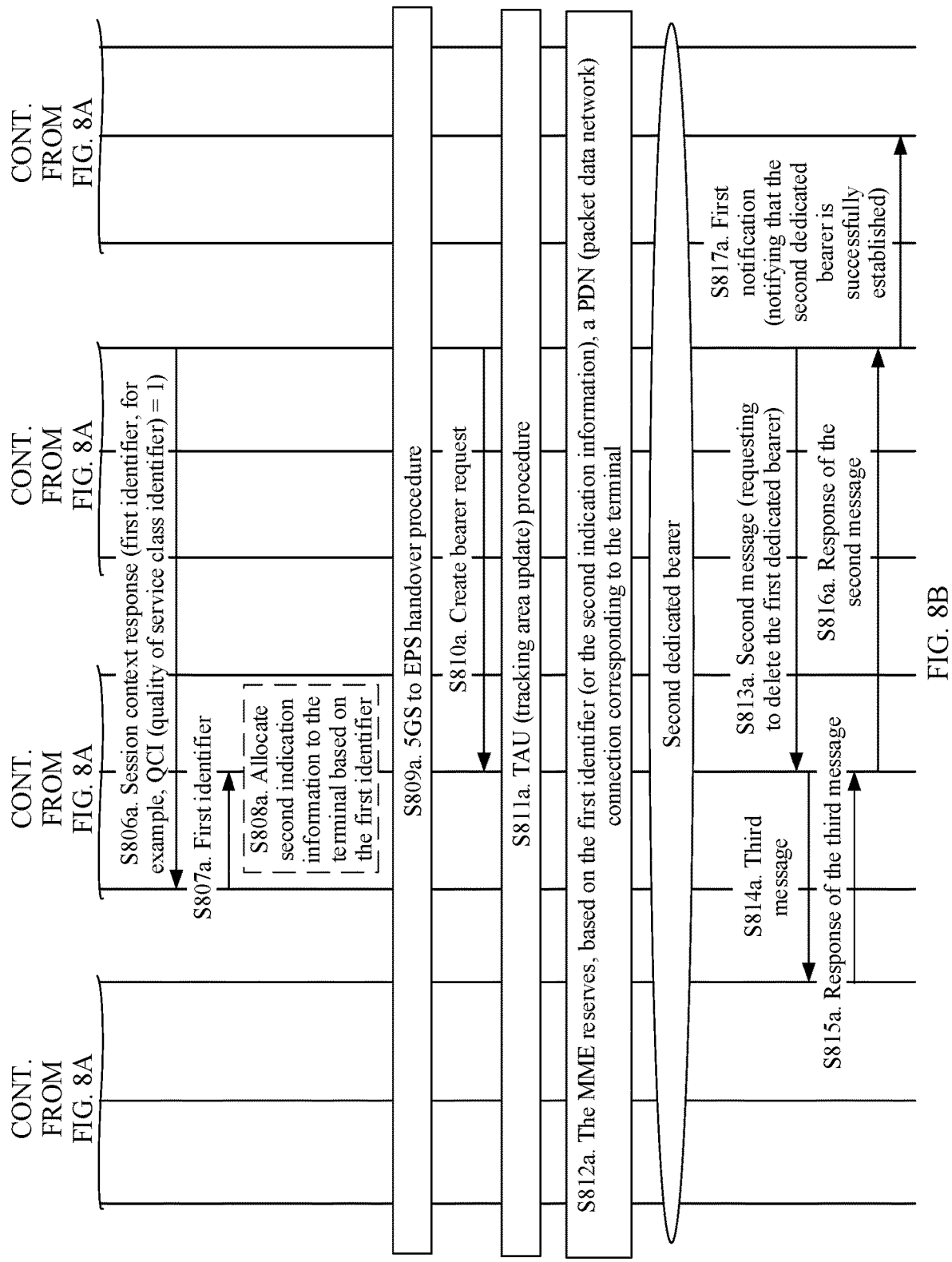
Figure 8D:
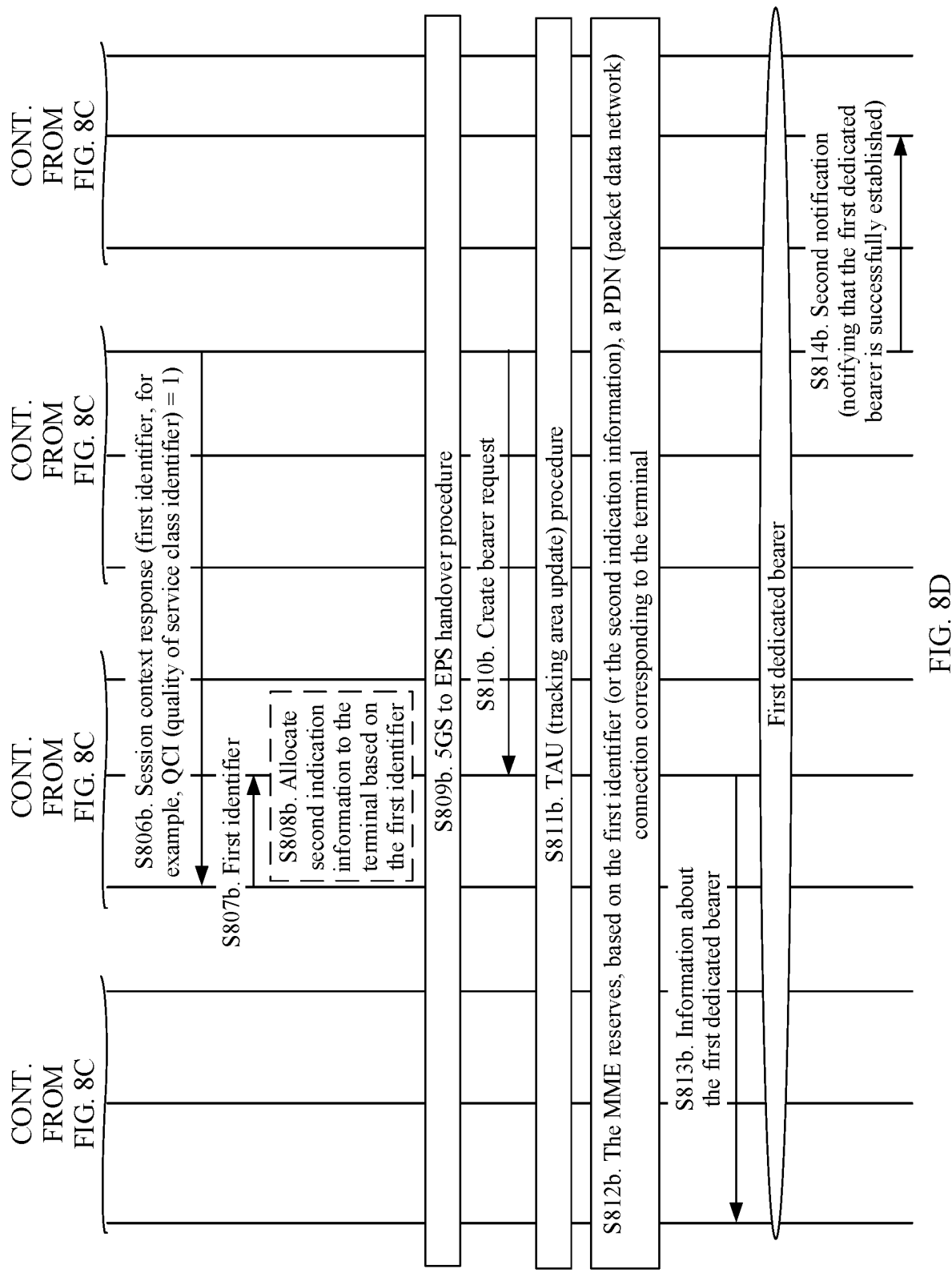

Different from the embodiment that corresponds to FIG. 8A and FIG. 8B and in which the network side establishes the second dedicated bearer to transmit the service data of the terminal, in the embodiment corresponding to FIG. 8C and FIG. 8D, on the basis that the network side has established the first dedicated bearer, the MME can send the information about the first dedicated bearer on the network side to the terminal, so that the first dedicated bearer is connected, and the terminal can transmit the service data by using the first dedicated bearer.

In some other embodiments, the terminal falls back from the 5GS to the EPS in a handover manner. The AMF determines that EPS fallback of the terminal is triggered, and the AMF sends the first identifier to the MME, to implicitly indicate that the terminal falls back to the EPS by using the EPS fallback procedure. The MME establishes a second dedicated bearer, where the second dedicated bearer is used to carry service data. In this case, referring to FIG. 8E and FIG. 8F, a communication method in an embodiment of this disclosure further includes the following steps.

S801c. A terminal initiates a service request to an IMS, and the IMS triggers a dedicated bearer establishment procedure.

For specific implementation of S801c, refer to the foregoing S701.

S802c. An AMF determines that EPS fallback of the terminal is triggered.

For specific implementation of S802c, refer to the foregoing S702.

S803c. The AMF obtains information about a first dedicated bearer.

In a possible implementation, the AMF may generate the information about the first dedicated bearer based on local information. The information about the first dedicated bearer includes a first identifier.

S804c. An NG-RAN device sends a handover required message to the AMF.

Correspondingly, the AMF receives the handover required message from the NG-RAN device.

For specific implementation of S804c, refer to the foregoing S804a.

S805c. The AMF sends a session context request to an SMF.

Correspondingly, the SMF receives the session context request from the AMF.

For specific implementation of S805c, refer to the foregoing S805a.

S806c. The SMF sends a session context response to the AMF.

Correspondingly, the AMF receives the session context response from the SMF.

It should be noted that, if the AMF has obtained the first identifier in S803, the session context response may not include the first identifier.

S807c. The AMF sends the first identifier to the MME.

Correspondingly, the MME receives the first identifier from the AMF.

For specific implementation of S807c, refer to the foregoing S807a.

(Optional) S808c. The MME allocates second indication information to the terminal based on the first identifier.

The second indication information is used to indicate that the terminal falls back to the EPS by using the EPS fallback procedure.

For specific implementation of S808c, refer to the foregoing S808a.

S809c. 5GS to EPS handover procedure.

For specific implementation of S809c, refer to the conventional technology.

S810c. The SMF sends a create bearer request to the MME.

For specific implementation of S810c, refer to the foregoing S810a.

S811c. TAU procedure.

For the TAU procedure, refer to the conventional technology.

S812c. The MME reserves, based on the first identifier (or the second indication information), a PDN connection corresponding to the terminal.

For specific implementation of S812c, refer to the foregoing S812a.

In this way, the network side can establish a second dedicated bearer based on the PDN connection corresponding to the terminal, to carry voice and/or video service data of the terminal.

S813c. The SMF sends a second message to the MME.

Correspondingly, the MME receives the second message from the SMF.

The second message is used to request to delete the first dedicated bearer.

For specific implementation of S813c, refer to the foregoing S813a.

S814c. The MME sends a third message to an E-UTRAN device.

For specific implementation of S814c, refer to the foregoing S814a.

S815c. The E-UTRAN device feeds back a response of the third message to the MME.

For specific implementation of S815c, refer to the foregoing S815a.

S816c. The MME sends a response of the second message to the SMF.

Correspondingly, the SMF receives the response of the second message from the MME.

For specific implementation of S816c, refer to the foregoing S816a.

(Optional) S817c. The SMF sends a first notification to the PCF.

Correspondingly, the PCF receives the first notification from the SMF.

For specific implementation of S817c, refer to the foregoing S818a.

Figure 8F:
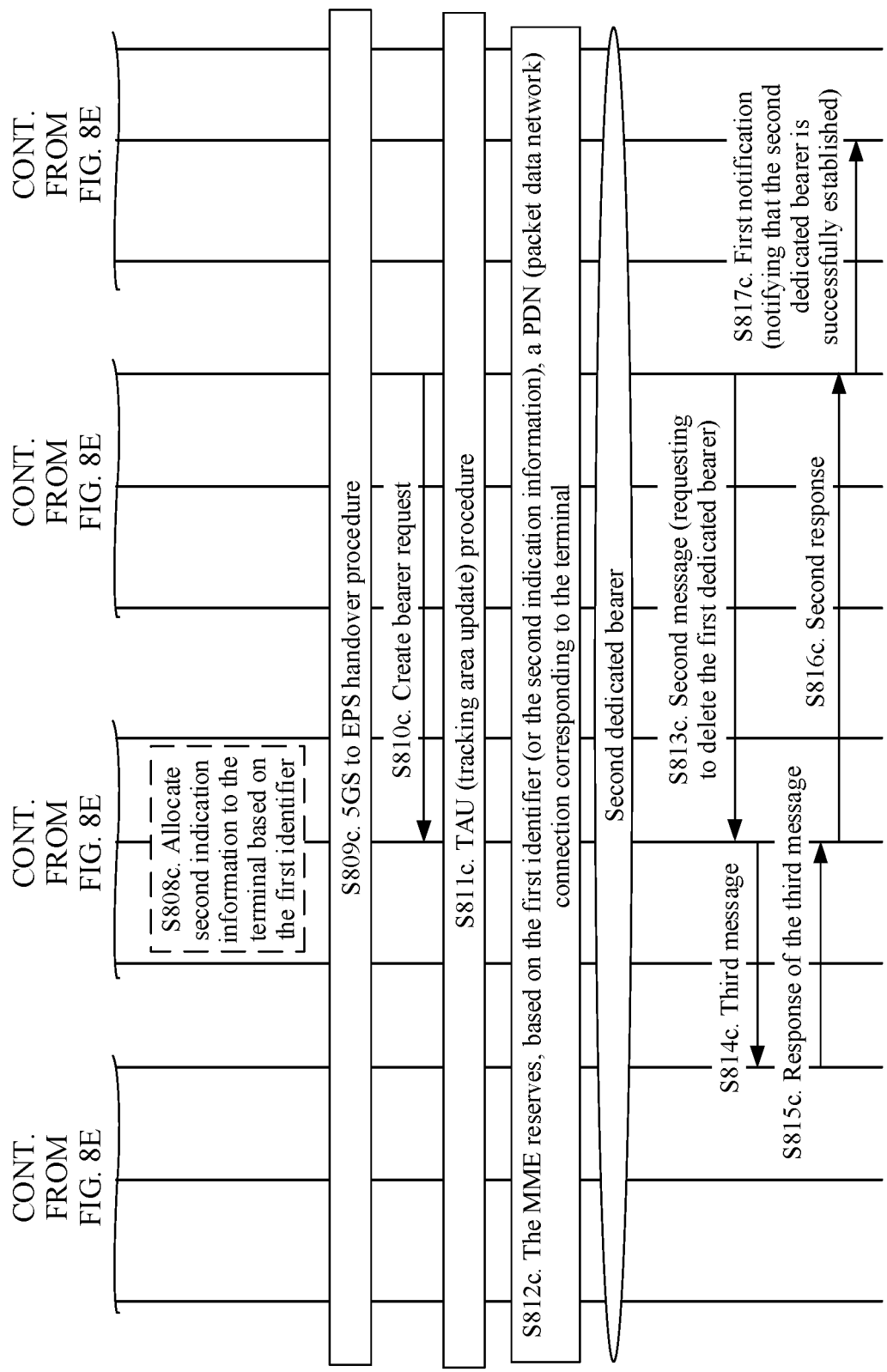

Different from the embodiment that corresponds to FIG. 8A and FIG. 8B and in which the SMF detects that EPS fallback of terminal is triggered, in the embodiment corresponding to FIG. 8E and FIG. 8F, the AMF can detect that EPS fallback of terminal is triggered.

Figure 8H:
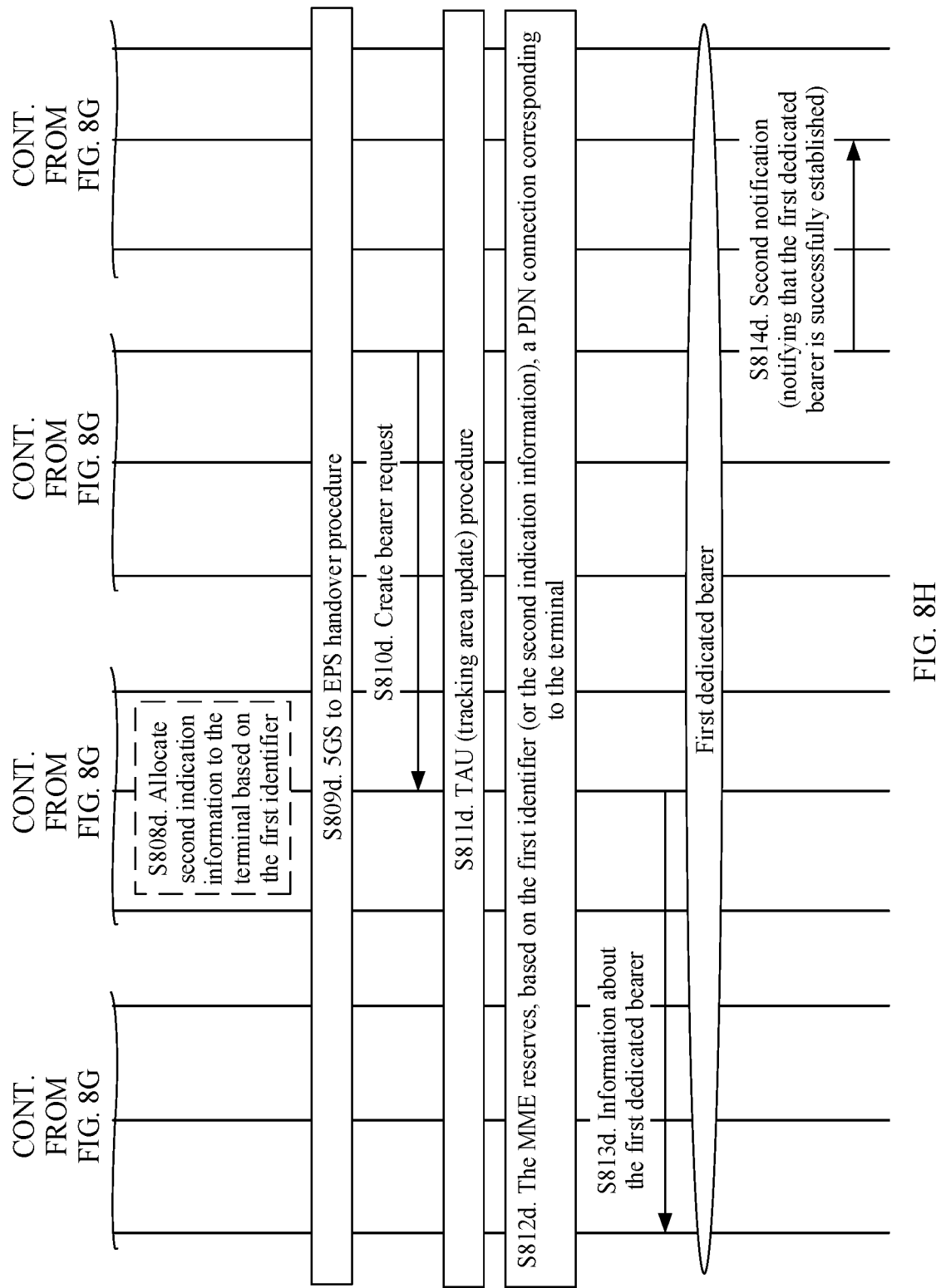

In some embodiments, the terminal falls back from the 5GS to the EPS in a handover manner. The AMF determines that EPS fallback of the terminal is triggered, and sends the first identifier to the MME, to implicitly indicate that the terminal is falling back to the EPS by using the EPS fallback procedure. The network element transmits service data by using the first dedicated bearer. In this case, referring to FIG. 8G and FIG. 8H, a communication method in an embodiment of this disclosure includes the following steps.

S801d. A terminal initiates a service request to an IMS, and the IMS triggers a dedicated bearer establishment procedure.

For specific implementation of S801d, refer to the foregoing S701.

S802d. An AMF determines that EPS fallback of the terminal is triggered.

For specific implementation of S802d, refer to the foregoing S702.

S803d. The AMF obtains information about a first dedicated bearer.

Optionally, the AMF generates the information about the first dedicated bearer based on local information. The information about the first dedicated bearer includes a first identifier.

S804d. An NG-RAN device sends a handover required message to the AMF.

Correspondingly, the AMF receives the handover required message from the NG-RAN device.

For specific implementation of S804d, refer to the foregoing S804a.

S805d. The AMF sends a session context request to an SMF.

Correspondingly, the SMF receives the session context request from the AMF.

For specific implementation of S805d, refer to the foregoing S805a.

S806d. The SMF sends a session context response to the AMF.

Correspondingly, the AMF receives the session context response from the SMF.

For specific implementation of S806d, refer to the foregoing S806c.

S807d. The AMF sends the first identifier to the MME.

Correspondingly, the MME receives the first identifier from the AMF.

For specific implementation of S807d, refer to the foregoing S807a.

(Optional) S808d. The MME allocates second indication information to the terminal based on the first identifier.

The second indication information is used to indicate that the terminal is falling back to the EPS by using the EPS fallback procedure.

For specific implementation of S808d, refer to the foregoing S808a.

S809d. 5GS to EPS handover procedure.

For specific implementation of S809d, refer to the conventional technology.

S810d. The SMF sends a create bearer request to the MME.

For specific implementation of S810d, refer to the foregoing S810a.

S811d. TAU procedure.

For the TAU procedure, refer to the conventional technology.

S812d. The MME reserves, based on the first identifier (or the second indication information), a PDN connection corresponding to the terminal.

For specific implementation of S812d, refer to the foregoing S812a.

S813d. The MME sends the information about the first dedicated bearer to the terminal.

For specific implementation of S813d, refer to the foregoing S813b.

(Optional) S814d. The SMF sends a second notification to the PCF.

Correspondingly, the PCF receives the second notification from the SMF.

For specific implementation of S814d, refer to the foregoing S814b.

In some other embodiments, the terminal falls back from the 5GS to the EPS in a redirection manner. The SMF sends the first identifier to the MME by using the AMF, to implicitly indicate that the terminal is falling back to the EPS by using the EPS fallback procedure. In this case, referring to FIG. 9A and FIG. 9B, a communication method in an embodiment of this disclosure includes the following steps.

S901a. A terminal initiates a service request to an IMS, and the IMS triggers a dedicated bearer establishment procedure.

For specific implementation of S901a, refer to the foregoing S701.

S902a. An SMF determines that EPS fallback of the terminal is triggered.

For specific implementation of S902a, refer to the foregoing S702.

S903a. The SMF obtains information about a first dedicated bearer.

Optionally, S903a may be implemented as the following steps S903a1 and S903a2.

S903a1. The SMF sends a first message to an AMF.

Correspondingly, the AMF receives the first message from the SMF.

For specific implementation of S903a1, refer to the foregoing S803a1.

S903a2. The AMF sends a response of the first message to the SMF.

Correspondingly, the SMF receives the response of the first message from the AMF.

For specific implementation of S903a2, refer to the foregoing S803a2.

S904a. The terminal initiates a redirection procedure.

Further, redirection may be completed by using an access network (AN) release procedure and a re-attachment procedure. For specific implementation of redirection, refer to the conventional technology.

It is easy to understand that, based on the redirection procedure, the terminal falls back from the 5GS to the EPS, to perform a voice service in the 4G network.

S905a. The terminal initiates a TAU procedure.

For specific implementation of the TAU procedure, refer to the conventional technology.

Based on the TAU procedure, the terminal may report information such as a location of the terminal to the 5GS.

S906a. The AMF sends a session context request to the SMF.

Correspondingly, the SMF receives the session context request from the AMF.

For specific implementation of S906a, refer to the foregoing S805a.

S907a. The SMF sends a session context response to the AMF.

Correspondingly, the AMF receives the session context response from the SMF.

For specific implementation of S907a, refer to the foregoing S806a.

S908a. The AMF sends the first identifier to the MME.

Correspondingly, the MME receives the first identifier from the AMF.

For specific implementation of S908a, refer to the foregoing S807a.

(Optional) S909a. The MME allocates second indication information to the terminal based on the first identifier.

The second indication information is used to indicate that EPS fallback of the terminal is triggered. The second indication information may be different from the first indication information.

For specific implementation of S909a, refer to the foregoing S808a.

S910a. Continue to process the TAU procedure.

For specific implementation of S910a, refer to the conventional technology.

S911a. The SMF sends a create bearer request to the MME.

For specific implementation of S911a, refer to the foregoing S810a.

S912a. Continue to process the TAU procedure.

For the TAU procedure, refer to the conventional technology.

S913a. The MME reserves, based on the second indication information or the first identifier, a PDN connection corresponding to the terminal.

For specific implementation of S913a, refer to the foregoing S812a.

In this way, the network side can establish a second dedicated bearer based on the PDN connection corresponding to the terminal.

S914a. The SMF sends a second message to the MME.

Correspondingly, the MME receives the second message from the SMF.

For specific implementation of S914a, refer to the foregoing S813a.

S915a. The MME sends a third message to an E-UTRAN device.

For specific implementation of S915a, refer to the foregoing S814a.

S916a. The E-UTRAN device feeds back a response of the third message to the MME.

For specific implementation of S916a, refer to the foregoing S815a.

S917a. The MME sends a response of the second message to the SMF.

Correspondingly, the SMF receives the response of the second message from the MME.

For specific implementation of S917a, refer to the foregoing S816a.

(Optional) S918a. The SMF sends a first notification to the PCF.

Correspondingly, the PCF receives the first notification from the SMF.

For specific implementation of S918a, refer to the foregoing S817a.

In some other embodiments, the terminal falls back from the 5GS to the EPS in a redirection manner. The SMF determines that EPS fallback of the terminal is triggered, and sends the first identifier to the MME, to implicitly indicate that the terminal is falling back to the EPS by using the EPS fallback procedure. Service data of the terminal is transmitted by using the first dedicated bearer. In this case, referring to FIG. 9C and FIG. 9D, a communication method in an embodiment of this disclosure includes the following steps.

S901a to S913a, S914b, and S915b.

Figure 9A:
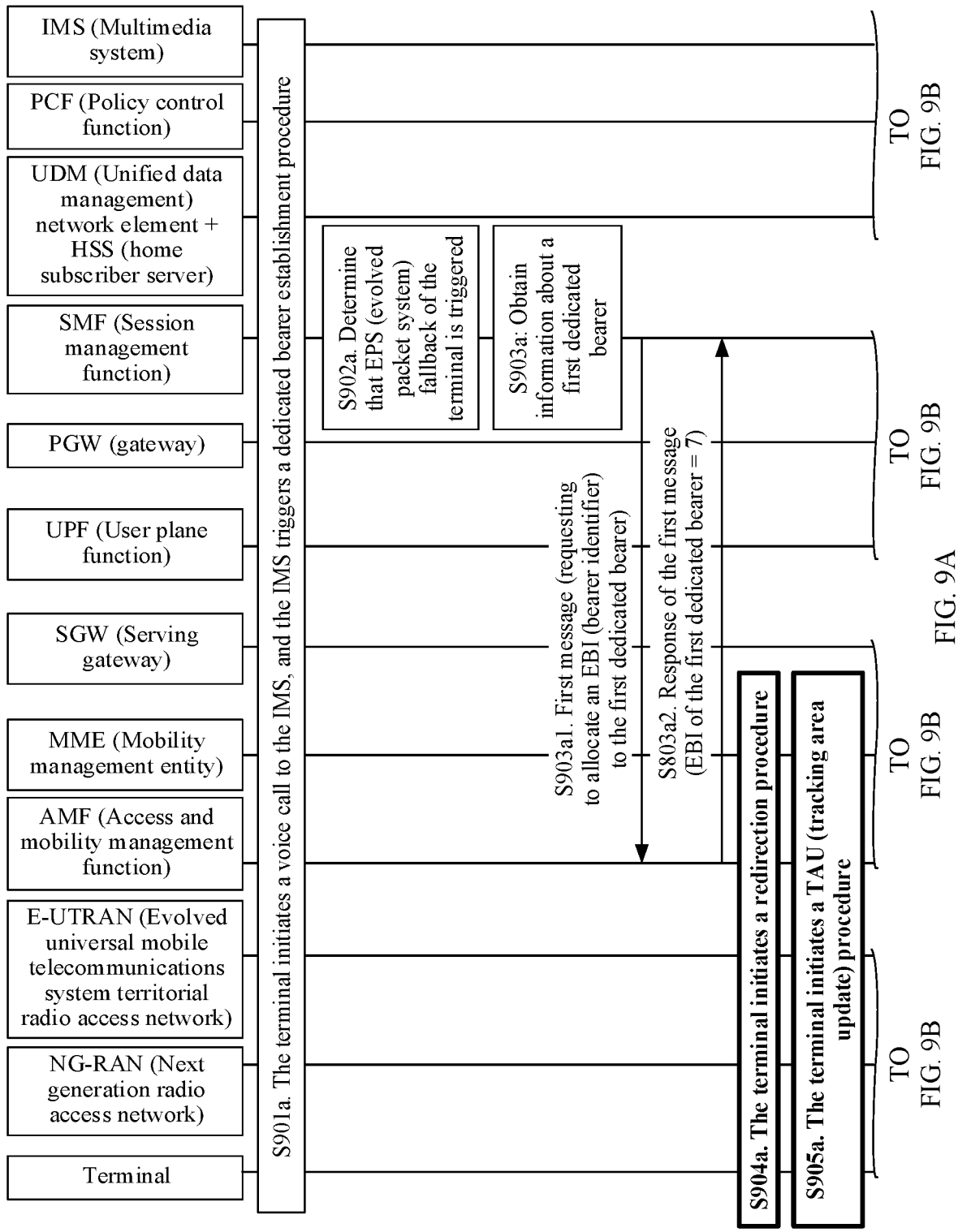
FIG. 9A and FIG. 9B are a schematic flowchart of a communication method according to an embodiment of this disclosure.
Figure 9B:
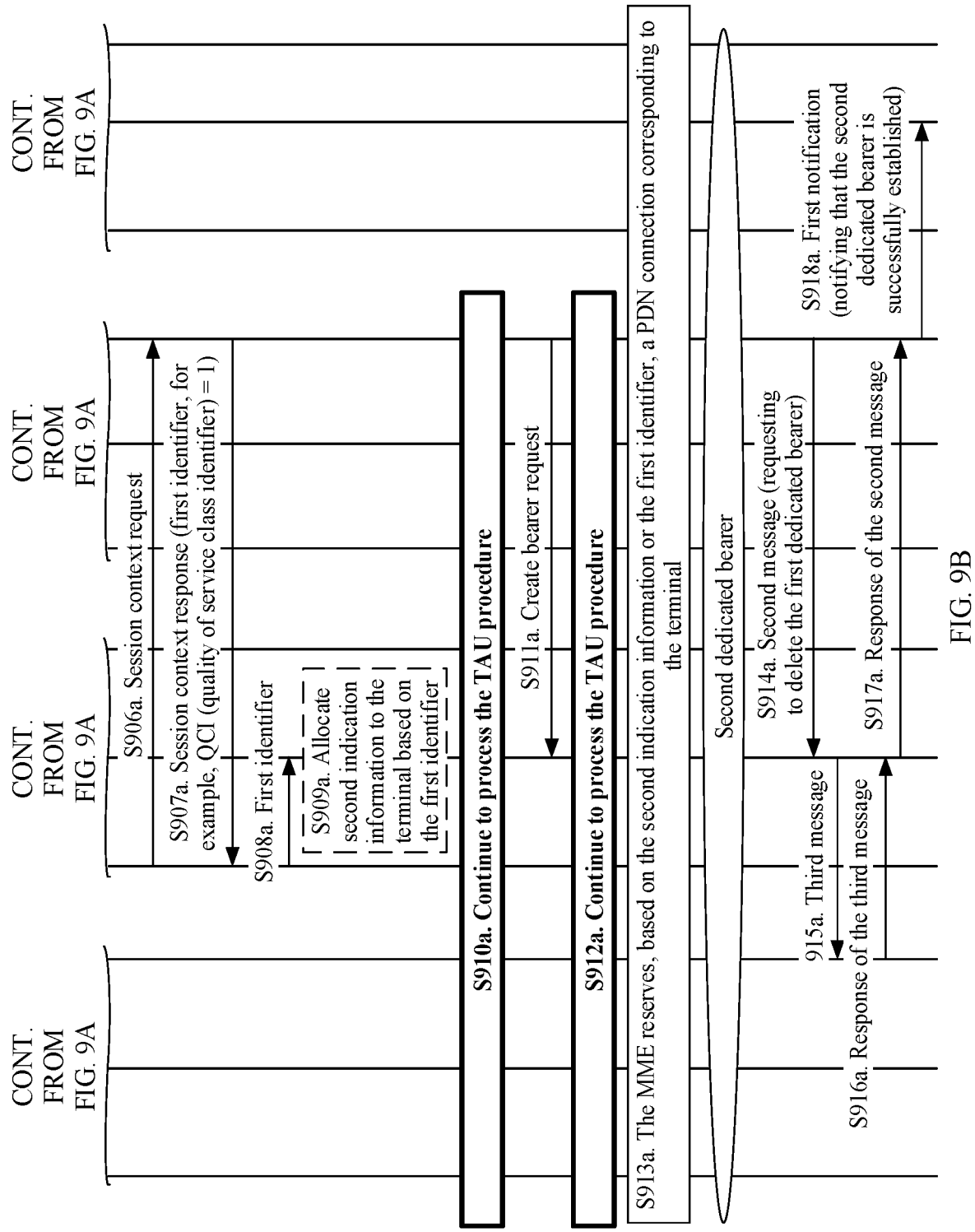
Figure 9D:
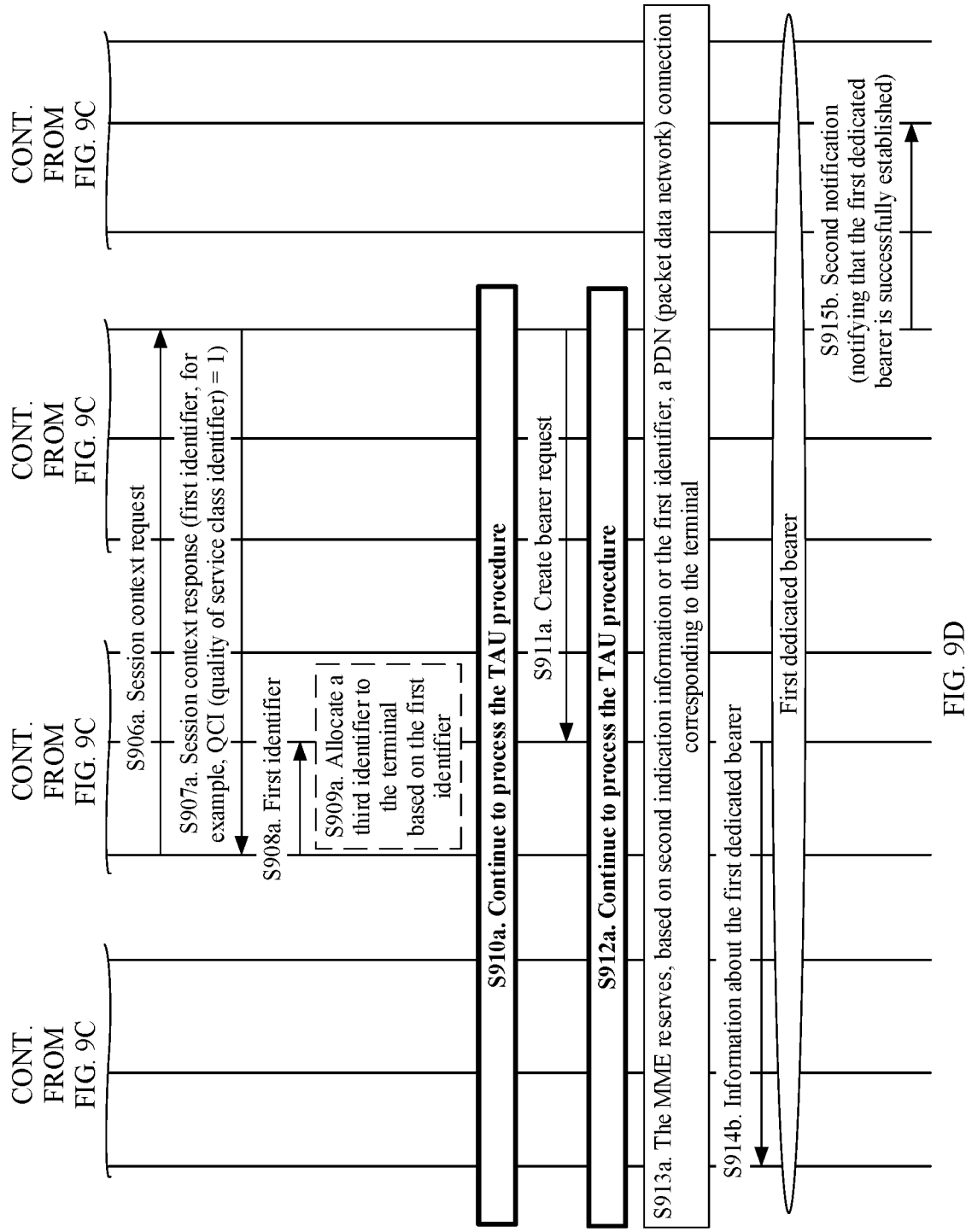

For specific implementation of S901a to S913a, refer to the embodiment corresponding to FIG. 9A and FIG. 9B.

S914b. The MME sends the information about the first dedicated bearer to the terminal.

For specific implementation of S914b, refer to the foregoing S813b.

S915b. The SMF sends a second notification to the PCF.

For specific implementation of S915b, refer to the foregoing S814b.

Figure 9F:
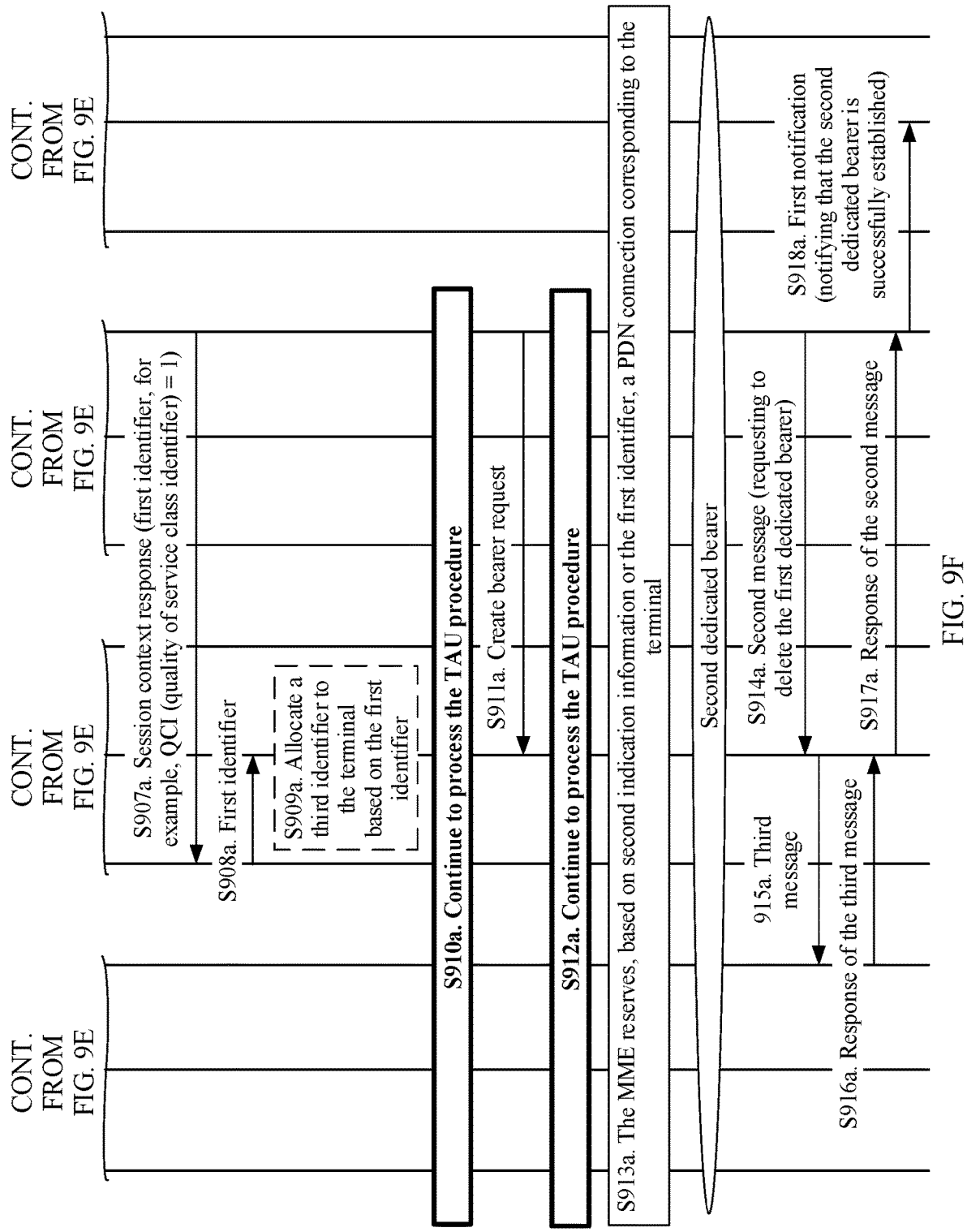

In some other embodiments, the terminal falls back from the 5GS to the EPS in a redirection manner. The AMF determines that EPS fallback of the terminal is triggered, and sends the first identifier to the MME, to implicitly indicate that the terminal is falling back to the EPS by using the EPS fallback procedure. Service data of the terminal is transmitted by using a second dedicated bearer. In this case, referring to FIG. 9E and FIG. 9F, a communication method in an embodiment of this disclosure includes the following steps.

S901a is performed. For specific implementation of S901a, refer to the embodiment corresponding to FIG. 9A and FIG. 9B.

S902c. An AMF determines that EPS fallback of the terminal is triggered.

For specific implementation of S902c, refer to the foregoing S802c.

S903c. The AMF obtains information about a first dedicated bearer.

For specific implementation of S903c, refer to the foregoing S803c.

For specific implementation of S904a to S918a, refer to the foregoing embodiment.

Figure 9H:
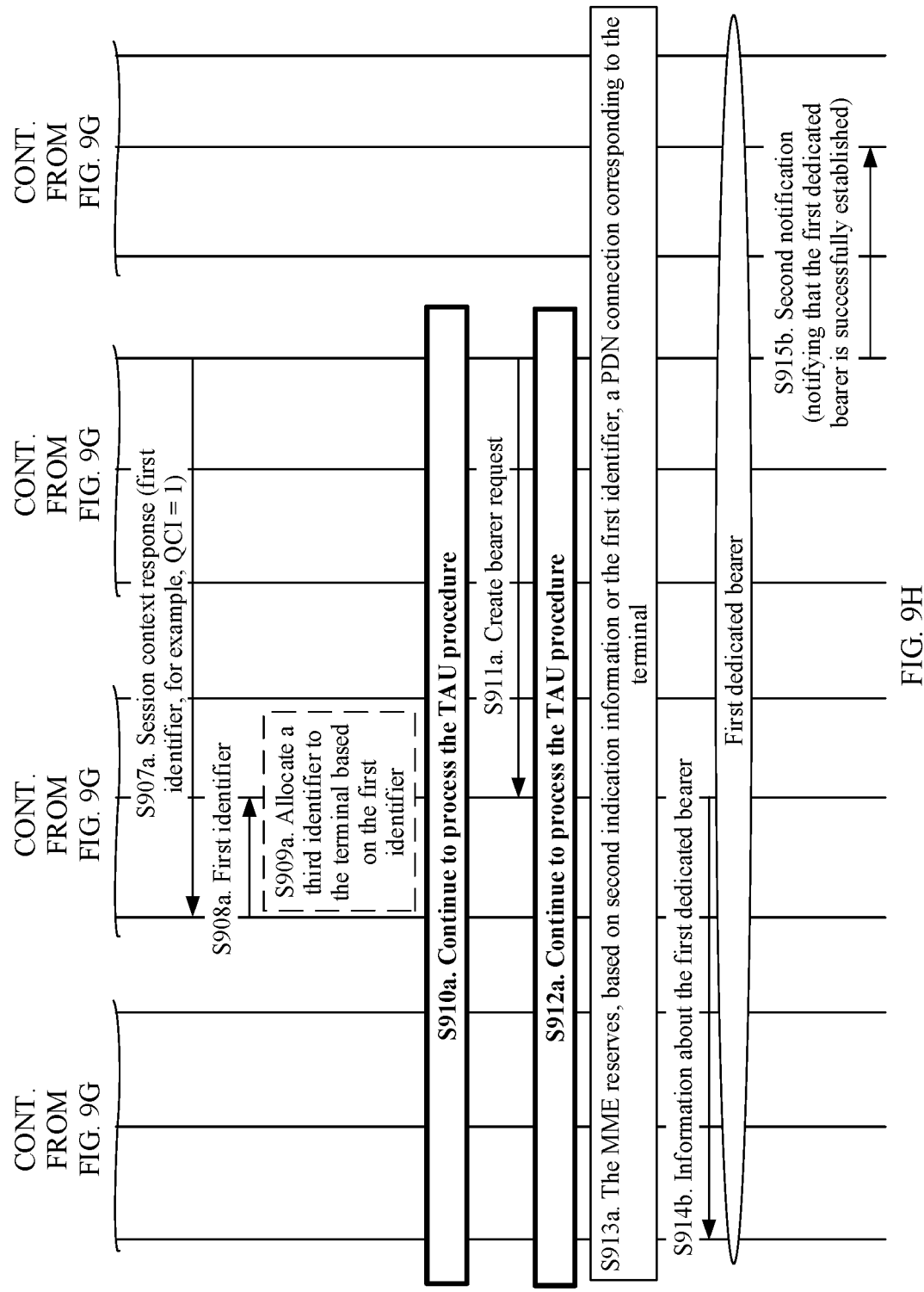

In some other embodiments, the terminal falls back from the 5GS to the EPS in a redirection manner. The AMF determines that EPS fallback of the terminal is triggered, and sends the first identifier to the MME, to implicitly indicate that the terminal is falling back to the EPS by using the EPS fallback procedure. Service data of the terminal is transmitted by using the first dedicated bearer. In this case, referring to FIG. 9G and FIG. 9H, a communication method in an embodiment of this disclosure includes the following steps.

S901a is performed. For specific implementation of S901a, refer to the embodiment corresponding to FIG. 9A and FIG. 9B.

S902d. An AMF determines that EPS fallback of the terminal is triggered.

For specific implementation of S902d, refer to the foregoing S802c.

S903d. The AMF obtains information about a first dedicated bearer.

For specific implementation of S903d, refer to the foregoing S803c.

For specific implementation of S904a to S915b, refer to the foregoing embodiment.

Figure 10:
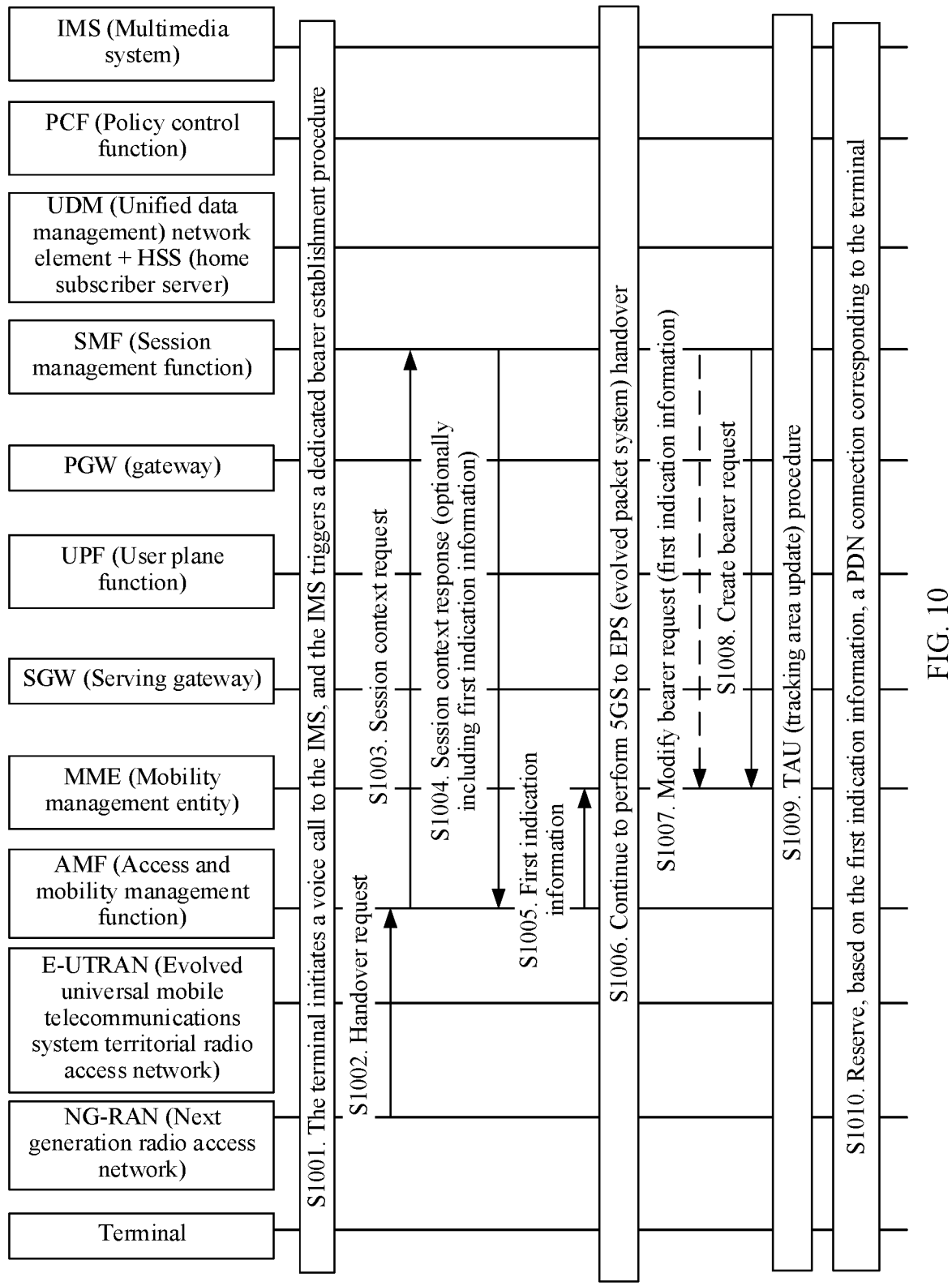
FIG. 10 is a schematic flowchart of a communication method according to an embodiment of this disclosure

In some other embodiments, the terminal falls back from the 5GS to the EPS in a handover manner. The SMF sends the first indication information to the MME by using the AMF, to explicitly indicate that the terminal is falling back to the EPS by using the EPS fallback procedure. In this case, referring to FIG. 10, a communication method in an embodiment of this disclosure includes the following steps.

S1001. A terminal initiates a service request to an IMS, and the IMS triggers a dedicated bearer establishment procedure.

For specific implementation of S1001, refer to the foregoing S701.

S1002. An NG-RAN device sends a handover required message to an AMF.

Correspondingly, the AMF receives the handover required message from the NG-RAN device.

For specific implementation of S1002, refer to the foregoing S806.

S1003. The AMF sends a session context request to an SMF.

Correspondingly, the SMF receives the session context request from the AMF.

For specific implementation of S1003, refer to the foregoing S807.

S1004. The SMF sends a session context response to the AMF.

Correspondingly, the AMF receives the session context response from the SMF.

The session context response includes a session context of the terminal.

Optionally, if the SMF determines that EPS fallback of the terminal is triggered, the session context optionally includes first indication information. The first indication information is used to indicate that the terminal is falling back to the EPS by using the EPS fallback procedure.

The first indication information is denoted as an EPS fallback indicator. The EPS fallback indicator may be a flag, may be a cause value, or may be in another form. This is not limited in this embodiment of this disclosure.

S1005. The AMF sends the first indication information to an MME.

Correspondingly, the MME receives the first indication information from the AMF.

In a possible implementation, the AMF sends a forward relocation request message to the MME, where the message includes a session context of the terminal. The session context includes the first indication information.

Optionally, if the AMF determines that EPS fallback of the terminal is triggered, the AMF may identify, based on a cause value "IMS voice EPS fallback or RAT fallback triggered" obtained from the NG-RAN device, that the terminal is falling back to the EPS by using the EPS Fallback procedure, encapsulates the first indication information into a user context, and sends the first indication information to the MME.

S1006. Continue to perform a handover procedure.

For specific implementation of S1006, refer to the conventional technology.

(Optional) S1007. The SMF sends a modify bearer response to the MME.

Correspondingly, the MME receives the modify bearer response from the SMF.

In the foregoing procedure, the SMF receives the modify bearer request. In this way, the SMF learns that the terminal has been handed over to a 4G network.

Optionally, if the SMF does not include the first indication information into the session context response in S1004, the SMF needs to include the first indication information into the modify bearer response sent to the MME.

S1008. The SMF sends a create bearer request to the MME.

For specific implementation of S1008, refer to the foregoing S812.

S1009. Continue to perform a TAU procedure.

For the TAU procedure, refer to the conventional technology.

S1010. The MME reserves, based on the first indication information, a PDN connection corresponding to the terminal.

In this way, a second dedicated bearer may be subsequently established based on the PDN connection corresponding to the terminal.

Figure 11:
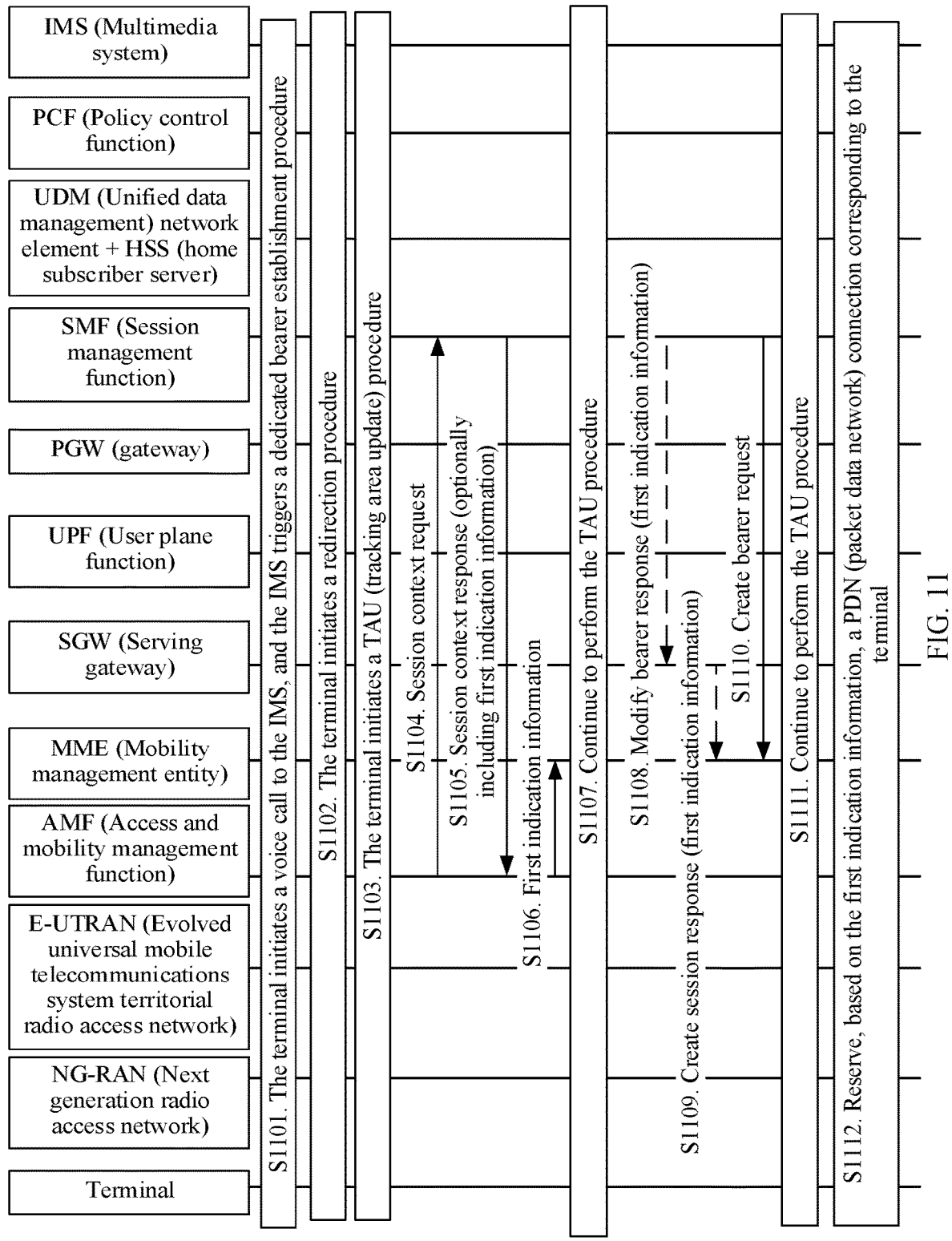
FIG. 11 is a schematic flowchart of a communication method according to an embodiment of this disclosure.

In some other embodiments, the terminal falls back from the 5GS to the EPS in a redirection manner. The SMF sends the first indication information to the MME by using the AMF, to explicitly indicate that the terminal is falling back to the EPS by using the EPS fallback procedure. In this case, referring to FIG. 11, a communication method in an embodiment of this disclosure includes the following steps.

S1101. A terminal initiates a service request to an IMS, and the IMS triggers a dedicated bearer establishment procedure.

For specific implementation of S1101, refer to the foregoing S701.

S1102. The terminal initiates a redirection procedure.

For specific implementation of the redirection procedure, refer to the conventional technology.

S1103. The terminal initiates a TAU procedure.

For specific implementation of the TAU procedure, refer to the conventional technology.

S1104. An AMF sends a session context request to an SMF.

Correspondingly, the SMF receives the session context request from the AMF.

For specific implementation of S1104, refer to the foregoing S807.

S1105. The SMF sends a session context response to the AMF.

Correspondingly, the AMF receives the session context response from the SMF.

The session context response includes a session context of the terminal. Optionally, the session context includes first indication information. The first indication information is used to indicate that the terminal is falling back to the EPS by using the EPS fallback procedure.

For specific implementation of S1105, refer to the foregoing S1004.

S1106. The AMF sends the first indication information to an MME.

Correspondingly, the MME receives the first indication information from the AMF.

For specific implementation of S1106, refer to the foregoing S1005.

S1107. Continue to perform the TAU procedure.

For specific implementation of the TAU procedure, refer to the conventional technology.

(Optional) S1108. The SMF sends a modify bearer response to an SGW.

Correspondingly, the SGW receives the modify bearer response from the SMF.

It should be understood that, in the foregoing procedure, the SMF receives a modify bearer request, and learns that the terminal has been redirected to a 4G network. If the SMF does not include the first indication information into the session context response in S1105, the SMF needs to include the first indication information into the modify bearer response.

(Optional) S1109. The SGW sends a create session response to the MME.

Correspondingly, the MME receives the create session response from the SGW.

The create session response includes the first indication information.

S1110. The SMF sends a create bearer request to the MME.

For specific implementation of S1110, refer to the foregoing S812.

S1111. Continue to perform the TAU procedure.

For the TAU procedure, refer to the conventional technology.

S1112. The MME reserves, based on the first indication information, a PDN connection corresponding to the terminal.

It should be understood that the solutions in the embodiments of this disclosure may be properly combined for use, and explanations or descriptions of the terms appearing in the embodiments may be mutually referenced or explained in the embodiments. This is not limited herein.

It should be further understood that sequence numbers of the foregoing processes do not mean execution sequences in embodiments of this disclosure. The execution sequences of the processes should be determined based on functions and internal logic of the processes, and should not constitute any limitation on implementation processes of embodiments of this disclosure.

It may be understood that, to implement functions in any one of the foregoing embodiments, the first core network device, the second core network device, or another network device (for example, a PCF network element) includes a corresponding hardware structure and/or software module for performing the functions. A person skilled in the art should be easily aware that units, algorithms, and steps in the examples described with reference to embodiments disclosed in this specification can be implemented in a form of hardware or a combination of hardware and computer software in this disclosure. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure.

In the embodiments of this disclosure, a device such as the first core network device, the second core network device, or another network device (for example, a PCF network element) may be divided into functional modules. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example and is merely logical function division, and may be other division in an actual implementation.

Figure 12:
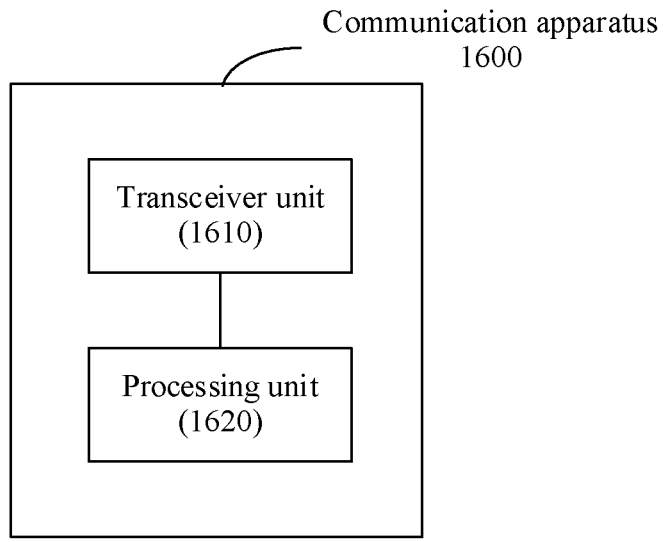
FIG. 12 is a schematic diagram of a structure of a communication apparatus according to an embodiment of this disclosure.

For example, when each functional module is obtained through division in an integrated manner, FIG. 12 is a block diagram of a structure of a communication apparatus according to an embodiment of this disclosure. A communication apparatus 1600 may be a first core network device or an apparatus (which is, for example, but is not limited to a chip system) that supports a function of the first core network device, or may be a second core network device (for example, an MME) or an apparatus that supports a function of the second core network device. The communication apparatus may include a transceiver unit 1610 and a processing unit 1620.

When the communication apparatus is a first core network device, the transceiver unit 1610 is configured to support the first core network device in performing the foregoing step S703, and/or is configured to support another process of the technology described in this specification. The processing unit 1620 is configured to assist the first core network device in performing the foregoing step S702, and/or is configured to support another process of the technology described in this specification.

Further, when the first core network device is an SMF, the transceiver unit 1610 is configured to support the SMF in performing the foregoing steps S703, S803a1, S803a2, S805a, S806a, S810a, S813a, S816a, S817a, S803b1, S803b2, S805b, S806b, S810b, S814b, S805c, S806c, S810c, S813c, S816c, S817c, S805d, S806d, S903a1, S903a2, S1003, S1004, S1104, and S1105, and/or is configured to support another process of the technology described in this specification. The processing unit 1620 is configured to assist the SMF in performing the foregoing steps S702, S802a, S803a, S802b, S803b, S902a, and S903a, and/or is configured to support another process of the technology described in this specification.

Further, when the first core network device is an AMF, the transceiver unit 1610 is configured to support the AMF in performing the foregoing steps S703, S803a1, S803a2, S805a, S806a, S807a, S803b1, S803b2, S805b, S806b, S807b, S805c, S806c, S807c, S805d, S806d, S807d, S903a1, S903a2, S1003, S1004, S1005, S1104, S1105, and S1106, and/or is configured to support another process of the technology described in this specification. The processing unit 1620 is configured to assist the AMF in performing the foregoing steps S702, S802c, S803c, S802d, S803d, S902c, S903c, S902d, and S903d, and/or is configured to support another process of the technology described in this specification.

When the communication apparatus is an MME, the transceiver unit 1610 is configured to support the MME in performing the foregoing steps S703, S807a, S813a, S816a, S814a, S815a, S807b, S810b, S813b, S807c, S810c, S814c, S813c, S815c, S816c, S807d, S908a, S914b, S1005, S1104, and S1105, and/or is configured to support another process of the technology described in this specification. The processing unit 1620 is configured to assist the MME in performing the foregoing steps S701, S704, S808a, S810a, S812a, S808b, S812b, S812c, S812d, S913a, S1010, and S1112, and/or is configured to support another process of the technology described in this specification.

Optionally, the communication apparatus further includes a storage unit (not shown in FIG. 12). The storage unit is configured to store program code and data of the communication apparatus, where the data may include but is not limited to original data or intermediate data.

In a possible manner, the processing unit 1620 may be a controller, or the processor 401 or the processor 408 shown in FIG. 6, such as a CPU, a general-purpose processor, a digital signal processor (DSP), an ASIC, a field-programmable gate array (FPGA), or another programmable logic device, a transistor logic device, a hardware component, or any combination thereof. The processing unit 1620 may implement or execute logical blocks, modules, and circuits in various examples described with reference to content disclosed in this disclosure. Alternatively, the processor may be a combination for implementing a computing function, for example, a combination of one or more microprocessors, or a combination of a DSP and a microprocessor. The transceiver unit 1610 may be the communication interface 404 shown in FIG. 6, or may be a transceiver circuit or the like. The storage unit may be the memory 403 shown in FIG. 6.

In a scenario in which a terminal is handed over or redirected from a 5G network to a 4G network or a scenario in which a terminal is handed over or redirected from 4G to 5G, a core network device may mistakenly delete a PDN connection corresponding to the terminal.

To reduce a probability that the core network device mistakenly deletes the PDN connection, the embodiments of this disclosure further provide a communication method. The method may be applied to a scenario in which a terminal moves from a first TA of a third network to a second TA of a fourth network. A RAT of the third network is different from a RAT of the fourth network. It should be noted that "a terminal moves from a first TA of a third network to a second TA of a fourth network" herein may be caused because a location of the terminal is changed, or may be caused by a service of the terminal, for example, a voice service of the terminal causes movement of the terminal from a 5G network to a 4G network, or may be caused by coverage of a network signal at a location of the terminal.

Figure 13:
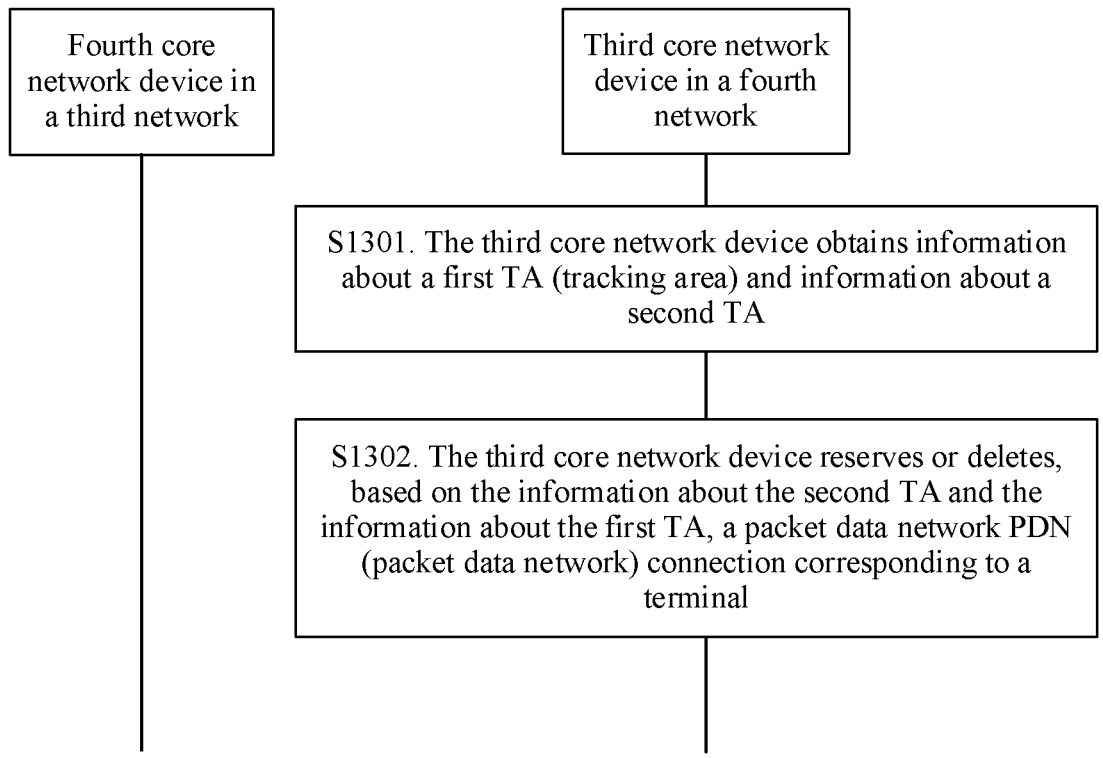
FIG. 13 is a schematic flowchart of a communication method according to an embodiment of this disclosure.

In some embodiments, the third network is, for example, a 5GS network, and the fourth network is, for example, an EPS network. The RAT of the third network is, for example, but is not limited to NR. The RAT of the fourth network is, for example, but is not limited to LTE. In some other embodiments, the third network is, for example, an EPS, and the fourth network is, for example, a 5GS. To be specific, the method may be applied in a 5GS to EPS procedure, or an EPS to 5GS procedure, or another similar procedure. Referring to FIG. 13, the method includes the following steps. S1301. A third core network device obtains information about the first TA and information about the second TA.

The third core network device may be the SMF shown in FIG. 3 or FIG. 4. In addition, the SMF may be an integrated SMF. For example, the integrated SMF may have a function of an existing SMF and a PGW-C function. The PGW-C function includes a control plane function such as session management and bearer control. Alternatively, the third core network device may be the MME shown in FIG. 3 or FIG. 4, or may be the AMF shown in FIG. 3 or FIG. 4.

Optionally, the first TA may be referred to as a source TA. The information about the first TA may be, for example, but is not limited to a TAI of the first TA, and may also be referred to as a source TAI. The second TA may be referred to as a target TA. The information about the second TA may be, for example, but is not limited to a TAI of the second TA, and may also be referred to as a target TAI.

A TAI format in 5G is different from a TAI format in 4G. Further, a length of the 5G TAI is 3 bytes, and a length of the 4G TAI is 2 bytes. Because the TAI format in 4G and the TAI format in 5G are different, a 4G network element (for example, an MME) cannot identify the 5G TAI. Therefore, the 4G network element cannot perceive a 5G area, and does not know a specific 5G TA from which the terminal falls back to a 4G TA. Similarly, the AMF can only identify the 5G TAI, and cannot identify the 4G TAI.

An example in which the terminal moves between the 5G TA and the 4G TA is used. To enable the third core network device to identify both the 4G TAI and the 5G TAI, the third core network device may preconfigure information about a third preset area. The third preset area may include at least one TA of the third network and at least one TA of the fourth network. The information about the third preset area includes information about the at least one TA of the third network and information about the at least one TA of the fourth network. For example, the information about the third preset area includes at least one TAI of the third network and at least one TAI of the fourth network.

When the terminal enters the third preset area, the terminal is re-registered with a core network device, or a PDU session of the terminal is deleted by a core network device, and the core network device indicates the terminal to re-establish a PDU session.

Figure 14A:
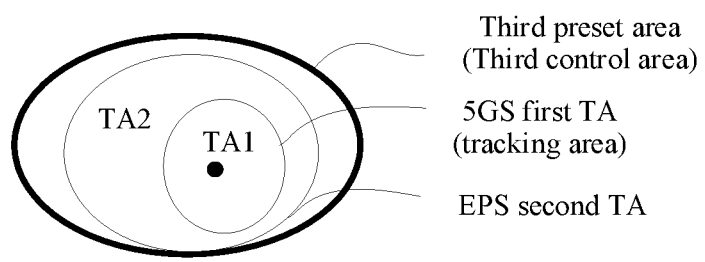
FIG. 14A, FIG. 14B, and FIG. 14C are schematic diagrams of an application scenario according to an embodiment of this disclosure.

In a possible design, the third preset area may be the control area defined above, and communication in the control area is limited. For example, an IP address is re-allocated to a terminal that enters the control area, and the IP address may be used to perform only some types of services. The third preset area may also be referred to as a third control area. For example, the information about the third preset area shown in FIG. 14A is preconfigured for the third core network device, and the third preset area includes a TA1 in 5G and a TA2 in 4G. The information about the third preset area includes an identifier of the TA1 and an identifier of the TA2.

In this way, because the 4G TAI and the 5G TAI are preconfigured for the third core network device, the third core network device can identify both the TAI format in 4G and the TAI format in 5G.

A specific 5G TA from which the terminal falls back to the 4G TA is identified, or a specific 4G TA from which the terminal moves to the 5G TA is identified.

For specific implementation of obtaining the information about the second TA by the third core network device, refer to the following description. For example, when the third core network device is an SMF, the SMF may obtain the information about the second TA based on the following step S1503. For another example, when the third core network device is an MME, the MME may obtain the information about the second TA based on the following step S2202. For another example, when the third core network device is an AMF, the AMF may obtain the information about the second TA based on the following step S2703.

In a possible implementation, if the third core network device is an MME, that the third core network device obtains the information about the first TA may be implemented as follows. The third core network device receives the information about the first TA from a fourth core network device in the third network. The fourth core network device is, for example, but is not limited to an AMF. For example, in a scenario in which the terminal moves from the 5G network to the 4G network, the MME in the 4G network may receive a 5G TAI from the AMF in the 5G network.

In a possible implementation, if the third core network device is an AMF, that the third core network device obtains the information about the first TA may be implemented as follows. The third core network device receives the information about the first TA from a fourth core network device in the third network. The fourth core network device is, for example, but is not limited to an MME. For example, in a scenario in which the terminal moves from the 4G network to the 5G network, the AMF in the 5G network may receive a 4G TAI from the MME in the 4G network.

In a possible implementation, if the third core network device is an integrated SMF, for specific implementation of obtaining the information about the first TA by the third core network device, refer to the following description, for example, refer to S1503.

S1302. The third core network device reserves or deletes, based on the information about the second TA and the information about the first TA, a PDN connection corresponding to the terminal.

In an optional implementation, the third core network device first determines, based on the information about the second TA and the information about the first TA, whether to delete the PDN connection corresponding to the terminal. If determining to delete the PDN connection corresponding to the terminal, the third core network device deletes the PDN connection corresponding to the terminal. Alternatively, if determining not to delete the PDN connection corresponding to the terminal, the third core network device reserves the PDN connection corresponding to the terminal.

The PDN connection corresponding to the terminal may be a PDN connection that is in the 4G network and that is established by the terminal. In a scenario in which interworking between the 4G network and the 5G network is supported, the PDN connection in the 4G network may be further mapped as a PDU session in the 5G network.

In a possible implementation, the third core network device determines, according to the following rule, to reserve the PDN connection corresponding to the terminal.

Optionally, if both the first TA and the second TA belong to the third preset area, the third core network device reserves the PDN connection corresponding to the terminal. It indicates that the terminal moves in the third preset area, and does not cross an area (moves out of a control area or moves into a control area). The integrated SMF may reserve the PDN connection corresponding to the terminal. Correspondingly, the integrated SMF may not re-allocate an IP address to the terminal. For example, for the scenario, refer to FIG. 14A. For another example, for the scenario, refer to FIG. 18A, FIG. 18B, or FIG. 18C.

Alternatively, optionally, if the second TA belongs to the third preset area, the first TA does not belong to the third preset area, and EPS fallback of the terminal is triggered, the third core network device reserves the PDN connection corresponding to the terminal. For example, referring to FIG. 14C, the third core network device perceives that the terminal falls back from a TA1 in the 5GS to a TA6 in the EPS, the TA1 and the TA6 are not in a same preset area range, and the terminal crosses an area, that is, moves into the preset area. In this case, if the third core network device detects that EPS fallback of the terminal is triggered, to reduce a probability that a service of the terminal fails or is interrupted, the integrated SMF reserves the PDN connection corresponding to the terminal.

Figure 14B:
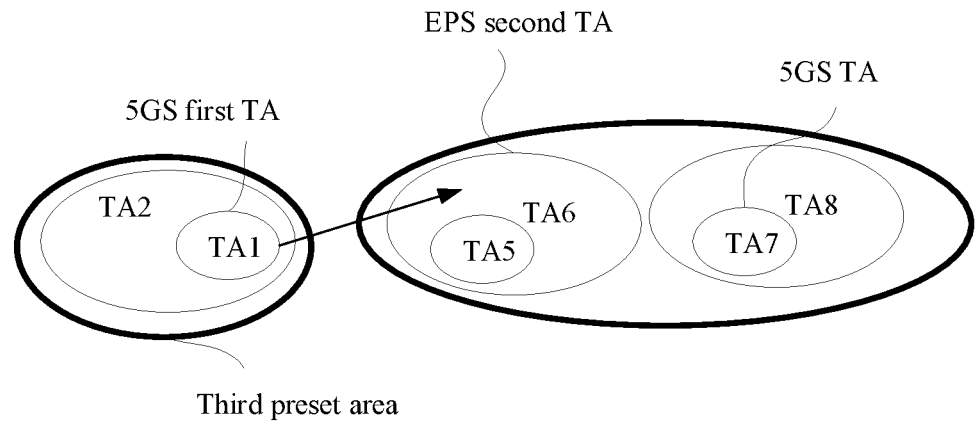
Figure 14C:
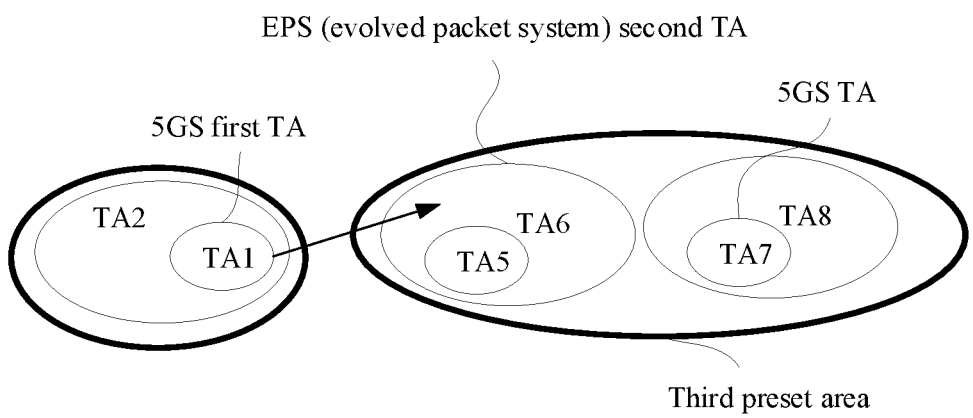

Alternatively, if the second TA does not belong to the third preset area, the first TA belongs to the third preset area, and EPS fallback of the terminal is triggered, the third core network device reserves the PDN connection corresponding to the terminal. Referring to FIG. 14B, the terminal crosses an area, and falls back from a TA1 to a TA6. If the third core network device detects EPS fallback of the terminal, the third core network device may reserve the PDN connection corresponding to the terminal, to improve continuity of a voice service.

In a possible implementation, the third core network device determines, according to the following rule, to delete the PDN connection corresponding to the terminal.

Optionally, if the second TA belongs to the third preset area, the first TA does not belong to the third preset area, and the terminal performs a non-voice service, the third core network device deletes the PDN connection corresponding to the terminal. Still referring to FIG. 14C, the terminal crosses an area, and falls back from a TA1 to a TA6. In some embodiments, if the third core network device does not detect EPS fallback of the terminal, the third core network device may delete the PDN connection corresponding to the terminal. In some other embodiments, if the third core network device detects that the terminal performs a non-voice service, because the non-voice service does not impose a high requirement on service continuity, the third core network device may delete the PDN connection corresponding to the terminal.

If the third core network device is an integrated SMF or an AMF, for how the integrated SMF or the AMF further detects whether EPS fallback of the terminal is triggered, refer to the foregoing embodiment, for example, refer to the foregoing S702.

If the third core network device is an MME, the MME may receive corresponding indication information from the AMF, to learn whether EPS fallback of the terminal is triggered, for example, receive the foregoing first indication information EPS fallback indicator. The MME may learn, in another manner, whether EPS fallback is triggered. This is not limited in this embodiment of this disclosure.

Alternatively, optionally, if the second TA does not belong to the third preset area, the first TA belongs to the third preset area, and the terminal performs a non-voice service, the third core network device deletes the PDN connection corresponding to the terminal. Still referring to FIG. 14B, the terminal crosses an area, and falls back from a TA1 to a TA6. In some embodiments, if the third core network device detects EPS fallback of the terminal, the third core network device may delete the PDN connection corresponding to the terminal. In some other embodiments, if the third core network device detects that the terminal performs a non-voice service, because the non-voice service does not impose a high requirement on service continuity, the third core network device may delete the PDN connection corresponding to the terminal.

Alternatively, optionally, if the second TA does not belong to the third preset area, the first TA belongs to the third preset area, and EPS fallback of the terminal is not triggered, the third core network device deletes the PDN connection corresponding to the terminal.

Alternatively, optionally, if the second TA belongs to the third preset area, the first TA does not belong to the third preset area, and EPS fallback of the terminal is not triggered, the third core network device deletes the PDN connection corresponding to the terminal.

Alternatively, optionally, the second TA belongs to the third preset area, the first TA does not belong to the third preset area. In this case, the first TA may belong to another control area, or the first TA belongs to a non-control area. This means that the terminal moves into the third control area from another control area or a non-control area, and the terminal crosses an area. In this case, the third core network device may delete the PDN connection corresponding to the terminal. For the scenario, refer to FIG. 14C. For another example, for the scenario, refer to FIG. 18B.

Alternatively, optionally, the first TA belongs to the third preset area, the second TA does not belong to the third preset area. In this case, the second TA may belong to another control area or a non-control area. This means that the terminal moves out of the third control area, and the terminal crosses an area. In this case, the third core network device may delete the PDN connection corresponding to the terminal. For the scenario, refer to FIG. 14B. For another example, for the scenario, refer to FIG. 18C.

It is easy to understand that, when determining to delete the PDN connection corresponding to the terminal, the third core network device needs to execute a PDN connection deletion procedure. Because the PDN connection has a plurality of bearers, and the plurality of bearers include a unique default bearer, once the default bearer is deleted, the entire PDN connection is equivalent to being deleted. Therefore, the third core network device may delete, by deleting the default bearer of the terminal, the PDN connection corresponding to the terminal. Further, in a possible implementation, that the third core network device deletes the PDN connection corresponding to the terminal may mean that the third core network device sends a message used to delete the default bearer of the terminal, and this is equivalent to sending a message used to delete the PDN connection corresponding to the terminal. For the message sent by the third core network device to delete the PDN connection corresponding to the terminal, refer to the conventional technology. For example, if the third core network device is an SMF, the message used to delete the PDN connection corresponding to the terminal may be a delete bearer request.

In this embodiment of this disclosure, "reserve the PDN connection corresponding to the terminal" may be replaced with "skip deleting the PDN connection corresponding to the terminal". In a possible implementation, specific implementation in which the third core network device reserves the PDN connection corresponding to the terminal may mean that the third core network device does not send the message used to delete the PDN connection. For example, when the third core network device is an SMF, the SMF does not send a delete bearer request used to delete the PDN connection.

In the communication method provided in this embodiment of this disclosure, the third core network device in the third network can obtain the information about the first TA and the information about the second TA. In other words, the third core network device can learn of location information of the terminal in the third network and location information of the terminal in the fourth network. In this way, the third core network device can determine, based on the information about the first TA and the information about the second TA, to reserve or delete the PDN connection corresponding to the terminal, to reduce a probability that a call service of the terminal is interrupted because the core network device mistakenly deletes the PDN connection corresponding to the terminal.

For example, in the conventional technology, in the scenario in FIG. 14A, the terminal moves from a TA1 to a TA2 in the third preset area. Because the MME cannot perceive that the terminal moves from the TA1 to the TA2, the MME considers that the terminal moves from an area outside the third preset area to the TA2. In this case, the MME deletes the PDN connection corresponding to the terminal. Similarly, in scenarios in FIG. 14B and FIG. 14C, the MME may also mistakenly delete the PDN connection corresponding to the terminal that is on a call. In this embodiment of this disclosure, in the scenario in FIG. 14A, the third core network device may reserve or delete, based on the information about the first TA and the information about the second TA, the PDN connection corresponding to the terminal, that is, the third core network device may not delete the PDN connection corresponding to the terminal. In this way, a probability that a service of the terminal is interrupted because the PDN connection is mistakenly deleted can be reduced.

Figure 15:
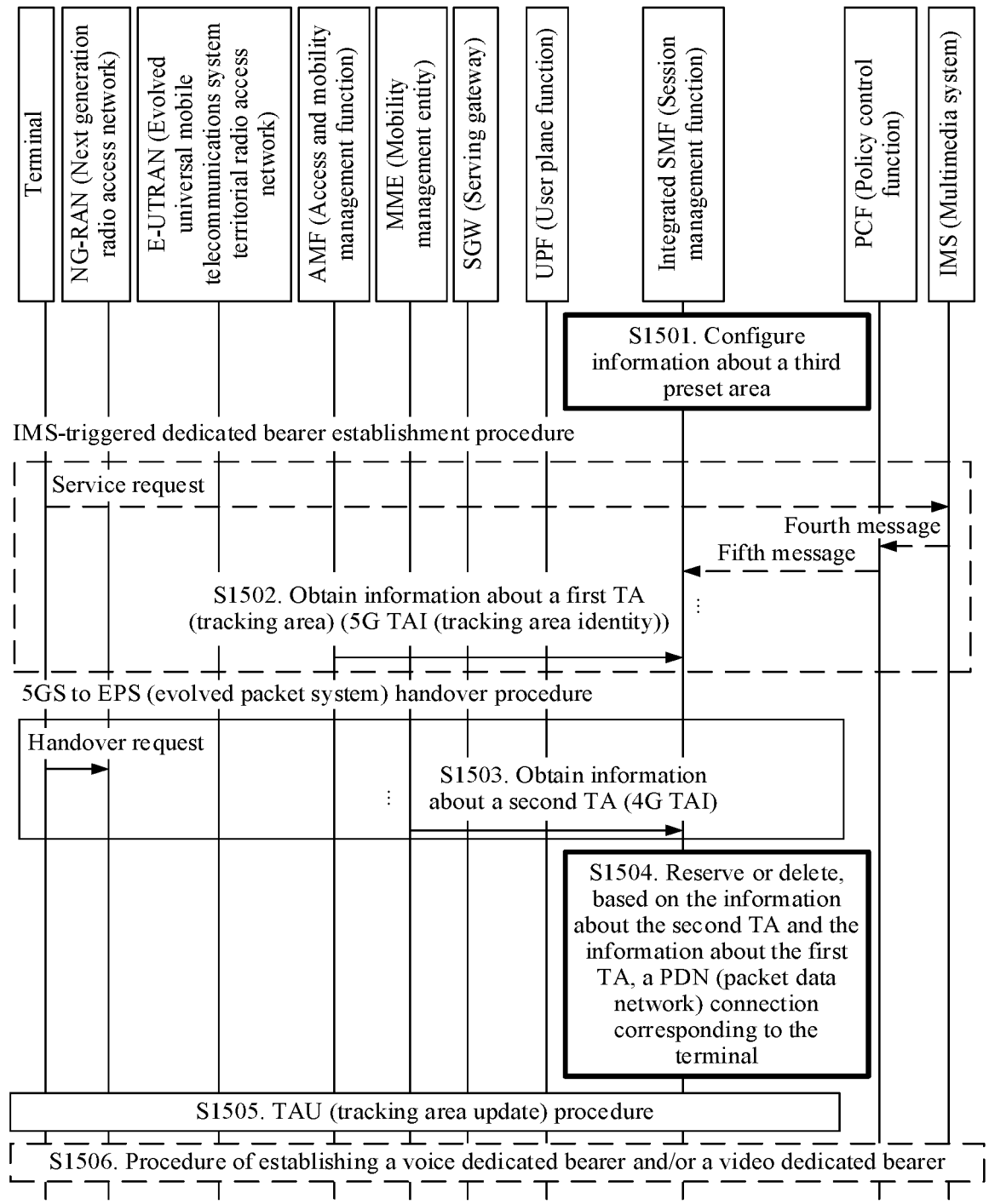
FIG. 15 is a schematic flowchart of a communication method according to an embodiment of this disclosure.
Figure 16:
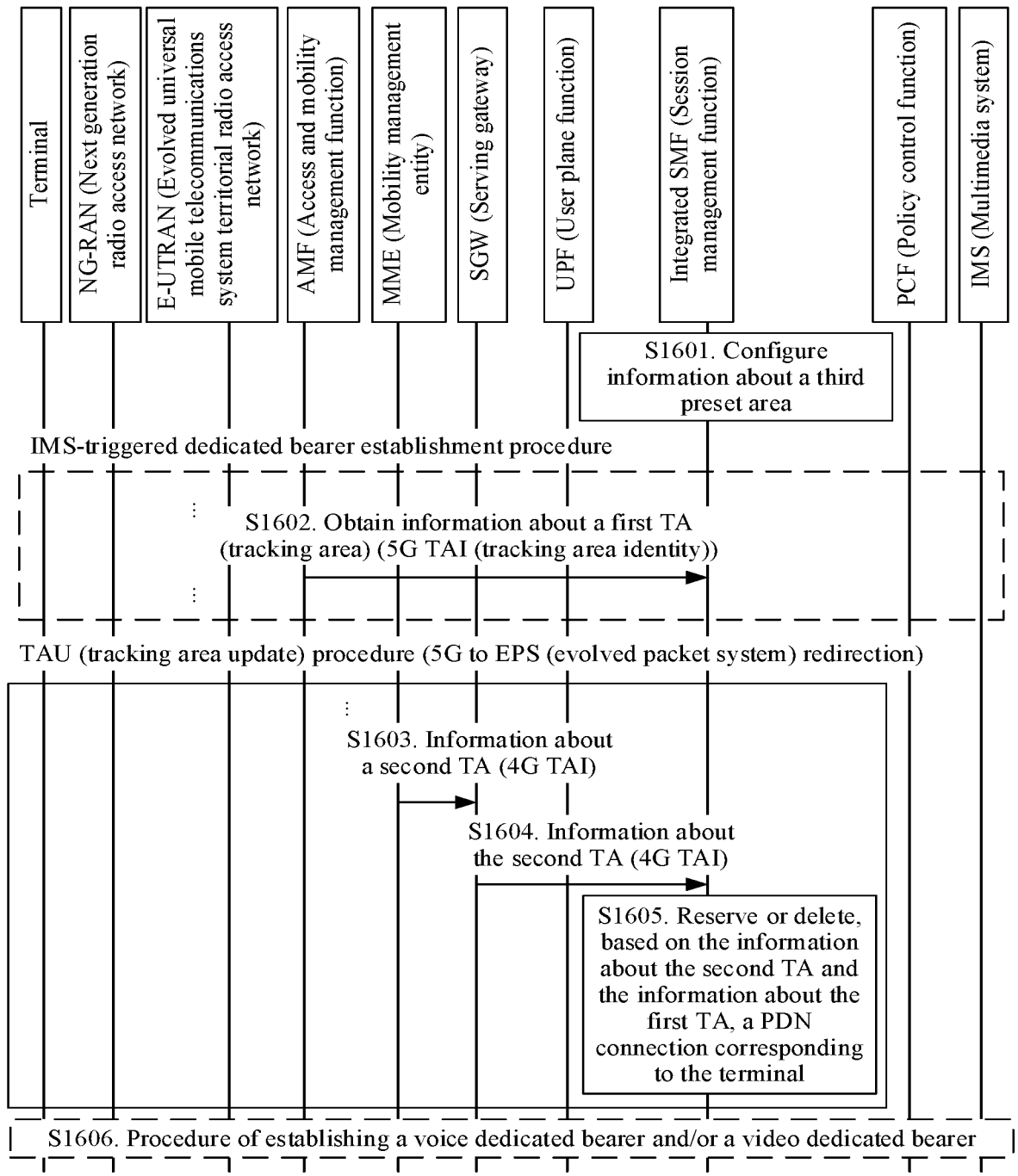
FIG. 16 is a schematic flowchart of a communication method according to an embodiment of this disclosure.
Figure 17:
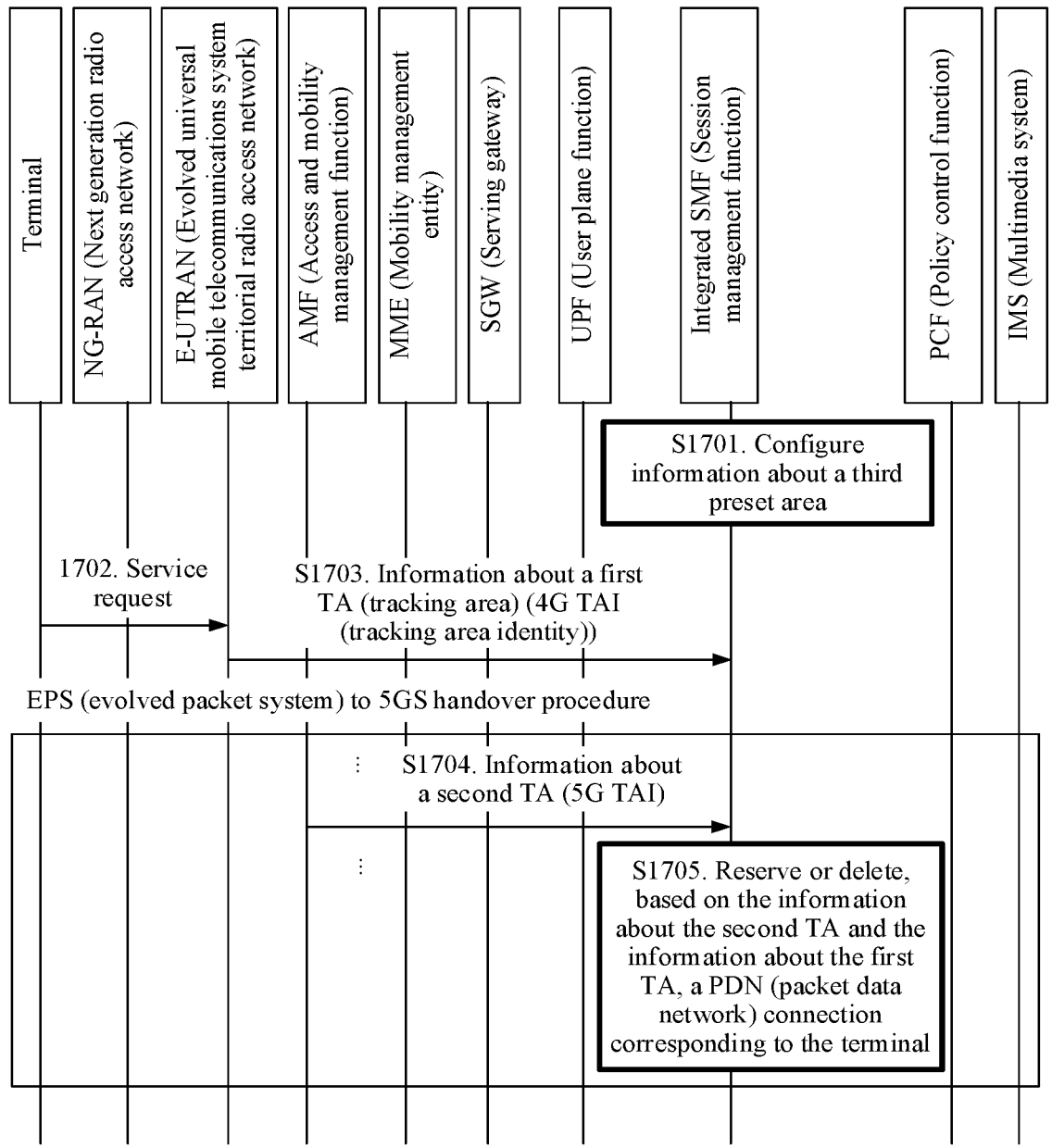
FIG. 17 is a schematic flowchart of a communication method according to an embodiment of this disclosure.
Figure 18A:
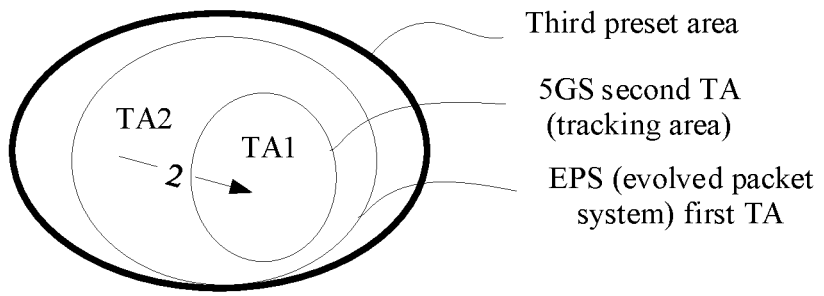
FIG. 18A, FIG. 18B, and FIG. 18C are schematic diagrams of an application scenario according to an embodiment of this disclosure.
Figure 18B:
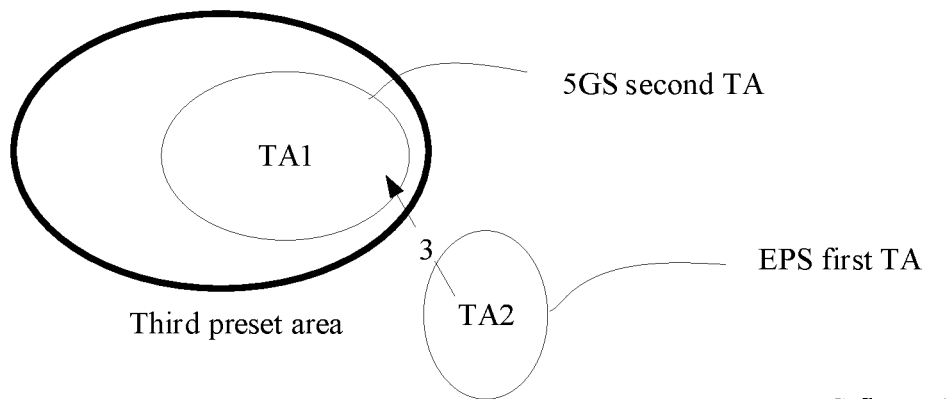
Figure 18C:
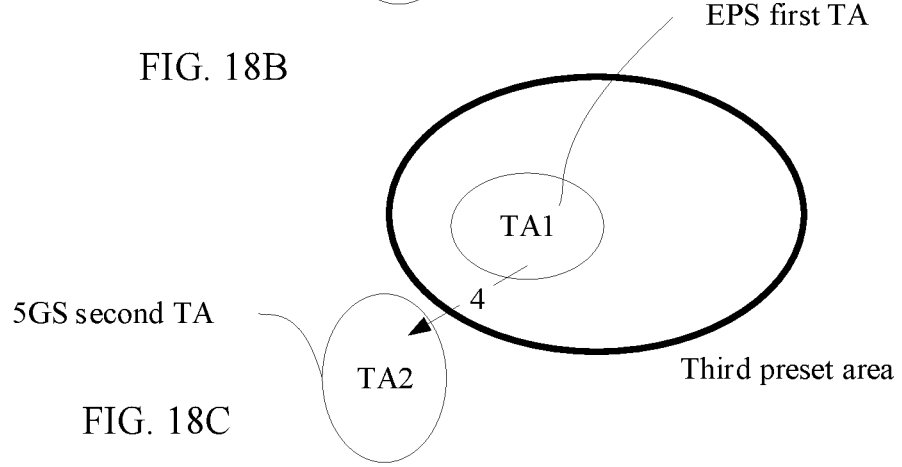
Figure 19:
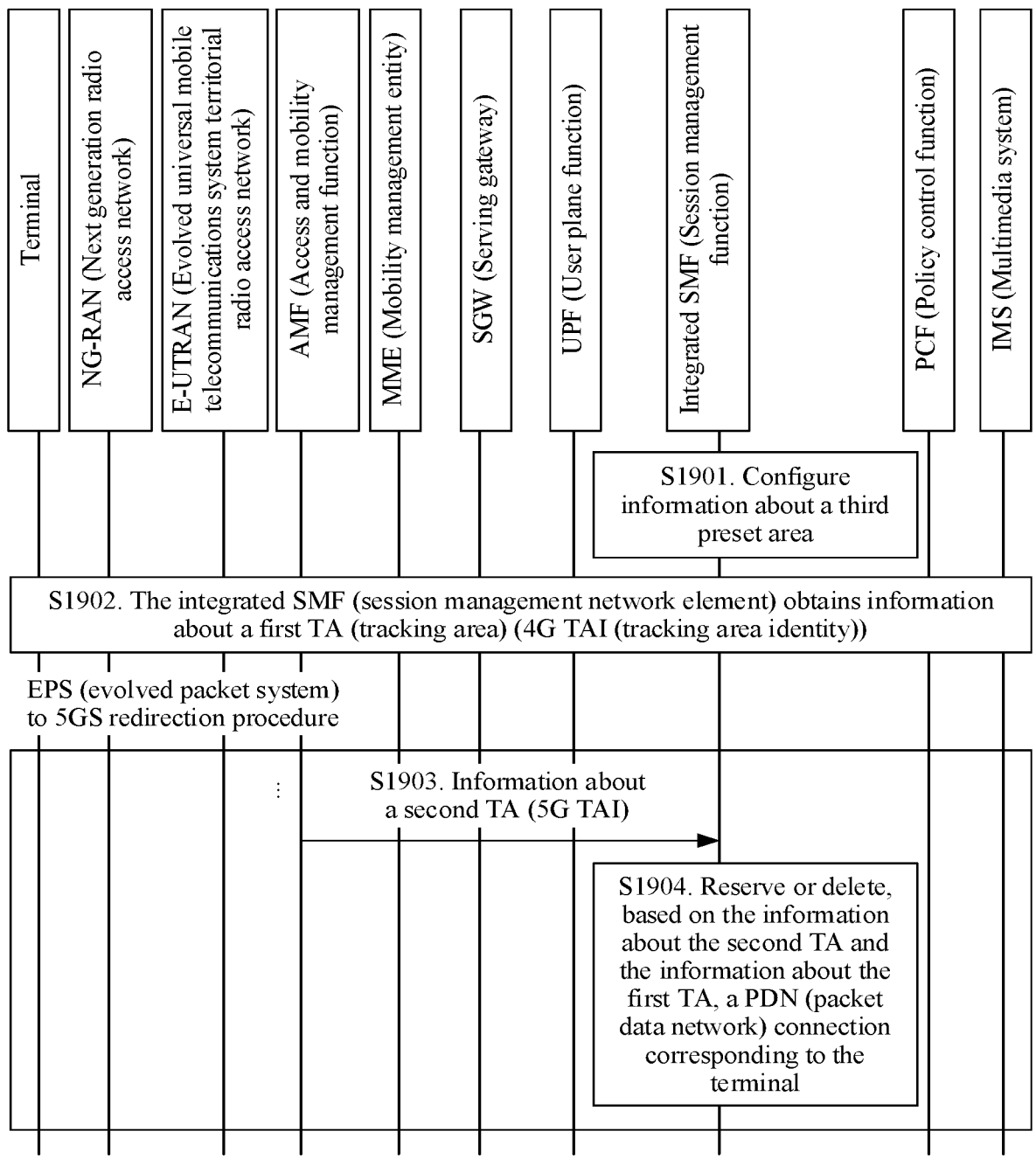
FIG. 19 is a schematic flowchart of a communication method according to an embodiment of this disclosure.

Based on specific scenarios in FIG. 15 to FIG. 19, the following describes the solution corresponding to FIG. 13. In embodiments corresponding to FIG. 15 to FIG. 19, the integrated SMF replaces a mobility management network element (MME or AMF) to determine whether to delete the PDN connection corresponding to the terminal. Further, the embodiment corresponding to FIG. 15 is applied to a scenario in which the terminal is handed over from the 5GS to the EPS (namely, 4G). The embodiment corresponding to FIG. 16 is applied to a scenario in which the terminal is redirected from the 5GS to the EPS. The embodiment corresponding to FIG. 17 is applied to a scenario in which the terminal is handed over from the EPS to the 5GS. The embodiment corresponding to FIG. 19 is applied to a scenario in which the terminal is redirected from the EPS to the 5GS.

An example in which the terminal falls back from the 5GS to the EPS in a handover manner and the third core network device is an SMF is used. Referring to FIG. 15, a communication method provided in an embodiment of this disclosure includes the following steps.

S1501. An integrated SMF configures information about a third preset area.

The third preset area includes at least one TA of a third network and at least one TA of a fourth network. FIG. 14B is still used as an example, and the third preset area configured by the integrated SMF includes a 5G TA1 and a 4G TA2.

A quantity of configured third preset areas is not limited in this embodiment of this disclosure. A quantity of TAs included in the third preset area is not limited.

S1502. The integrated SMF obtains information about a first TA.

In a possible implementation, as shown in FIG. 15, in a dedicated bearer establishment procedure triggered by an IMS in an EPS fallback scenario, step S1502 may be implemented as follows. An AMF sends an update session context request (Nsmf_PDUSession_UpdateSMContext Request) to the integrated SMF, where the update session context request carries the information about the first TA. For specific implementation of the dedicated bearer establishment procedure triggered by the IMS, refer to the foregoing step S701.

In some other embodiments, step S1502 may be implemented as follows. In a service request procedure, an access network device (for example, an NG-RAN device) reports the information about the first TA to the integrated SMF, for example, a 5G TAI existing before the terminal is handed over.

Alternatively, the integrated SMF obtains the information about the first TA by using another possible procedure. This is not limited in this embodiment of this disclosure.

S1503. The SMF obtains information about a second TA.

In a possible implementation, step S1503 may be implemented as follows. In a 5GS to EPS handover procedure, an MME sends a modify bearer request to an SGW, and then the SGW sends the modify bearer request to the integrated SMF, where the modify bearer request carries the information about the second TA, for example, a 4G TAI existing after the terminal is handed over.

Optionally, after receiving the modify bearer request, the integrated SMF feeds back a modify bearer response to the MME. Further, the integrated SMF sends the modify bearer response to the MME by using the SGW.

S1504. The integrated SMF reserves or deletes, based on the information about the second TA and the information about the first TA, a PDN connection corresponding to the terminal.

The integrated SMF also has a PGW-C function. Therefore, the integrated SMF can determine, based on the 4G TAI existing after handover, the 5G TAI existing before handover, and the configured third preset area, whether the PDN connection corresponding to the terminal needs to be deleted. For a specific determining method, refer to the foregoing embodiment.

It should be noted that S1504 may be performed after handover is completed, or may be performed immediately after S1503.

S1505. TAU procedure.

When the third core network device is an SMF, the SMF is responsible for reserving or deleting, based on the information about the first TA and the information about the second TA, the PDN connection corresponding to the terminal, and the MME is not responsible for reserving or deleting the PDN connection corresponding to the terminal. Further, when the MME determines that the terminal is handed over or redirected from the third network to the fourth network, the MME does not determine whether to delete the PDN connection corresponding to the terminal.

In a possible implementation, the MME receives a forward relocation request message from the AMF, where the message carries N26 interface indication information. The MME determines, based on the N26 interface indication information, that the current procedure is a handover procedure, that is, determines that the terminal falls back from the third network to the fourth network in a handover manner.

In a possible implementation, the MME receives a TAU request message from the terminal, where the message includes a terminal identity (UE Status) information element (IE). In a possible implementation, the identity information element includes a first flag. The MME determines, based on the first flag in the terminal identity information element, that the current procedure is a redirection procedure, that is, the terminal is redirected from the third network to the fourth network.

Alternatively, the MME receives a context response message from the AMF, where the message includes RAT Type=NR. The MME determines, based on the RAT type, that the terminal is redirected from the third network to the fourth network.

S1506. Procedure of establishing a voice dedicated bearer and/or a video dedicated bearer.

This step is an optional step. When EPS fallback of the terminal is triggered, and a call service needs to be performed, the procedure includes this step. A common handover procedure may not include this step.

For the steps in the embodiment corresponding to FIG. 15, some steps are not described in detail. For specific implementation of the steps, refer to another embodiment, or refer to the conventional technology.

An example in which the terminal is redirected from the 5GS to the EPS and the third core network device is an integrated SMF is used. Referring to FIG. 16, a communication method provided in an embodiment of this disclosure includes the following steps.

S1601. An integrated SMF configures information about a third preset area.

S1602. The integrated SMF obtains information about a first TA.

In a possible implementation, in a dedicated bearer establishment procedure triggered by an IMS, an Nsmf_PDUSession_UpdateSMContext Request sent by an AMF to the integrated SMF carries information (5G TAI) about a first TA.

S1603. An MME sends information about a second TA to an SGW.

Correspondingly, the SGW receives the information about the second TA from the MME.

In a possible implementation, the MME sends a create session request to the SGW, where the create session request includes the information about the second TA, for example, a 4G TAI existing after the terminal is handed over.

S1604. The SGW sends the information about the second TA to the integrated SMF.

The SGW sends the information about the second TA to the integrated SMF.

Correspondingly, the integrated SMF receives the information about the second TA from the SGW.

In a possible implementation, after receiving the create session request from the MME, the SGW sends a modify bearer request to the SMF, where the modify bearer request carries the information about the second TA.

S1605. The integrated SMF reserves or deletes, based on the information about the second TA and the information about the first TA, a PDN connection corresponding to the terminal.

Further, the integrated SMF determines, based on the 4G TAI existing after handover, the 5G TAI existing before handover, and the configured third preset area, whether the PDN connection corresponding to the terminal needs to be deleted. For a specific determining method, refer to the foregoing embodiment.

(Optional) S1606. Procedure of establishing a voice dedicated bearer and/or a video dedicated bearer.

For the steps in the embodiment corresponding to FIG. 16, some steps are not described in detail. For specific implementation of the steps, refer to another embodiment, or refer to the conventional technology.

An example in which the terminal is handed over from the EPS to the 5GS and the third core network device is an SMF is used. Referring to FIG. 17, a communication method provided in an embodiment of this disclosure includes the following steps.

S1701. An integrated SMF configures information about a third preset area.

S1702. A terminal sends a service request to an E-UTRAN device.

For example, the terminal in an idle mode initiates a service request procedure, to establish a connection to the E-UTRAN device.

S1703. The E-UTRAN device sends information about a first TA to the SMF.

In the service request procedure, the E-UTRAN device reports location information of the terminal to the integrated SMF, namely, the information about the first TA, for example, a 4G TAI.

S1704. An AMF sends information about a second TA to the integrated SMF.

Correspondingly, the integrated SMF receives the information about the second TA from an MME.

In a possible implementation, after the AMF receives the foregoing forward relocation request from the MME, the AMF sends a create session management context request, namely, an SMF_PDUSession_CreateSMContext Request, to the integrated SMF, where the SMF_PDUSession_CreateSMContext Request includes the information (5G TAI) about the second TA.

S1705. The integrated SMF reserves or deletes, based on the information about the second TA and the information about the first TA, a PDN connection corresponding to the terminal.

The integrated SMF determines, according to the following rule, whether to delete the PDN connection corresponding to the terminal.

Optionally, if both the first TA and the second TA belong to the third preset area, the integrated SMF reserves the PDN connection corresponding to the terminal. For example, as shown in FIG. 18A, if the integrated SMF perceives that the terminal moves from a TA2 to a TA1 in the third preset area, the integrated SMF reserves the PDN connection corresponding to the terminal.

Alternatively, optionally, if the second TA belongs to the preset area, the first TA does not belong to the preset area, and EPS fallback of the terminal is not triggered and/or the terminal performs a non-voice service, the integrated SMF deletes the PDN connection corresponding to the terminal. For example, as shown in FIG. 18B, if the integrated SMF perceives that the terminal moves from a TA2 in a non-control area to a TA1 in the third preset area, and does not perceive that EPS fallback of the terminal is triggered, the integrated SMF deletes the PDN connection corresponding to the terminal.

Alternatively, optionally, if the second TA belongs to the preset area, the first TA does not belong to the preset area, and EPS fallback of the terminal is not triggered and/or the terminal performs a non-voice service, the integrated SMF deletes the PDN connection corresponding to the terminal. For example, as shown in FIG. 18B, if the integrated SMF perceives that the terminal moves from a TA2 in a non-control area to a TA1 in the third preset area, and perceives that EPS fallback of the terminal is triggered, the integrated SMF deletes the PDN connection corresponding to the terminal.

Alternatively, optionally, if the second TA does not belong to the third preset area, the first TA belongs to the third preset area, and EPS fallback of the terminal is not triggered, the integrated SMF deletes the PDN connection corresponding to the terminal. For example, as shown in FIG. 18C, if the integrated SMF perceives that the terminal moves from a TA1 in the third preset area to a TA2 in a non-control area, and perceives that EPS fallback of the terminal is not triggered, the integrated SMF deletes the PDN connection corresponding to the terminal.

Alternatively, optionally, if the second TA does not belong to the third preset area, the first TA belongs to the third preset area, and EPS fallback of the terminal is triggered, the integrated SMF reserves the PDN connection corresponding to the terminal. For example, as shown in FIG. 18C, if the integrated SMF perceives that the terminal moves from a TA1 in the third preset area to a TA2 in a non-control area, and perceives that EPS fallback of the terminal is triggered, the integrated SMF deletes the PDN connection corresponding to the terminal.

For the steps in the embodiment corresponding to FIG. 17, some steps are not described in detail. For specific implementation of the steps, refer to another embodiment, or refer to the conventional technology.

An example in which the terminal is redirected from the 5GS to the EPS and the third core network device is an SMF is used. Referring to FIG. 19, a communication method provided in an embodiment of this disclosure includes the following steps.

S1901. An integrated SMF configures information about a third preset area.

S1902. The integrated SMF obtains information about a first TA.

For specific implementation of the step, refer to the conventional technology.

S1903. An AMF sends information about a second TA to the integrated SMF.

Correspondingly, the integrated SMF receives the information about the second TA from an AMF.

In a possible implementation, after the AMF sends Nudm_UECM_Registration/Nudm_SDM_Get/Subscribe to a UDM, the AMF sends an SMF_PDUSession_CreateSMContext Request message to the integrated SMF, where the SMF_PDUSession_CreateSMContext Request message includes the information about the second TA.

S1904. The integrated SMF reserves or deletes, based on the information about the second TA and the information about the first TA, a PDN connection corresponding to the terminal.

For a specific determining method of the integrated SMF, refer to the foregoing embodiment.

The embodiments of this disclosure further provide a communication method. The third core network device is a mobility management network element (MME or AMF), and the third preset area needs to be configured in advance in the mobility management network element.

The following describes the solutions of the embodiments of this disclosure based on specific scenarios in FIG. 20 to FIG. 27.

Figure 20:
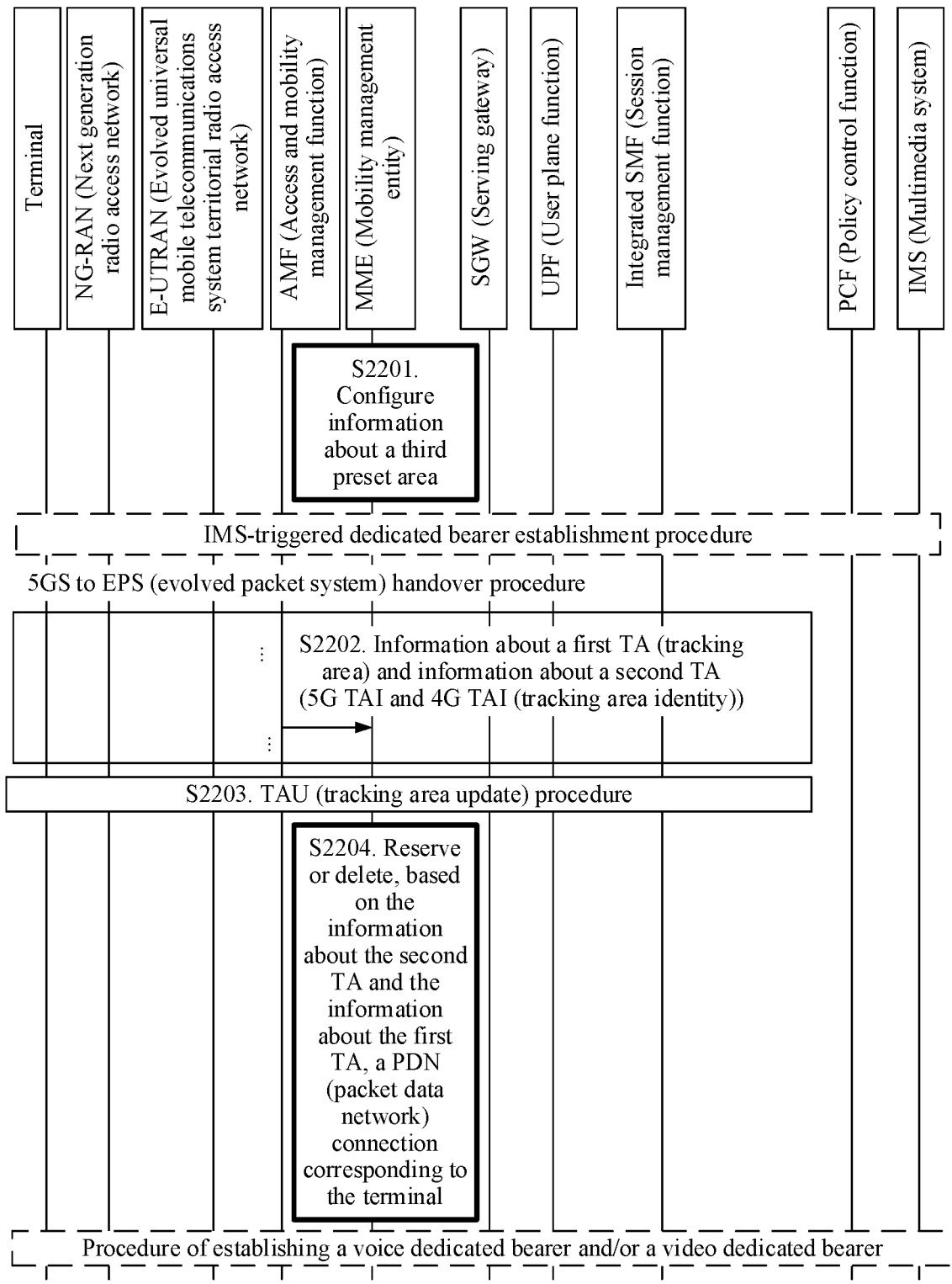
FIG. 20 is a schematic flowchart of a communication method according to an embodiment of this disclosure.
Figure 21:
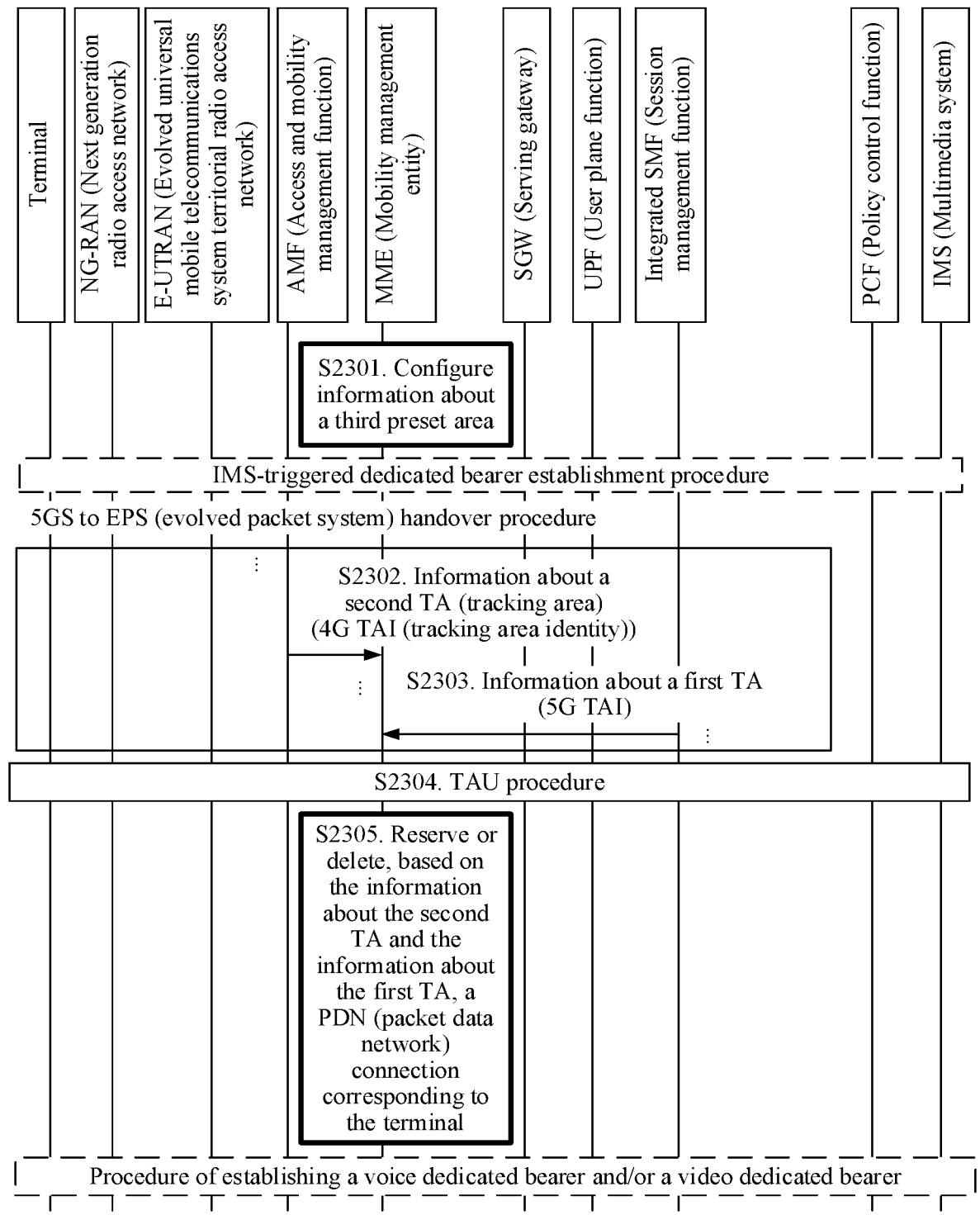
FIG. 21 is a schematic flowchart of a communication method according to an embodiment of this disclosure.

An embodiment corresponding to FIG. 20 is applied to a scenario in which the terminal is handed over from the 5GS to the EPS (namely, 4G), and the MME obtains the information about the first TA from the AMF, and determines whether to delete the PDN connection corresponding to the terminal. An embodiment corresponding to FIG. 21 is applied to a scenario in which the terminal is handed over from the 5GS to the EPS, and the MME obtains the information about the first TA from the integrated SMF, and determines whether to delete the PDN connection corresponding to the terminal.

Figure 22:
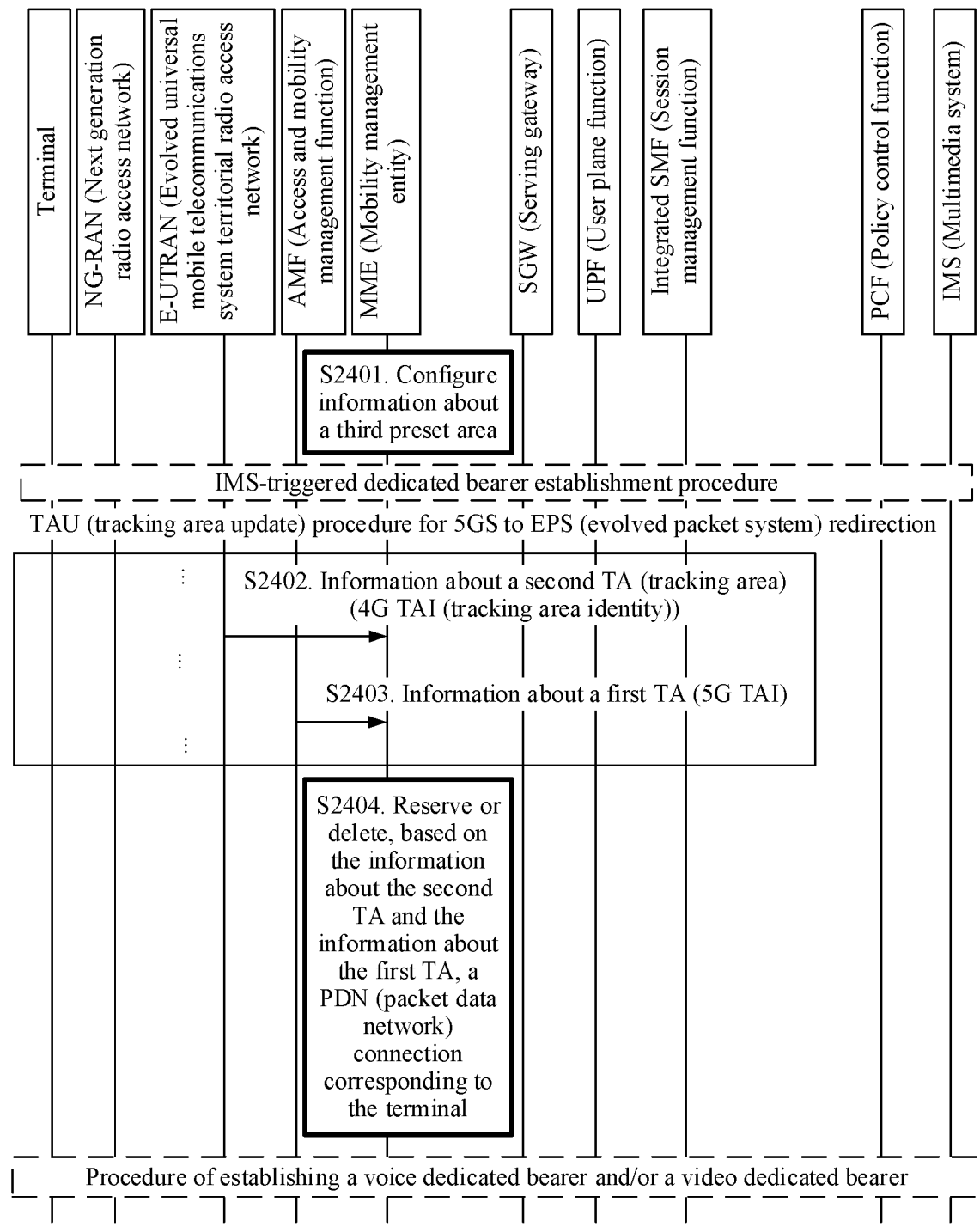
FIG. 22 is a schematic flowchart of a communication method according to an embodiment of this disclosure.
Figure 23:
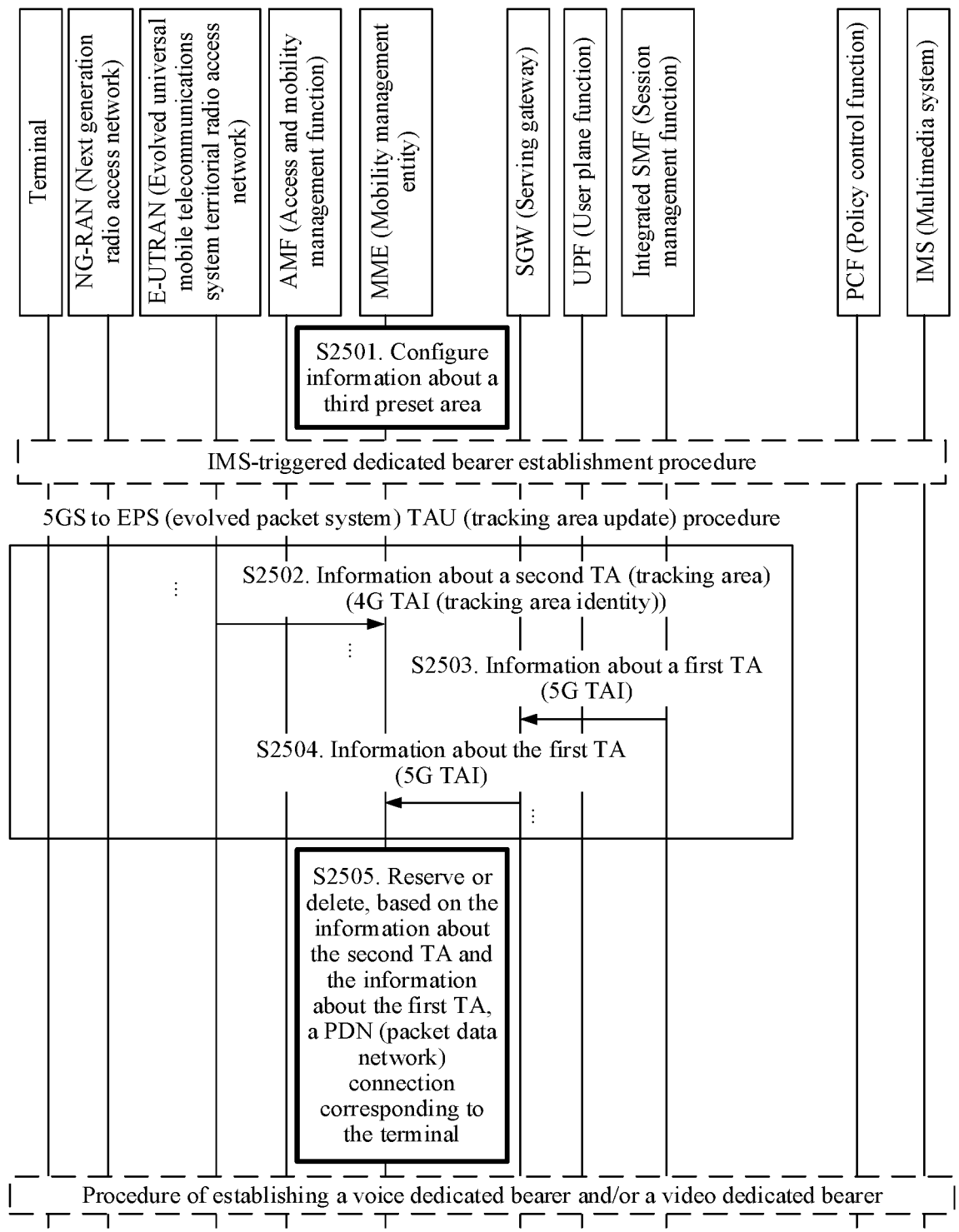
FIG. 23 is a schematic flowchart of a communication method according to an embodiment of this disclosure.

An embodiment corresponding to FIG. 22 is applied to a scenario in which the terminal is redirected from the 5GS to the EPS, and the MME obtains the information about the first TA from the AMF, and determines whether to delete the PDN connection corresponding to the terminal. An embodiment corresponding to FIG. 23 is applied to a scenario in which the terminal is redirected from the 5GS to the EPS, and the MME obtains the information about the first TA from the integrated SMF, and determines whether to delete the PDN connection corresponding to the terminal.

Figure 24:
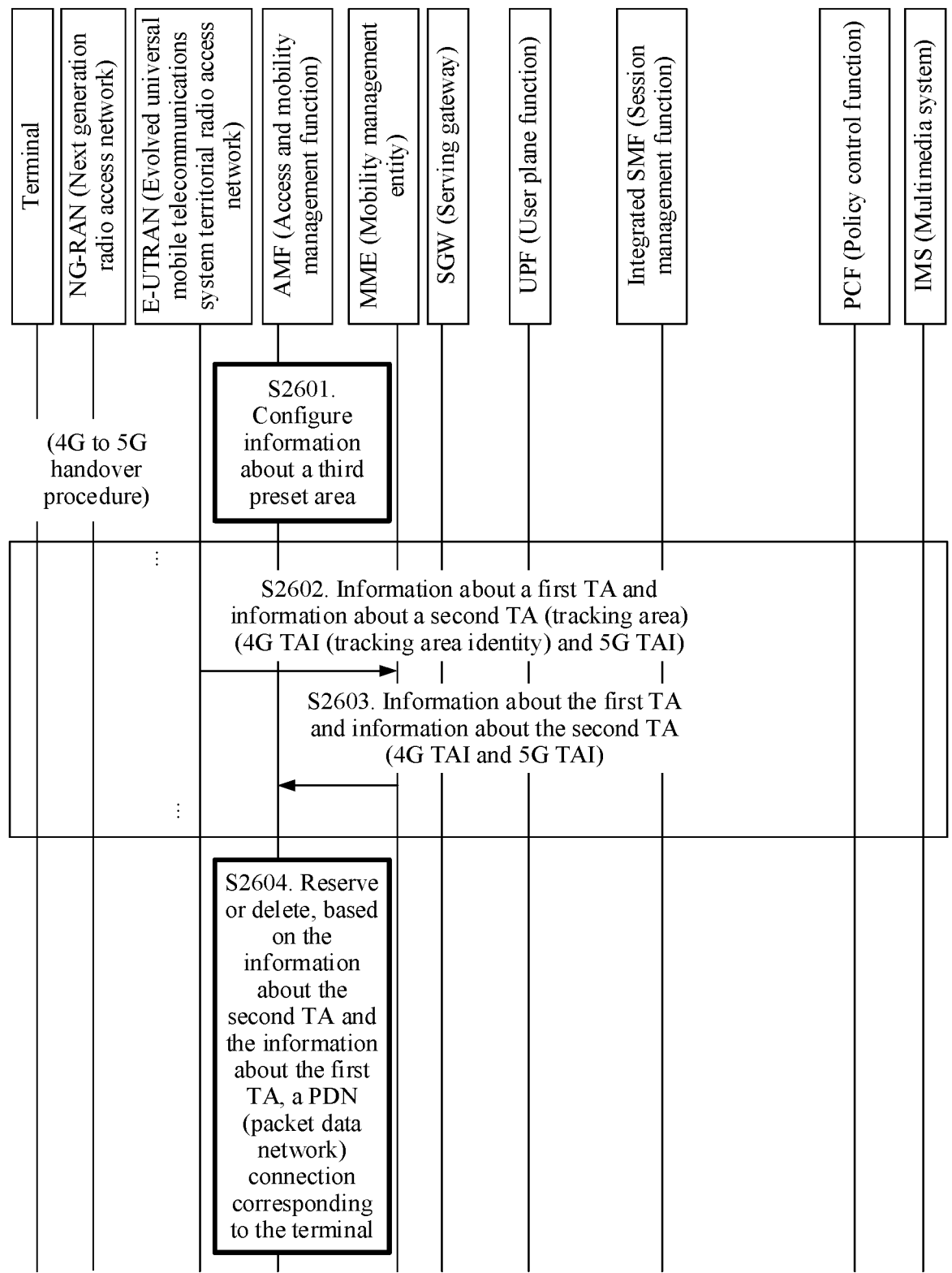
FIG. 24 is a schematic flowchart of a communication method according to an embodiment of this disclosure.
Figure 25:
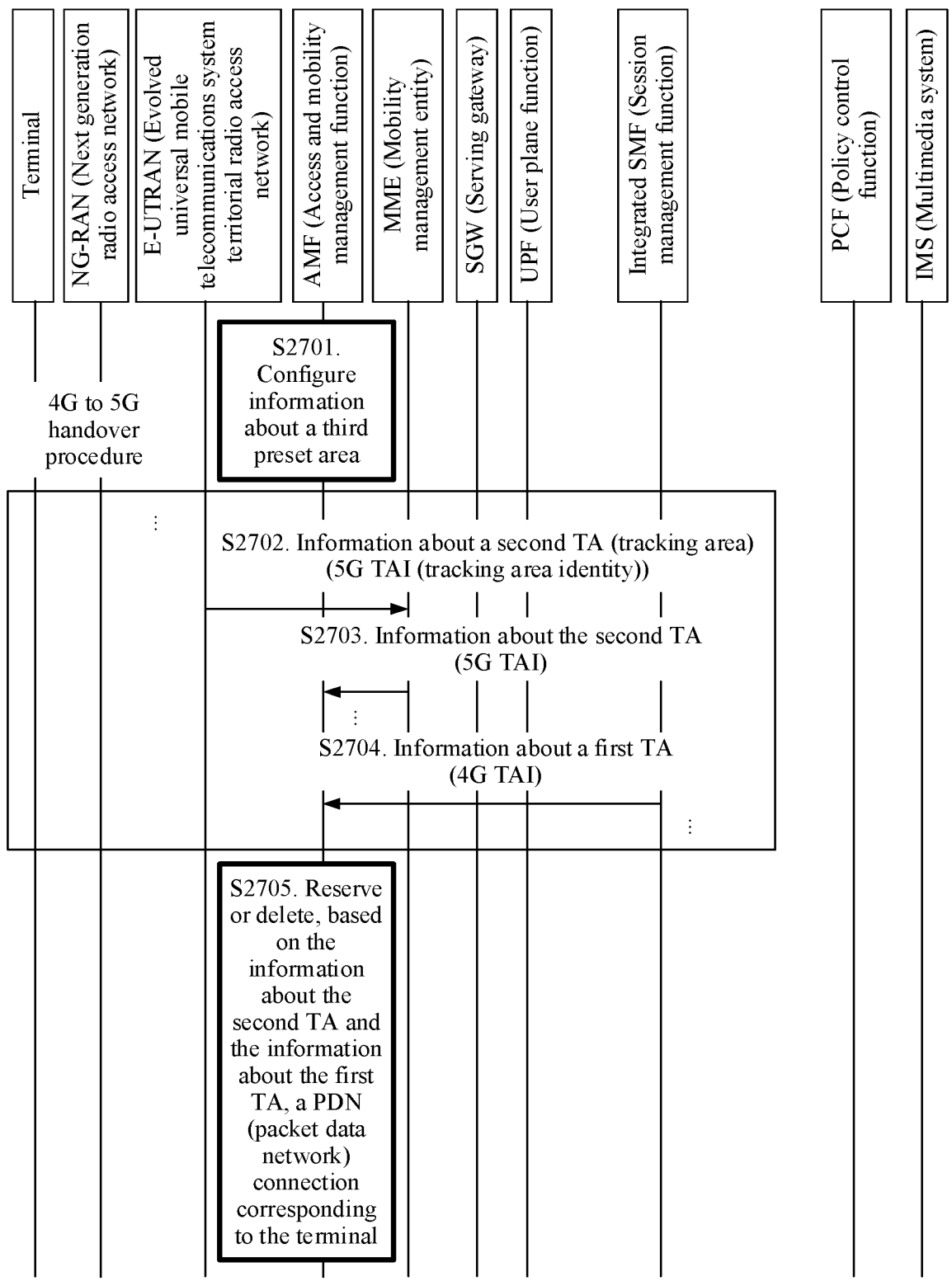
FIG. 25 is a schematic flowchart of a communication method according to an embodiment of this disclosure.

An embodiment corresponding to FIG. 24 is applied to a scenario in which the terminal is handed over from the EPS to the 5GS, and the AMF obtains the information about the first TA from the MME, and determines whether to delete the PDN connection corresponding to the terminal. An embodiment corresponding to FIG. 25 is applied to a scenario in which the terminal is handed over from the EPS to the 5GS, and the AMF obtains the information about the first TA from the integrated SMF, and determines whether to delete the PDN connection corresponding to the terminal.

Figure 26:
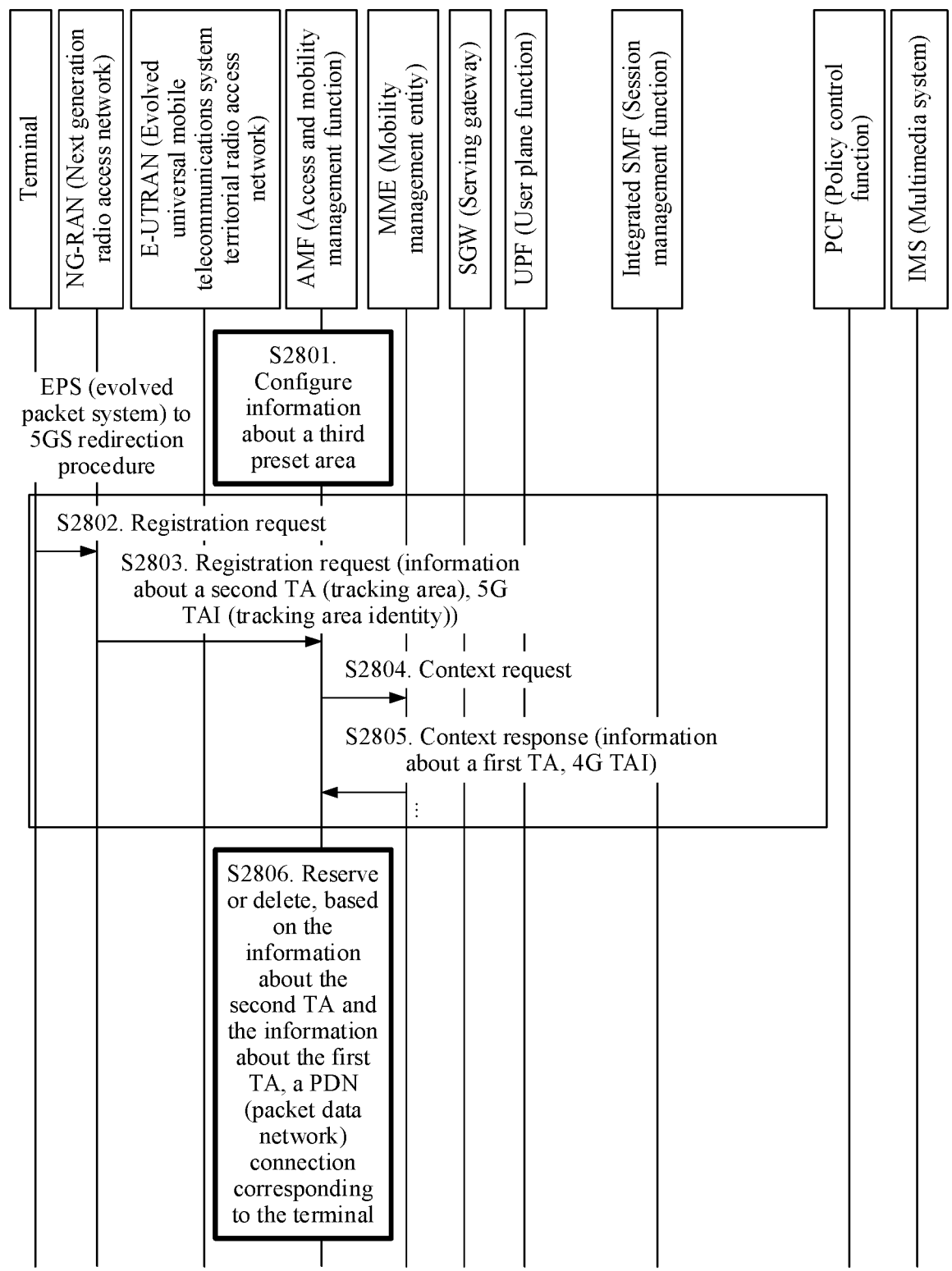
FIG. 26 is a schematic flowchart of a communication method according to an embodiment of this disclosure.
Figure 27:
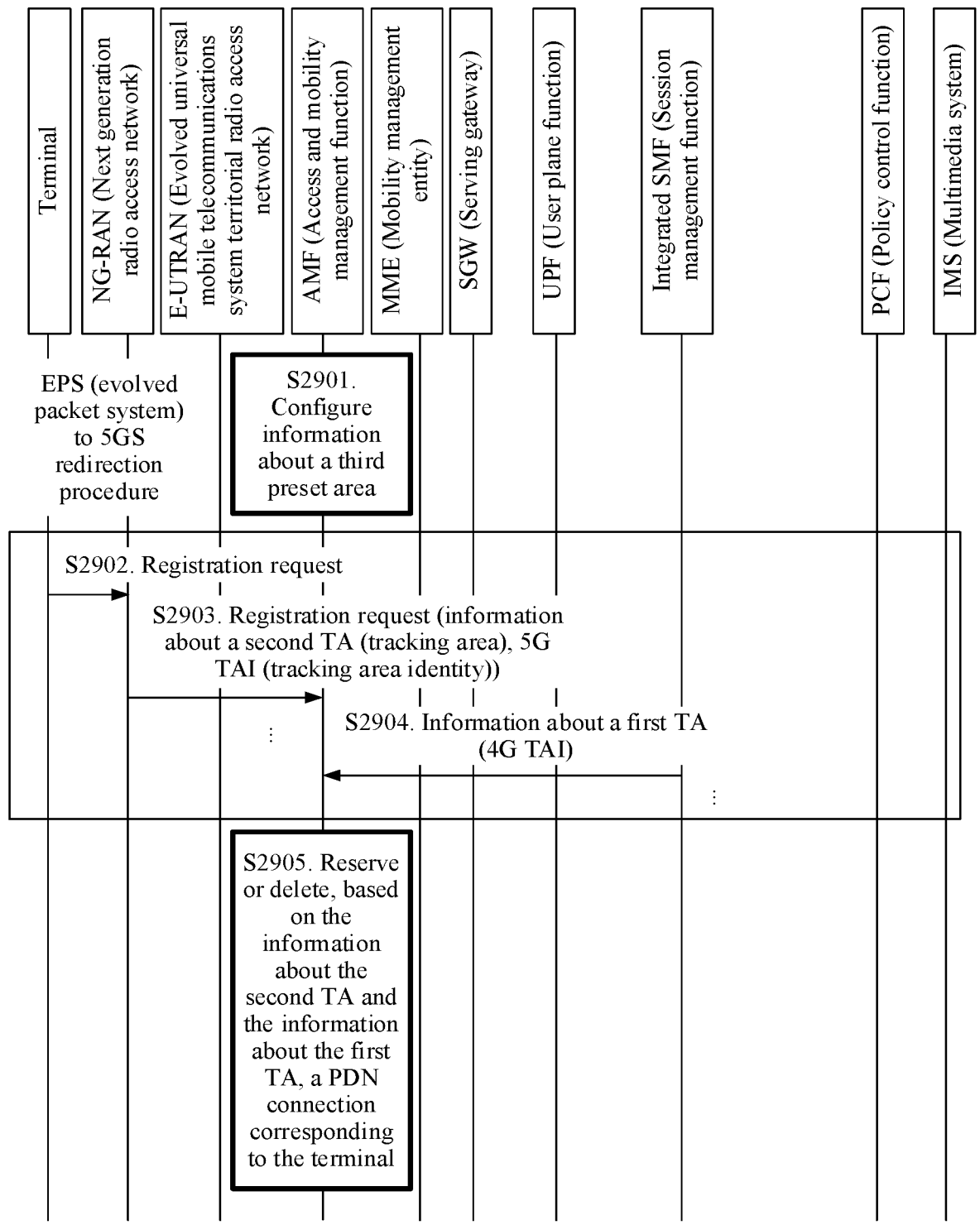
FIG. 27 is a schematic flowchart of a communication method according to an embodiment of this disclosure.

An embodiment corresponding to FIG. 26 is applied to a scenario in which the terminal is redirected from the EPS to the 5GS, and the AMF obtains the information about the first TA from the MME, and determines whether to delete the PDN connection corresponding to the terminal. An embodiment corresponding to FIG. 27 is applied to a scenario in which the terminal is redirected from the EPS to the 5GS, and the AMF obtains the information about the first TA from the integrated SMF, and determines whether to delete the PDN connection corresponding to the terminal.

An example in which the terminal is handed over from the 5GS to the EPS (namely, 4G), and the MME obtains the information about the first TA from the AMF, and determines whether to delete the PDN connection corresponding to the terminal is used. Referring to FIG. 20, a communication method provided in an embodiment of this disclosure includes the following steps.

S2201. An MME configures information about a third preset area.

The third preset area includes at least one TA of a third network and at least one TA of a fourth network. FIG. 18A is still used as an example, and the third preset area configured by the MME includes a 4G TA2 and a 5G TA1.

Optionally, a terminal initiates a service request to an IMS, and the IMS triggers a dedicated bearer establishment procedure.

S2202. An AMF sends information about a first TA and information about a second TA to the MME.

Correspondingly, the MME receives the information about the first TA and the information about the second TA from the AMF.

In a possible implementation, in a handover procedure, after the AMF receives an SMF_PDUSession_Context Response from an integrated SMF, the AMF sends a forward relocation request message to the MME, where the message carries a user context, and the user context includes the information (5G TAI) about the first TA and the information (4G TAI) about the second TA.

S2203. TAU procedure.

S2204. The MME reserves or deletes, based on the information about the second TA and the information about the first TA, a PDN connection corresponding to the terminal.

For a rule and a method for determining, by the MME, whether to delete the PDN connection corresponding to the terminal, refer to related content of determining, by the integrated SMF, whether to delete the PDN connection.

Optionally, a procedure of establishing a voice dedicated bearer and/or a video dedicated bearer is executed.

For the steps in the embodiment corresponding to FIG. 20, some steps are not described in detail. For specific implementation of the steps, refer to another embodiment, or refer to the conventional technology.

An example in which the terminal is handed over from the 5GS to the EPS, and the MME obtains the information about the first TA from the AMF, and determines whether to delete the PDN connection corresponding to the terminal is used. Referring to FIG. 21, a communication method provided in an embodiment of this disclosure includes the following steps.

S2301. An MME configures information about a third preset area.

Optionally, in an EPS fallback scenario, the method further includes the following. A terminal initiates a service request to an IMS, and the IMS triggers a dedicated bearer establishment procedure.

S2302. An AMF sends information about a second TA to the MME.

Correspondingly, the MME receives the information about the second TA from the AMF.

For specific implementation of step S2302, refer to step S2202.

S2303. An integrated SMF sends information about a first TA to the MME.

Correspondingly, the MME receives the information about the first TA from the integrated SMF.

In a possible implementation, in a handover procedure, after the integrated SMF receives a modify bearer request from an SGW, the integrated SMF sends a modify bearer response to the MME by using the SGW, where the modify bearer response includes the information about the first TA.

S2304. TAU procedure.

S2305. The MME reserves or deletes, based on the information about the second TA and the information about the first TA, a PDN connection corresponding to the terminal.

Optionally, the method further includes a procedure of establishing a voice dedicated bearer and/or a video dedicated bearer.

An example in which the terminal is redirected from the 5GS to the EPS, and the MME obtains the information about the first TA from the AMF, and determines whether to delete the PDN connection corresponding to the terminal is used. Referring to FIG. 22, a communication method provided in an embodiment of this disclosure includes the following steps.

S2401. An MME configures information about a third preset area.

Optionally, in an EPS fallback scenario, the method further includes the following. A terminal initiates a service request to an IMS, and the IMS triggers a dedicated bearer establishment procedure.

S2402. An E-UTRAN device sends information about a second TA to the MME.

In a possible implementation, in a TAU procedure, the E-UTRAN device receives a TAU request from the terminal, and sends the TAU request message to the MME, where the message carries the information (4G TAI) about the second TA.

S2403. An AMF sends information about a first TA to the MME.

In a possible implementation, after receiving an SMF_PDUSession_ContextResponse from an integrated SMF, the AMF sends a context response message to the MME, where the message carries a user context, and the user context includes the information (5G TAI) about the first TA.

S2404. The MME reserves or deletes, based on the information about the second TA and the information about the first TA, a PDN connection corresponding to the terminal.

In a possible implementation, after the TAU procedure, the MME performs step S2404.

Optionally, in the EPS fallback scenario, the method further includes a procedure of establishing a voice dedicated bearer and/or a video dedicated bearer.

An example in which the terminal is redirected from the 5GS to the EPS, and the MME obtains the information about the first TA from the integrated SMF, and determines whether to delete the PDN connection corresponding to the terminal is used. Referring to FIG. 23, a communication method provided in an embodiment of this disclosure includes the following steps.

S2501. An MME configures information about a third preset area.

Optionally, in an EPS fallback scenario, the method further includes the following. A terminal initiates a service request to an IMS, and the IMS triggers a dedicated bearer establishment procedure.

S2502. An E-UTRAN device sends information about a second TA to the MME.

Correspondingly, the MME receives the information about the second TA from the E-UTRAN device.

In a possible implementation, after receiving the foregoing TAU request message from the terminal, the E-UTRAN device sends the TAU request message to the MME, where the TAU request message includes the information about the second TA.

S2503. An integrated SMF sends information about a first TA to an SGW.

In a possible implementation, after receiving a modify bearer request message from the SGW, the integrated SMF feeds back a modify bearer response message to the SGW, where the modify bearer response message includes the information about the first TA.

S2504. The SGW sends the information about the first TA to the MME.

In a possible implementation, after the SGW receives the modify bearer response message from the integrated SMF, the SGW sends a create session response message to the MME, where the create session response message includes the information about the first TA.

S2505. The MME reserves or deletes, based on the information about the second TA and the information about the first TA, a PDN connection corresponding to the terminal.

Optionally, in the EPS fallback scenario, the method further includes a procedure of establishing a voice dedicated bearer and/or a video dedicated bearer.

An example in which the terminal is handed over from the EPS to the 5GS, and the AMF obtains the information about the first TA from the MME, and determines whether to delete the PDN connection corresponding to the terminal is used. Referring to FIG. 24, a communication method provided in an embodiment of this disclosure includes the following steps.

S2601. An AMF configures information about a third preset area.

FIG. 14A is still used as an example, and one third preset area configured by the AMF includes a 5G TA1 and a 4G TA2.

S2602. An E-UTRAN device sends information about a first TA and information about a second TA to an MME.

Due to mobility of a terminal, the E-UTRAN device initiates a 4G to 5G handover procedure based on a measurement report of the terminal or the like, and the E-UTRAN device sends a handover required message to the MME, where the message carries the information (4G TAI) about the first TA and the information (5G TAI) about the second TA.

S2603. The MME sends the information about the first TA and the information about the second TA to the AMF.

Correspondingly, the AMF receives the information about the first TA and the information about the second TA from the MME.

In a possible implementation, the MME queries a DNS based on the foregoing target TAI received from the E-UTRAN device, and selects an AMF. The MME sends a forward relocation request message to the selected AMF, where the message carries a user context, and the user context includes the information (4G TAI) about the first TA and the information (5G TAI) about the second TA.

S2604. The AMF reserves or deletes, based on the information about the second TA and the information about the first TA, a PDN connection corresponding to the terminal.

For a rule and a method for determining, by the AMF, whether to delete the PDN connection corresponding to the terminal, refer to related content of determining, by the integrated SMF, whether to delete the PDN connection or related content of determining, by the MME, whether to delete the PDN connection.

For the steps in the embodiment corresponding to FIG. 24, some steps are not described in detail. For specific implementation of the steps, refer to another embodiment, or refer to the conventional technology.

An example in which the terminal is handed over from the EPS to the 5GS, and the AMF obtains the information about the first TA from the integrated SMF, and determines whether to delete the PDN connection corresponding to the terminal is used. Referring to FIG. 25, a communication method provided in an embodiment of this disclosure includes the following steps.

S2701. An AMF configures information about a third preset area.

S2702. An E-UTRAN device sends information about a second TA to an MME.

Correspondingly, the MME receives the information about the second TA from the E-UTRAN device.

In a possible implementation, the E-UTRAN device sends a handover required message to the MME, where the message carries the information (5G TAI) about the second TA.

S2703. The MME sends the information about the second TA to the AMF.

The MME queries a DNS based on the foregoing 5G TAI received from the E-UTRAN device, and selects an AMF. The MME sends a forward relocation request message to the selected AMF, where the message carries the information (5G TAI) about the second TA.

S2704. An integrated SMF sends information about a first TA to the AMF.

Correspondingly, the AMF receives the information about the first TA from the integrated SMF.

In a possible implementation, in a handover procedure, the integrated SMF sends an SMF_PDUSession_CreateSMContext Response message to the AMF, where the message carries a session context, and the session context includes the information (4G TAI) about the first TA.

S2705. The AMF reserves or deletes, based on the information about the second TA and the information about the first TA, a PDN connection corresponding to the terminal.

An example in which the terminal is redirected from the EPS to the 5GS, and the AMF obtains the information about the first TA from the MME, and determines whether to delete the PDN connection corresponding to the terminal is used. Referring to FIG. 26, a communication method provided in an embodiment of this disclosure includes the following steps.

S2801. An AMF configures information about a third preset area.

S2802. A terminal sends a registration request to an NG-RAN device.

The terminal moves to a 5G network coverage area, initiates a mobility registration procedure, and sends a registration request to the NG-RAN device.

S2803. The NG-RAN device sends information about a second TA to the AMF.

In a possible implementation, after receiving the registration request from the terminal, the NG-RAN sends the registration request message to the AMF, where the message carries the information about the second TA, namely, a current TAI (5G TAI).

S2804. The AMF sends a context request to the MME.

S2805. The MME feeds back a context response to the AMF.

The context response includes a user context, and the user context includes information (4G TAI) about a first TA.

S2806. The AMF reserves or deletes, based on the information about the second TA and the information about the first TA, a PDN connection corresponding to the terminal.

Optionally, the step is performed after a redirection procedure ends.

An example in which the terminal is redirected from the EPS to the 5GS, and the AMF obtains the information about the first TA from the integrated SMF, and determines whether to delete the PDN connection corresponding to the terminal is used. Referring to FIG. 27, a communication method provided in an embodiment of this disclosure includes the following steps.

S2901. An AMF configures information about a third preset area.

S2902. A terminal sends a registration request to an NG-RAN device.

The terminal moves to a 5G network coverage area, initiates a mobility registration procedure, and sends a registration request to the NG-RAN device.

S2903. The NG-RAN device sends information about a second TA to the AMF.

In a possible implementation, after receiving the registration request from the terminal, the NG-RAN sends the registration request message to the AMF, where the message carries the information about the second TA, namely, a current TAI (5G TAI).

S2904. An integrated SMF sends information about a first TA to the AMF.

In a redirection procedure, the integrated SMF sends an SMF_PDUSession_CreateSMContext Response message to the AMF, where the message carries a session context, and the session context carries the information (4G TAI) about the first TA.

S2905. The AMF reserves or deletes, based on the information about the second TA and the information about the first TA, a PDN connection corresponding to the terminal.

It may be understood that, to implement functions in any one of the foregoing embodiments, the third core network device, the fourth core network device, or another network device (for example, a PCF network element) includes a corresponding hardware structure and/or software module for performing the functions. A person skilled in the art should be easily aware that units, algorithms, and steps in the examples described with reference to embodiments disclosed in this specification can be implemented in a form of hardware or a combination of hardware and computer software in this disclosure. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure.

In the embodiments of this disclosure, a device such as the third core network device, the fourth core network device, or another network device (for example, a PCF network element) may be divided into functional modules. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example and is merely logical function division, and may be other division in an actual implementation.

Figure 28:
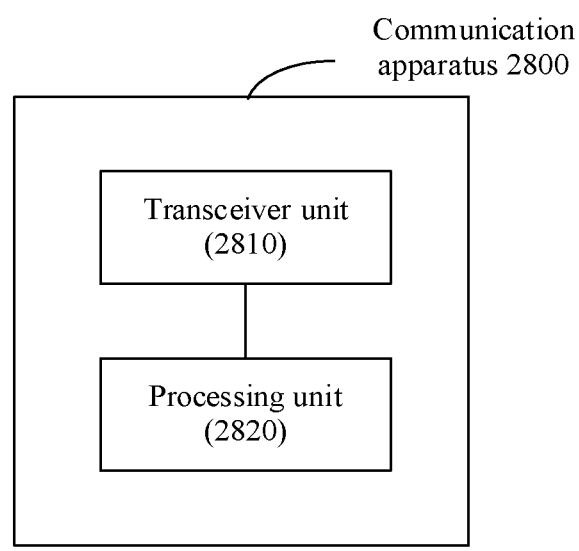
FIG. 28 is a schematic diagram of a structure of a communication apparatus according to an embodiment of this disclosure.

For example, when each functional module is obtained through division in an integrated manner, FIG. 28 is a block diagram of a structure of a communication apparatus according to an embodiment of this disclosure. A communication apparatus 2800 is a third core network device or an apparatus (which is, for example, but is not limited to a chip system) that supports a function of the third core network device, or is a fourth core network device or an apparatus that supports a function of the fourth core network device. The communication apparatus may include a transceiver unit 2810 and a processing unit 2820.

When the communication apparatus is a third core network device, the transceiver unit 2810 is configured to support the third core network device in performing the foregoing step S1301, and/or is configured to support another process of the technology described in this specification. The processing unit 2820 is configured to assist the third core network device in performing the foregoing step S1302, and/or is configured to support another process of the technology described in this specification.

Based on a specific scenario, when the communication apparatus is an integrated SMF, the transceiver unit 2810 is configured to support the integrated SMF in performing the foregoing steps S1502, S1503, S1602, S1604, S1703, S1704, S1902, and S1903, and/or is configured to support another process of the technology described in this specification. The processing unit 2820 is configured to support the integrated SMF in performing the foregoing steps S1504, S1605, S1705, and S1904, and/or is configured to support another process of the technology described in this specification.

When the communication apparatus is an MME, the transceiver unit 2810 is configured to support the MME in performing the foregoing steps S2202, S2302, S2303, S2402, S2403, S2502, and S2504, and/or is configured to support another process of the technology described in this specification. The processing unit 2820 is configured to support the MME in performing the foregoing steps S2204, S2305, S2404, and S2505, and/or is configured to support another process of the technology described in this specification.

When the communication apparatus is an AMF, the transceiver unit 2810 is configured to support the AMF in performing the foregoing steps S2603, S2703, S2704, S2803, S2805, S2903, and S2904, and/or is configured to support another process of the technology described in this specification. The processing unit 2820 is configured to support the AMF in performing the foregoing steps S2604, S2705, S2806, and S2905, and/or is configured to support another process of the technology described in this specification.

Optionally, the communication apparatus further includes a storage unit (not shown in FIG. 12). The storage unit is configured to store program code and data of the communication apparatus, where the data may include but is not limited to original data or intermediate data.

In a possible manner, the processing unit 2820 may be a controller, or the processor 401 or the processor 408 shown in FIG. 6, such as a CPU, a general-purpose processor, a DSP, an ASIC, an FPGA, or another programmable logic device, a transistor logic device, a hardware component, or any combination thereof. The processing unit 2820 may implement or execute logical blocks, modules, and circuits in various examples described with reference to content disclosed in this disclosure. Alternatively, the processor may be a combination for implementing a computing function, for example, a combination of one or more microprocessors, or a combination of a DSP and a microprocessor. The transceiver unit 2810 may be the communication interface 404 shown in FIG. 6, or may be a transceiver circuit or the like. The storage unit may be the memory 403 shown in FIG. 6.

A person of ordinary skill in the art may understand that all or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this disclosure, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices (for example, terminal devices). Some or all of the units may be selected based on actual requirements to achieve the objectives of the solutions of embodiments.

In addition, functional units in embodiments of this disclosure may be integrated into one processing unit, or each of the functional units may exist independently, or two or more units may be integrated into one unit. The integrated unit may be implemented in a form of hardware, or may be implemented in a form of hardware in addition to a software functional unit.

Based on the foregoing descriptions of the implementations, a person skilled in the art may clearly understand that this disclosure may be implemented by software in addition to a necessary universal hardware platform or by hardware only. In most circumstances, the former is a preferred implementation. Based on such an understanding, the technical solutions of this disclosure essentially or the part contributing to the conventional technology may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in embodiments of this disclosure.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A first core network device located in a first network, wherein the first core network device comprises:
    a processor configured to determine that Evolved Packet System (EPS) fallback of a terminal is triggered and the terminal is moved from a first preset area of the first network to a second preset area of a second network, wherein a first radio access technology (RAT) of the first network is different from a second RAT of the second network; and
    a communication interface coupled to the processor and configured to send first information to a second core network device in the second network, wherein the first information comprises a first identifier or first indication information,
    wherein the first identifier identifies a first dedicated bearer corresponding to the terminal,
    wherein the first dedicated bearer comprises a voice dedicated bearer or a video dedicated bearer,
    wherein the first indication information indicates that the terminal fell back to the second network using an EPS fallback procedure, and
    wherein the first identifier is for configuring the second core network device to reserve a packet data network (PDN) connection corresponding to the terminal based on the first information.

2. The first core network device of claim 1, wherein the first core network device is an access and mobility management function (AMF) or a session management function (SMF), and wherein the second core network device is a mobility management entity (MME).

3. The first core network device of claim 1, wherein the processor is further configured to obtain second information about the first dedicated bearer, and wherein the second information comprises an EPS bearer identifier (EBI) of the first dedicated bearer and the first identifier.

4. The first core network device of claim 3, wherein the first core network device is a session management function (SMF), and wherein the processor is further configured to:
    control the communication interface to send a message to an access and mobility management function (AMF), wherein the message requests the AMF to allocate the EBI to the first dedicated bearer; and
    control the communication interface to receive the EBI from the AMF.

5. The first core network device of claim 1, wherein the first core network device is a session management function (SMF), and wherein the communication interface is further configured to:
    send a message to the second core network device, wherein the message requests to delete the first dedicated bearer; and
    receive a response message of the message from the second core network device, wherein the response message indicates that the first dedicated bearer is deleted.

6. The first core network device of claim 1, wherein the first core network device is a session management function (SMF), wherein the communication interface is further configured to send a session context to an access and mobility management function (AMF), and wherein the session context comprises the first identifier or the first indication information.

7. The first core network device of claim 1, wherein the first core network device is an access and mobility management function (AMF), wherein the communication interface is further configured to send a user context of the terminal to the second core network device, and wherein the user context comprises the first identifier or the first indication information.

8. The first core network device of claim 1, wherein the first core network device is an access and mobility management function (AMF), wherein the communication interface is further configured to send a session context of the terminal to the second core network device, and wherein the session context comprises the first identifier or the first indication information.

9. A second core network device located in a second network, wherein the second core network device comprises:
  a communication interface configured to receive first information from a first core network device in a first network, wherein the first information comprises a first identifier or first indication information, wherein the first identifier identifies a first dedicated bearer corresponding to a terminal that moved from a first preset area of the first network to a second preset area of the second network, wherein the first dedicated bearer comprises a voice dedicated bearer or a video dedicated bearer, wherein the first indication information indicates that the terminal fell back to an Evolved Packet System (EPS) using an EPS fallback procedure, wherein the first identifier is for configuring the second core network device to reserve a packet data network (PDN) connection corresponding to the terminal based on the first information, and wherein a first radio access technology (RAT) of the first network is different from a second RAT of the second network; and
  a processor coupled to the communication interface and configured to reserve, based on the first information, the PDN connection corresponding to the terminal.

10. The second core network device of claim 9, wherein the second core network device is a mobility management entity (MME), and wherein the first core network device comprises a session management function (SMF) network element or an access and mobility management function (AMF) network element.

11. The second core network device of claim 9, wherein the communication interface is further configured to send second information about the first dedicated bearer to the terminal, and wherein the second information comprises an EPS bearer identifier (EBI) of the first dedicated bearer and the first identifier.

12. The second core network device of claim 9, wherein the first core network device is an access and mobility management function (AMF), wherein the communication interface is further configured to receive a user context of the terminal from the first core network device, wherein the user context comprises second information about the first dedicated bearer, and wherein the second information comprises the first identifier.

13. The second core network device of claim 9, wherein the first core network device is an access and mobility management function (AMF), wherein the communication interface is further configured to receive a session context of the terminal from the first core network device, wherein the session context comprises second information about the first dedicated bearer, and wherein the second information comprises the first identifier.

14. The second core network device of claim 9, wherein the first core network device is an access and mobility management function (AMF), wherein the communication interface is further configured to receive a user context of the terminal from the first core network device, and wherein the user context comprises the first indication information.

15. The second core network device of claim 9, wherein the first core network device is an access and mobility management function (AMF), wherein the communication interface is further configured to receive a session context of the terminal from the first core network device, and wherein the session context comprises the first indication information.

16. The second core network device of claim 9, wherein the first core network device is a session management function (SMF), and wherein the communication interface is further configured to:
  receive a first message from the first core network device, wherein the first message requests to delete the first dedicated bearer; and
  send a first response message of the first message to the first core network device, wherein the first response message indicates that the first dedicated bearer is deleted.

17. The second core network device of claim 16, wherein the communication interface is further configured to:
  send a second message to an access network device in the second network, wherein the second message requests to delete the first dedicated bearer; and
  receive a second response message of the second message from the access network device, wherein the second response message indicates that the first dedicated bearer is deleted.

18. A communication system comprising:
  a first core network device located in a first network, wherein the first core network device is configured to:
    determine that Evolved Packet System (EPS) fallback of a terminal is triggered and the terminal is moved from a first preset area of the first network to a second preset area of a second network, wherein a first radio access technology (RAT) of the first network is different from a second RAT of the second network; and
    send first information, wherein the first information comprises a first identifier or first indication information, wherein the first identifier identifies a first dedicated bearer corresponding to the terminal, wherein the first dedicated bearer comprises a voice dedicated bearer or a video dedicated bearer, wherein the first indication information indicates that the terminal fell back to the second network using an EPS fallback procedure; and
  a second core network device located in the second network and coupled to the first core network device, wherein the second core network device is configured to:
    receive the first information from the first core network device wherein the first identifier is for configuring the second core network device to reserve a packet data network (PDN) connection corresponding to the terminal based on the first information; and
    reserve, based on the first information, the PDN connection corresponding to the terminal.

19. The communication system of claim 18, wherein the second core network device is a mobility management entity (MME), and wherein the first core network device comprises a session management function (SMF) network element or an access and mobility management function (AMF) network element.

20. The communication system of claim 18, wherein the first core network device is a session management function (SMF), and wherein the first core network device is further configured to:
- obtain second information about the first dedicated bearer, wherein the second information comprises an EPS bearer identifier (EBI) of the first dedicated bearer and the first identifier;
- send a message to an access and mobility management function (AMF), wherein the message requests the AMF to allocate the EBI to the first dedicated bearer; and
- receive the EBI from the AMF.

* * * * *